US006820640B2

(12) United States Patent
Hand et al.

(10) Patent No.: US 6,820,640 B2
(45) **Date of Patent: *Nov. 23, 2004**

(54) VIBRATORY PATIENT SUPPORT SYSTEM

(75) Inventors: Barry D. Hand, Mount Pleasant, SC (US); Robert C. Novack, Charleston, SC (US); Donald E. Williamson, N. Charleston, SC (US); James R. Stolpmann, Charleston, SC (US); Kenith W. Chambers, Charleston, SC (US)

(73) Assignee: Hill-Rom Services, Inc., Wilmington, DE (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/190,807

(22) Filed: Jul. 8, 2002

(65) Prior Publication Data

US 2002/0195144 A1 Dec. 26, 2002

Related U.S. Application Data

(63) Continuation of application No. 09/633,599, filed on Aug. 7, 2000, now Pat. No. 6,415,814, which is a continuation of application No. 08/804,317, filed on Feb. 21, 1997, now Pat. No. 6,098,222, which is a continuation of application No. 08/501,274, filed on Jul. 17, 1995, now Pat. No. 5,606,754, which is a continuation of application No. 08/201,042, filed on Feb. 24, 1994, now abandoned, which is a continuation of application No. 08/350,715, filed on Dec. 7, 1994, now abandoned, which is a continuation of application No. 07/898,970, filed on Jun. 15, 1992, now abandoned, which is a continuation-in-part of application No. 07/555,319, filed on Jul. 19, 1990, now Pat. No. 5,121,513, which is a division of application No. 07/355,755, filed on May 22, 1989, now Pat. No. 4,949,414, which is a continuation-in-part of application No. 07/321,255, filed on Mar. 9, 1989, now abandoned.

(51) Int. Cl.[7] .......................... A47C 27/10; F16K 31/04

(52) U.S. Cl. .............................. 137/487.5; 137/624.11; 137/624.15; 137/102; 5/713; 5/915

(58) Field of Search ............................ 137/102, 487.5, 137/596.17, 625.65, 624.11, 624.15; 5/710, 713, 915

(56) References Cited

U.S. PATENT DOCUMENTS

| | | | |
|---|---|---|---|
| 624,638 | A | 5/1899 | Fournier |
| 989,888 | A | 4/1911 | Adler |
| 1,021,693 | A | 3/1912 | McGary |
| 1,082,177 | A | 12/1913 | Skeffington |
| 1,147,560 | A | 7/1915 | Shurtleyy |
| 1,468,072 | A | 9/1923 | Ogle |

(List continued on next page.)

FOREIGN PATENT DOCUMENTS

| | | |
|---|---|---|
| AU | 401767 | 3/1967 |
| DE | 2249013 | 7/1974 |

(List continued on next page.)

OTHER PUBLICATIONS

Echo CPA/23 Advertisement from Kinetic Concepts.
Advertisement, TASSI MK2; (undated).

(List continued on next page.)

*Primary Examiner*—Ramesh Krishnamurthy
(74) *Attorney, Agent, or Firm*—Rose McKinney & Evans LLP

(57) ABSTRACT

A pressure control apparatus for use in a bed including a pressurized air source, an inflatable air sack, and an independently inflatable cell located adjacent the inflatable air sack. A controller is operable to regulate the pressure in the air sack and to independently alternately pressurize and vent the inflatable cell at a selected frequency.

43 Claims, 16 Drawing Sheets

U.S. PATENT DOCUMENTS

| | | | | |
|---|---|---|---|---|
| 1,772,310 | A | 8/1930 | Hart | |
| 1,796,444 | A | 3/1931 | Dell'ere et al. | |
| 2,245,909 | A | 6/1941 | Enfiajian | |
| 2,415,150 | A | 2/1947 | Stein | |
| 2,437,006 | A | 3/1948 | Simpson | |
| 2,460,245 | A | 1/1949 | Summerville | |
| 2,491,557 | A | 12/1949 | Goolsbee | |
| 2,575,764 | A | 11/1951 | Morner | |
| 2,604,641 | A | 7/1952 | Reed | |
| 2,719,986 | A | 10/1955 | Rand | |
| 2,788,529 | A | 4/1957 | Moritzacky et al. | |
| 2,919,918 | A | 1/1960 | Horn | |
| 3,008,465 | A | 1/1961 | Gal | |
| 2,998,817 | A | 9/1961 | Armstrong | |
| 3,055,019 | A | 9/1962 | Agiman | |
| 3,077,347 | A | 2/1963 | Nova | |
| 3,081,163 | A | 3/1963 | Williams et al. | |
| 3,148,391 | A | 9/1964 | Whitney | |
| 3,173,415 | A | 3/1965 | Rubin | |
| 3,192,540 | A | 7/1965 | Swank | |
| 3,199,124 | A | 8/1965 | Grant | |
| 3,297,023 | A | 1/1967 | Foley | |
| 3,303,518 | A | 2/1967 | Ingram | |
| 3,317,934 | A | 5/1967 | Hinrichs | |
| 3,330,598 | A | 7/1967 | Whiteside | |
| 3,337,230 | A | 8/1967 | Golding | |
| 3,354,476 | A | 11/1967 | Scales et al. | |
| 3,363,941 | A | 1/1968 | Wierwille | |
| 3,390,674 | A | 7/1968 | Jones | |
| 3,394,415 | A | 7/1968 | Parker | |
| 3,421,163 | A | 1/1969 | Stoughton | |
| 3,426,373 | A | 2/1969 | Scott et al. | |
| 3,446,203 | A | 5/1969 | Murray | |
| 3,462,778 | A | 8/1969 | Whitney | |
| 3,467,081 | A | 9/1969 | Glass | |
| 3,477,071 | A | 11/1969 | Emerson | |
| 3,485,240 | A | 12/1969 | Fountain | |
| 3,492,988 | A | 2/1970 | DeMare | |
| 3,585,660 | A | 6/1971 | Gottfried et al. | |
| 3,585,661 | A | 6/1971 | Gottfried et al. | |
| 3,587,568 | A | 6/1971 | Thomas | |
| 3,595,223 | A | 7/1971 | Castagna | |
| 3,601,122 | A | 8/1971 | Guertin | |
| 3,605,138 | A | 9/1971 | Tucker | |
| 3,605,145 | A | 9/1971 | Graebe | |
| 3,644,950 | A | 2/1972 | Lindsay, Jr. | |
| 3,652,126 | A | 3/1972 | Folling | |
| 3,653,083 | A | 4/1972 | Lapidus | |
| 3,667,073 | A | 6/1972 | Renfroe | |
| 3,670,347 | A | 6/1972 | Weinstein | |
| 3,674,019 | A | 7/1972 | Grant | |
| 3,678,520 | A | 7/1972 | Evans | |
| 3,701,173 | A | 10/1972 | Whitney | |
| 3,740,777 | A | 6/1973 | Dee | |
| 3,757,356 | A | 9/1973 | Freeman | |
| 3,762,404 | A | 10/1973 | Sakita | |
| 3,775,781 | A | 12/1973 | Bruno et al. | |
| 3,784,994 | A | 1/1974 | Kery | |
| 3,795,021 | A | 3/1974 | Moniot | |
| 3,822,425 | A | 7/1974 | Scales | |
| 3,867,732 | A | 2/1975 | Morrell | |
| 3,870,450 | A | 3/1975 | Graebe | |
| 3,879,776 | A | 4/1975 | Solen | |
| 3,907,308 | A | 9/1975 | Leininger et al. | |
| 3,909,858 | A | 10/1975 | Ducker | |
| 3,919,730 | A | 11/1975 | Regan | |
| 3,935,604 | A | 2/1976 | Collins | |
| 3,949,438 | A | 4/1976 | Scales | |
| 3,955,563 | A | 5/1976 | Maione | |
| 3,982,786 | A | 9/1976 | Burgine et al. | |
| 4,005,236 | A | 1/1977 | Graebe | |
| 4,025,972 | A | 5/1977 | Adams et al. | |
| 4,068,334 | A | 1/1978 | Randall | |
| 4,094,025 | A | 6/1978 | Nystad | |
| 4,099,276 | A | 7/1978 | Hunt et al. | |
| 4,132,228 | A | 1/1979 | Green | |
| 4,133,305 | A * | 1/1979 | Steuer ........................ | 601/55 |
| 4,136,413 | A | 1/1979 | Scales | |
| 4,149,285 | A | 4/1979 | Stanton | |
| 4,175,297 | A | 11/1979 | Robbins et al. | |
| 4,185,341 | A | 1/1980 | Scales | |
| 4,190,286 | A | 2/1980 | Bentley | |
| 4,193,149 | A | 3/1980 | Welch | |
| 4,197,837 | A | 4/1980 | Tringali et al. | |
| 4,224,706 | A | 9/1980 | Young et al. | |
| 4,225,989 | A * | 10/1980 | Corbett et al. ................ | 5/713 |
| 4,267,611 | A | 5/1981 | Agulnick | |
| 4,279,044 | A | 7/1981 | Douglas | |
| 4,280,487 | A | 7/1981 | Jackson | |
| 4,326,507 | A | 4/1982 | Barkalow | |
| 4,347,633 | A | 9/1982 | Gamoons et al. | |
| 4,391,009 | A | 7/1983 | Schild et al. | |
| 4,394,784 | A | 7/1983 | Swenson et al. | |
| 4,422,194 | A | 12/1983 | Viesturs et al. | |
| 4,428,087 | A * | 1/1984 | Horn ............................ | 5/709 |
| 4,435,864 | A | 3/1984 | Callaway | |
| 4,454,615 | A | 6/1984 | Whitney | |
| 4,472,847 | A | 9/1984 | Gammons et al. | |
| 4,483,030 | A | 11/1984 | Flick et al. | |
| 4,488,322 | A | 12/1984 | Hunt et al. | |
| 4,508,107 | A | 4/1985 | Strom et al. | |
| 4,517,693 | A | 5/1985 | Viesturs | |
| 4,525,409 | A | 6/1985 | Elesh | |
| 4,525,885 | A | 7/1985 | Hunt et al. | |
| 4,525,886 | A | 7/1985 | Savenije | |
| 4,527,298 | A | 7/1985 | Moulton | |
| 4,528,704 | A | 7/1985 | Wegener et al. | |
| 4,534,078 | A | 8/1985 | Viesturs et al. | |
| 4,541,136 | A | 9/1985 | Graebe | |
| 4,542,547 | A | 9/1985 | Sato | |
| 4,551,874 | A | 11/1985 | Matsumura et al. | |
| 4,554,910 | A | 11/1985 | Lally | |
| 4,580,107 | A | 4/1986 | Caldwell et al. | |
| 4,583,255 | A | 4/1986 | Mogaki et al. | |
| 4,594,743 | A | 6/1986 | Owen et al. | |
| 4,599,755 | A | 7/1986 | Tominaga | |
| 4,604,993 | A | 8/1986 | Moriwaki et al. | |
| 4,614,000 | A | 9/1986 | Mayer | |
| 4,617,690 | A | 10/1986 | Graebe | |
| 4,622,706 | A | 11/1986 | Takeuchi | |
| 4,628,557 | A | 12/1986 | Murphy | |
| 4,635,287 | A | 1/1987 | Hirano | |
| 4,638,516 | A | 1/1987 | Vrzalik | |
| 4,638,519 | A | 1/1987 | Hess | |
| 4,642,825 | A | 2/1987 | Kurita | |
| 4,644,593 | A | 2/1987 | O'Brien | |
| 4,653,130 | A | 3/1987 | Senoue et al. | |
| 4,654,903 | A | 4/1987 | Chubb et al. | |
| 4,662,012 | A | 5/1987 | Torbet | |
| 4,686,719 | A | 8/1987 | Johnson et al. | |
| 4,686,722 | A * | 8/1987 | Swart ........................... | 5/713 |
| 4,688,283 | A | 8/1987 | Jacobson et al. | |
| 4,694,520 | A | 9/1987 | Paul et al. | |
| 4,694,521 | A | 9/1987 | Tominaga | |
| 4,697,290 | A | 10/1987 | Alklind et al. | |
| 4,698,864 | A | 10/1987 | Graebe | |
| 4,700,418 | A | 10/1987 | Ritter | |
| 4,711,275 | A | 12/1987 | Ford et al. | |
| 4,722,105 | A | 2/1988 | Douglas | |
| 4,729,598 | A | 3/1988 | Hess | |
| 4,745,647 | A | 5/1988 | Goodwin | |

4,753,225 A 6/1988 Vogel
4,768,249 A 9/1988 Goodwin
4,779,615 A 10/1988 Frazler
4,796,656 A 1/1989 Phillips et al.
4,797,962 A 1/1989 Goode
4,798,227 A 1/1989 Goodwin
4,799,276 A 1/1989 Kadish
4,803,744 A 2/1989 Peck et al.
4,825,486 A 5/1989 Kimura et al.
4,829,616 A * 5/1989 Walker .......................... 5/713
4,838,309 A 6/1989 Goodwin
4,840,425 A * 6/1989 Noble ..................... 297/284.1
4,852,195 A 8/1989 Schulman
4,862,921 A 9/1989 Hess
4,864,671 A 9/1989 Evans
4,896,389 A 1/1990 Chamberland
4,897,890 A 2/1990 Walker
4,907,308 A 3/1990 Leininger et al.
4,914,760 A 4/1990 Hargest et al.
4,914,771 A 4/1990 Afeyan
4,935,968 A 6/1990 Hunt et al.
4,942,635 A 7/1990 Hargest et al.
4,949,412 A 8/1990 Goode
4,949,413 A 8/1990 Goodwin
4,949,414 A 8/1990 Thomas et al.
4,951,335 A 8/1990 Eady
4,953,247 A 9/1990 Hasty
4,962,552 A 10/1990 Hasty
4,967,431 A 11/1990 Hargest et al.
4,977,633 A 12/1990 Chaffee
4,982,466 A 1/1991 Higgins et al.
4,986,738 A 1/1991 Kawasaki et al.
4,991,244 A 2/1991 Walker
4,993,920 A 2/1991 Harkleroad et al.
4,999,861 A 3/1991 Huang
4,999,867 A 3/1991 Toivio et al.
5,003,654 A 4/1991 Vrzalik
5,005,240 A 4/1991 Vrzalik
5,007,123 A 4/1991 Salyards
5,008,965 A 4/1991 Vrzalik
5,010,608 A 4/1991 Barnett et al.
5,018,786 A 5/1991 Goldstein et al.
5,022,110 A 6/1991 Stroh
5,022,385 A 6/1991 Harza
5,029,352 A 7/1991 Hargest et al.
5,035,014 A 7/1991 Blanchard
5,036,559 A 8/1991 Hargest
5,044,029 A 9/1991 Vrzalik
5,044,364 A 9/1991 Crowther
5,050,587 A 9/1991 Sagara et al.
5,051,673 A 9/1991 Goodwin
5,052,067 A 10/1991 Thomas et al.
5,052,068 A 10/1991 Graebe
5,060,174 A 10/1991 Gross
5,062,167 A 11/1991 Thomas et al.
5,062,169 A 11/1991 Kennedy et al.
5,065,464 A 11/1991 Blanchard et al.
5,065,466 A 11/1991 Thomas et al.
5,068,933 A 12/1991 Sexton
5,073,999 A 12/1991 Thomas et al.
5,083,335 A 1/1992 Krouskop et al.
5,090,074 A 2/1992 Scales et al.
5,090,077 A 2/1992 Caden et al.
5,095,568 A 3/1992 Thomas et al.
5,103,519 A 4/1992 Hasty
5,111,544 A 5/1992 Graebe
5,121,513 A 6/1992 Thomas et al.
5,142,719 A 9/1992 Vrzalik
5,152,021 A 10/1992 Vrzalik
5,152,023 A 10/1992 Graebe
5,163,196 A 11/1992 Graebe et al.
5,170,364 A 12/1992 Gross et al.
5,179,742 A 1/1993 Oberle
5,182,826 A 2/1993 Thomas et al.
5,235,713 A * 8/1993 Guthrie et al. ................ 5/710
5,249,318 A 10/1993 Loadsman
5,251,349 A 10/1993 Thomas et al.
5,269,030 A 12/1993 Pahno et al.
5,325,551 A 7/1994 Tappel et al.
5,331,698 A 7/1994 Newkirk et al.
5,335,384 A 8/1994 Foster et al.
5,367,728 A 11/1994 Chang
5,375,273 A 12/1994 Bodine, Jr. et al.
5,454,126 A 10/1995 Foster et al.
5,487,196 A 1/1996 Wilkinson et al.
5,539,943 A 7/1996 Romano
5,606,754 A * 3/1997 Hand et al. .................... 5/713
5,611,096 A 3/1997 Bartlett et al.
5,666,681 A 9/1997 Meyer et al.

FOREIGN PATENT DOCUMENTS

| | | |
|---|---|---|
| DE | 7522889 | 11/1975 |
| DE | 2446935 | 4/1976 |
| DE | 7334397 | 9/1976 |
| DE | 2522863 | 11/1976 |
| DE | 7639097 | 7/1977 |
| DE | 2615861 | 10/1977 |
| DE | 2625277 | 12/1977 |
| DE | 2816642 | 10/1978 |
| DE | 2807038 | 8/1979 |
| DE | 2856177 | 6/1980 |
| DE | 2919438 | 11/1980 |
| DE | 3217981 | 11/1982 |
| DE | 3303615 | 8/1984 |
| DE | 3535374 | 4/1987 |
| DE | 3716263 | 11/1988 |
| DE | 9010880 | 1/1991 |
| EP | 0 034 954 | 9/1981 |
| EP | 0 122 666 | 10/1984 |
| EP | 0 134 051 | 3/1985 |
| EP | 0 162 785 | 11/1985 |
| EP | 0 168 213 | 1/1986 |
| EP | 0 228 233 | 7/1987 |
| EP | 0 261 830 | 3/1988 |
| EP | 0 275 618 | 7/1988 |
| EP | 0 296 689 | 12/1988 |
| EP | 0 302 579 | 2/1989 |
| EP | 0 311 993 | 4/1989 |
| EP | 0 338 472 | 10/1989 |
| GB | 762528 | 11/1956 |
| GB | 796746 | 6/1958 |
| GB | 946831 | 1/1964 |
| GB | 949652 | 2/1964 |
| GB | 958651 | 5/1964 |
| GB | 959103 | 5/1964 |
| GB | 969367 | 9/1964 |
| GB | 1023097 | 3/1966 |
| GB | 1059100 | 2/1967 |
| GB | 1118740 | 7/1968 |
| GB | 1126364 | 9/1968 |
| GB | 1222710 | 2/1971 |
| GB | 1273342 | 5/1972 |
| GB | 1286197 | 8/1972 |
| GB | 1291015 | 9/1972 |
| GB | 1341325 | 12/1973 |
| GB | 1398544 | 6/1975 |
| GB | 1405333 | 9/1975 |
| GB | 1440193 | 6/1976 |
| GB | 1442994 | 7/1976 |
| GB | 1474018 | 5/1977 |
| GB | 1483045 | 8/1977 |
| GB | 1499938 | 2/1978 |

| | | |
|---|---|---|
| GB | 1545806 | 5/1979 |
| GB | 2026315 | 2/1980 |
| GB | 1576641 | 10/1980 |
| GB | 2059256 | 4/1981 |
| GB | 1595417 | 8/1981 |
| GB | 1599422 | 9/1981 |
| GB | 1601808 | 11/1981 |
| GB | 1602952 | 11/1981 |
| GB | 2090734 | 7/1982 |
| GB | 2107197 | 4/1983 |
| GB | 2108837 | 5/1983 |
| GB | 2134382 | 8/1984 |
| GB | 2141333 | 12/1984 |
| GB | 2167293 | 5/1986 |
| GB | 2177594 | 1/1987 |
| GB | 2177595 | 1/1987 |
| GB | 2177906 | 2/1987 |
| GB | 2183471 | 6/1987 |
| GB | 2215996 | 10/1989 |
| JP | 48-37990 | 6/1973 |
| JP | 53-98793 | 1/1977 |
| JP | 52-20173 | 2/1977 |
| JP | 55-18008 | 4/1980 |
| JP | 56-6106 | 2/1981 |
| JP | 56-13946 | 4/1981 |
| JP | 56-17099 | 4/1981 |
| JP | 57-179866 | 11/1982 |
| JP | 57-189462 | 12/1982 |
| JP | 58-16124 | 2/1983 |
| JP | 58-58033 | 4/1983 |
| JP | 58-169447 | 10/1983 |
| JP | 59-71626 | 5/1984 |
| JP | 59-93524 | 6/1984 |
| JP | 60-45022 | 3/1985 |
| JP | 60-45023 | 3/1985 |
| JP | 60-55425 | 4/1985 |
| JP | 60-152355 | 10/1985 |
| JP | 61-115533 | 7/1986 |
| JP | 61-163631 | 10/1986 |
| JP | 61-276557 | 12/1986 |
| JP | 62-21328 | 2/1987 |
| JP | 63-46157 | 2/1988 |
| JP | 2-32264 | 9/1990 |
| WO | 84/04884 | 12/1984 |
| WO | 86/05973 | 10/1986 |
| WO | 86-06624 | 11/1986 |
| WO | 88/09651 | 12/1988 |
| WO | 89/03203 | 4/1989 |
| WO | 92/07541 | 5/1992 |

OTHER PUBLICATIONS

Therapulse Advertisment from Kinetic Concepts.

Pegasus Airwave System Brochure from Pegasus Airwave Limited.

Article, "Air Support Systems for the Prevention of Bed Sores"; J.T. Scales; pp. 259–267; (undated).

Japanese brochure, "Automatic Shifting Mat for Sleeping Positions"; (undated).

Bok Y. Lee; "*Chronic Ulcers of the Skin*"; pp. 191–195 (undated), and translation.

Article, "Clinical Notes, Suggestions and New Instruments"; *Air Mattress for Bedsores*—Gardner; vol. 138; No. 8; p. 583; (undated).

Brochure, "Double Bubble"; (undated).

Brochure, Dr. Volkner's Lamellar Turning Bed™; (undated).

Article, "Economic Aspects of Unconventional Bed and Support Surfaces"; J.E. Smith; pp. 321–326; (undated).

Article, "Experience at Rancho Los Amigos Hospital With Devices and Techniques to Prevent Pressure Sores"; Reswick et al.; pp. 301–310; (undated).

Brochure, "The Future in Lateral Rotation Therapy Has Just Arrived . . . TR2000"; (undated).

Brochure, "Huntleigh's Alternating Pressure Systems"; (undated).

Brochure, "KinAir™ Controlled Air Suspension Therapy Gives Your Patients . . . "; (undated).

Article, "Mattresses for Preventing Pressure Sores in Geriatric Patients"; Bliss et al.; pp. 238–245; (undated).

Article, "Mediscus Low Air–Loss Beds and the Prevention of Decubitus Ulcers"; Melissa J. Beaver, *Critical Care Nurse*; vol. 6, No. 5; pp. 32–39; (undated).

Article, "Mobile and Status Support Systems"; W. Russel Grant; pp. 311–314; (undated).

Article, "Pressure on the Patient"; J.T. Scales; pp. 11–17; (undated).

Article, "Problems of Patient Support: The Air Fluidized Bed as a Solution"; T.S. Hargest; pp. 269–275; (undated).

Brochure, "Relieving the Pressure"; Alphacare System; (undated).

Report of Study Sponsored by North West Metropolitan Regional Hospital Board; pp. 246–268; (undated).

Article, "Static and Dynamic Support Systems–Pressure Differences on the Body"; Patricia Jeneid; pp. 287–299; (undated).

Brochure, "Therapy Without Compromise . . . Introducing Flexicair Low Airloss Therapy"; (undated).

Swedish Brochure, "Turbo–Puls Antidecubitus System"; (undated).

Article, "The Alternating Pressure Mattress"; Bedford et al.; *Gerontologia Clinica*; vol. 3, No. 2, pp. 69–82; (1961).

Article, "A Consideration of Mechnical Methods of Preventing Bedsores in Elderly Patients"; Mary R. Bliss; *Gerontologia Clinica*; vol. 6; pp. 10–21; (1964).

Article, Preventing Pressure Sores in Hospital: Controlled Trial of a Large–celled Ripple Mattress, Bliss et al.; *British Medical Journal*; vol. 1, pp. 394–397; (1967).

Article, "Patient–Support System Using Low–Pressure Air"; Scales et al.; The LancetU; pp. 885–888; (Oct. 23, 1971).

Article, "Alternating Pressure Pads"; *Health Devices*; pp. 248–262; (Jul./Aug. 1972).

Article, "The Prevention and Treatment of Pressure Sores Using Air–support Systems"; Scales et al.; *Paraplegia*, vol. 12, pp. 118–131; (1974).

Advertisement, Watkins and Watson Ltd.; Low Air Loss Bed System from Hospital Equipment and Supplies; vol. 21, No. 2; (Feb. 1975).

Advertisement, Hogg Conrol Systems Ltd. Alternating Pressure Mattress from Hospital Equipment and Supplies (Mar. 1975).

Advertisement, Low Air Loss Bed System from Hospital Equipment and Supplies; vol. 21, No. 8; (Aug. 1975).

Article, *Bedsore BioMechanics*Kenedi et al., Ed.: pp. v–xxvi, 1, 11–17, and 259–326; (1976).

Advertisement, Hogg Control ys. Ltd. From Hospital Equipment an Supplies; (May 1976).

Article, "Air Beds Cost–Effective Prevention of Bed Sores"; from Hospital Equipment and Supplies; (Mar. 1977).

Advertisement, Gaymar Alternating Pressure Pads from International Hospital Equipment; (May 1977).

Article, "The Use of Ripple Beds in Hospitals" Dr. M.R. Bliss; *Hospital and Health Services Review*; pp. 190–193; (Jun. 1978).
Article, "Leaving No Ripple", *The Lancet* ; pp. 247–248; (Jul. 29, 1978).
Brochure, International Hospital Equipment Alphabed Advertisement; (Jul. 1979).
Advertisement, Pulsair from Hospital Equipment and Supplies; (Sep. 1979).
Brochure, International Hospital Equipment Talley Medical Equipment Ltd. Advertisement, (Sep. 1979).
Article, "Reducing Devices for Pressure Sores with Respect to Nursing Care Procedures"; Steffel et al.; *Nursing Research*; Accepted for publication Nov. 1979.
Brochure, International Hospital Equipment Rippling Mattress Advertisement; (Nov. 1979).
Advertisement, Mediscus Mark V from Exhibition Supplement; British Hospitals Exhibition; 1980.
Advertisements, "This is No Ordinary Ripple Bed"; The Astec AP Bed; from HES; (Mar. 1980).
Advertisements, "The Pressure's Off and the Mositure's Gone"; and "Special Beds" from HES (Oct. 1980).
Article, *Preventing Decubitus Ulcers*; CURN Project–Michigan Nurses Assoc., pp. 68–71 and 141–142; (1981).
Brochure, International Hospital Equipment Mediscus Mark V Model Air Bed; (May 1981).
Advertisement, Mayflower Products Pulsating Bed and Medical Cushion from HES; (Oct. 1981).
Article, Decubitus Prophylaxis: A Prospective Trial on the Efficiency of Alternating–Pressure Air–Mattresses and Water_Mattresses: Anderson et al.; *Acta Dermatovener*; vol. 63; pp. 227–230; (1982).
Brochure, International Hospital Equipment Mediscus Mark V and Minor Air Beds; (Jan. 1982).
Article, "Use of the 'Air Wave System' to Prevent Pressure Sores in Hospital"; Smith et al.; *The Lancet*; pp. 1288–1290; (0605–1982).
Advertisement, Mediscus Products, Ltd. Air Bed from HES; (Jul. 1982).
Brochure, International Hospital Equipment Advertisement for APP–50 Mini Pillo Pump/Pillo Pad System; (Jan. 1983).
Brochure, International Hospital Equipment Advertisement for Astec A.P. Bed; (May 1983).
Advertisement, "The Choice is Yours From M&F"; from HES; (Sep. 1983).
Brochure, "The Mediscus Mark V—A Pressure Treatment System . . . "; (1984).
Article, "New Design of an Anti–Decubitus Lying–Down Support"; Maarten E. Swart; *Int. J. Rehab. Research*, vol. 8, No. 3, pp. 273–280; (1985).
Article, "Special Mattresses: Effectiveness in Preventing Decubitus Ulcers in Chronic Neurologic Patients"; Daehsel; *Arch. Phys. Med. Rehabil.*; vol. 66, pp. 246–248; (Apr. 1985).
Article, "Effectiveness of mattress overlays in reducing interface pressure during recumbancy"; Krouskop et al.; *Journal of Rehabilitation Research and Development*, vol. 22, No. 3, pp. 7–10; (Jul. 1985).
Instruction Manual, "Mediscus Mark 5A–M(1–Piece) Air Support Therapy"; Mediscus Products, Ltd.; (1986).
Japanese article, "Bed Sore_preventing Mat"; Naruse et al.; *Matsushita Denka Giho*, No. 33, pp. 22–27; (Aug. 1986).
Advertisement, "Low air loss bed" from HES; (Aug. 1986).
Article, "Pressure Sores Among Hospitalized Patients"; Allman et al.; reprinted from *Annals of Internal Medicine*, vol. 105, No. 8, pp. 337–342; (Sep. 1986).
Advertisement, Pegasus Airwave System from *Care Science and Practice*; vol. 4, No. 3; (Dec. 1986).
Publication, "Air–Fluidized Beds or Conventional Therapy for Pressure Sores"; Allman et al.; *Annals of Internal Medicine*; vol. 107, pp. 641–648; (1987).
Article, "A Comparison of the Clinisert Pressure Relief System to Other Pressure Sore Prevention Products"; Paul F. Moson; (jJan. 1987).
Advertisement, "The Specialists in Pressure Area Care Products"; Pegasus Airwave Ltd.; from HES; (Nov. 1987).
Article, "DRGS and Pressure Sores What is Reimbursable and What is Not"; Velez–Campos et al.; reprinted from *Journal of Enterostomal Therapy; vol. 14, No. 6: pp. 243–247;* (*Nov./Dec., 1987*).
Article, "Interface Skin Pressures on the Therapulse Bed"; Linda Dean: (Apr. 1988).
Article, "Pressure Relief vs. Pressure Reduction"; Patti Fairchild; (Mar. 1991).

* cited by examiner

VIBRATORY PATIENT SUPPORT SYSTEM

This is a continuation of application Ser. No. 09/633,599, filed Aug. 7, 2000, now U.S. Pat. No. 6,415,814, which is a continuation of application Ser. No. 08/804,317, filed Feb. 21, 1997, now U.S. Pat. No. 6,098,222, which is a continuation of application Ser. No. 08/501,274, filed Jul. 17, 1995, now U.S. Pat. No. 5,606,754, which is a continuation of application Ser. No. 08/350,715, filed on Dec. 7, 1994, now abandoned, which is a continuation of application Ser. No. 08/201,042, filed on Feb. 24, 1994, now abandoned, which is a continuation of application Ser. No. 07/898,970, filed Jun. 15, 1992, now abandoned, which is a continuation-in-part of application Ser. No. 07/555,319, filed Jul. 19, 1990, now U.S. Pat. No. 5,121,513, which application is a divisional application of Ser. No. 07/355,755, filed on May 22, 1989, now U.S. Pat. No. 4,949,414, which application is a continuation-in-part application of Ser. No. 07/321,255, filed Mar. 9, 1989, now abandoned, all the disclosures of which are incorporated by reference herein.

BACKGROUND AND SUMMARY OF THE INVENTION

Therapeutic percussors and vibrators are known and used to stimulate expectoration of mucous from the lungs. It has been found that by applying undulating or vibratory action to the area of the body adjacent to the thoracic cavity, postural draining or coughing up of sputum is induced thereby reducing the amount of mucous that lines the inner walls of the alveoli.

Various pneumatic and mechanical types of percussors are known in the art. For example, U.S. Pat. No. 4,580,107 to Strom et al. discloses a pneumatic percussor for stimulating the expectoration of mucous. Similarly, U.S. Pat. No. 3,955,563 to Maione discloses a pneumatic percussor useful in the therapeutic treatment of cystic fibrosis and other lung disorders.

Low air loss patient support structures or beds are also known in the medical field. The structures essentially consist of a plurality of inflatable sacs disposed on a frame structure. The patient's weight is uniformly distributed over the supporting surface area of the inflatable sacs. Low air loss beds are known in the art claiming therapeutic value in pulmonary and circulatory care. Low air loss beds are also considered helpful in preventing and treating pressure sores. Exemplary low air loss beds relating to wound care management and prevention include the Flexicair and Restcue beds provided by Support Systems International, Inc.

Alternating pressure low air loss beds are also known in the art. For example, U.S. Pat. No. 5,044,029 to Vrzalik discloses a low air loss bed having first and second sets of air bags alternating positioned in an interdigitated fashion. Valves and circuitry are provided for alternately changing the pressure in each of the sets of bags to selectable maximum and minimum pressure above and below a predetermined baseline pressure in repetitive and cyclical fashion. Low air loss beds are also known for turning or rotating a patient from side to side in a cyclic fashion, for instance the Biodyne bed by Kinetic Concepts, Inc.

Support Systems International, Inc. markets the Restcue bed having the ability to operate in a first static mode, a second pulsation mode, and a third patient turning mode. The Restcue Bed employs a uniquely designed inflatable sac, as disclosed in U.S. Pat. No. 4,949,414, to operate in any one of the three modes.

Until now, the vibratory therapeutic treatment of lung disorders, such as cystic fibrosis, has not been combined with the benefits of low air loss technology. Previously, a patient restricted to a low air loss bed, such as the Restcue bed, who also required percussive chest therapy to induce mucociliary clearance required an external mechanical or pneumatic type vibrator, such as the Strom device. This device would be applied directly to the patient's upper torso to loosen the mucous.

It is also known in the art to provide vibratory pads or similar supports upon which a patient can lie or sit. U.S. Pat. No. 4,753,225 to Vogel, for example, discloses an oscillator plate on which a body can sit, lie, or stand. The oscillator plate is made to oscillate by sound waves. U.S. Pat. No. 4,583,255 to Mogaki et al. discloses a massage mat having a plurality of juxtaposed air chambers. A repeated rhythmic wave motion is induced over the entire surface of the mat or in a local surface by repeating a succession of feeding and discharging of compressed air into and from the air chambers. U.S. Pat. No. 4,551,874 to Matsumura et al. discloses a similar pneumatic massage mat.

The patient care industry has become sensitive to the rising cost of health care in this country. Sophisticated therapy devices such as the low air loss beds described, although very effective in their method, can amount to significant expense if the patient requires sustained use of the bed. The more versatile these beds can be made, the more the expense of the bed can be spread among a wider patient basis. For example, a low air loss bed also incorporating a vibratory therapy mode of operation could be used to treat a first patient suffering from pressure ulcers and a second patient suffering from a lung disorder. The present invention provides such a unique and versatile patient support system and marks a significant advance in the art of low air loss specialty hospital beds.

In accordance with the present invention, as embodied and broadly described herein, the vibratory patient support system of the present invention preferably includes a rigid support frame that carries the other components of the system. The frame is mounted on castors for ease of movement and preferably has a plurality of articulatable sections that can be lifted by conventional hydraulic lifting mechanisms and articulated by conventional articulation devices.

In accordance with the present invention, a plurality of inflatable sacs are supported upon the rigid support frame. The sacs are preferably disposed transversely across the patient support system but, may be disposed lengthwise thereto. Each sac may comprise a single internal chamber but preferably has four uniquely defined chambers, including two opposite end chambers and two intermediate chambers. The inflatable sacs of the present invention are uniquely designed so that the patient support system can operate in any one of three operational modes with at least one portion or region of the inflatable sacs having a vibratory capability.

The present invention further comprises means for pressurizing and maintaining the inflatable sacs at a predetermined pressure. The predetermined pressure may be a patient height and weight specific profile which can be varied or adjusted accordingly. Vibrating means are further provided separate from the pressurizing and maintaining means. The vibrating means are for vibrating at least a portion of the patient support surface of the system in a frequency range of, for example, 1 Hz to 50 Hz. The frequency range may be as high as desired. The vibrating means are separate from the pressurizing means in that the inflatable sacs can be maintained at the predetermined pressure profile and operate in any mode while a portion of the patient support surface is simultaneously vibrated at a predetermined frequency within the frequency range. Means for variably controlling the vibrating means are also provided which may include, for example, varying the frequency and magnitude or amplitude of vibrations imparted to the patient support surface.

In another preferred embodiment of the invention, the support frame is articulatable in sections with at least one of the sections corresponding to the general area of the patient's chest. In this embodiment, the vibrating means are disposed within at least one of the inflatable sacs located in the section corresponding to the patient's chest. In this manner, the vibrating forces are localized so as to be applied to the general area of the upper torso of a patient, thereby providing respiratory therapy.

The means for pressurizing and maintaining the inflatable sacs at a predetermined pressure preferably comprises means for pressurizing the inflatable sacs in a first constant pressure mode so that the inflatable sacs are maintained at a relatively constant predetermined pressure whereby a patient resting upon the patient support surface is supported at a predetermined relatively static pressure. Preferably, means are further provided for pressurizing the inflatable sacs in a second pulsation mode whereby at least two alternate sets of the inflatable sacs are alternately inflated and deflated so as to provide alternating pressure point relief to a patient resting upon the support surface. Means are also preferably provided for pressurizing the inflatable sacs in a third turning mode whereby generally disposed portions of each inflatable sac are alternately inflated and deflated so that a patient resting upon the sacs can be automatically tilted from side to side. In this preferred embodiment of the present invention, the patient support system is switchable from any one of said modes of operation to any other mode of operation with the vibrating means being independently actuable and controllable from any of the modes of operation.

In another preferred embodiment of the invention, the vibrating means may comprise a pneumatic vibrating system. This pneumatic vibrating system may include a source of pressurizing air and at least one inflatable cell or pod disposed within at least one of the inflatable sacs generally near the top thereof. The inflatable cell may be supported within the sac by flexible internal slings or like structure. The inflatable cell may also form an integral part of the inflatable sac. For example, the top of the inflatable cell may also be the top of the inflatable sac. The inflatable cell is in pneumatic communication with the source of pressurized air so that pressurized air can be directed into the inflatable cell causing the cell to expand. Controllable valve means are preferably provided between the source of pressurized air and the inflatable cell. The valve means operate to alternately supply pressurized air from the pressurized air source to the cell and to vent the pressurized air from the cell at a predetermined frequency. In this manner, the inflatable cell pneumatically vibrates, in other words, contracts and expands, just below the upper surface of the inflatable sac and thereby imparts vibrational forces to the patient support surface. A control circuit is also provided for controlling the operational frequency of the controllable valve means.

In another preferred embodiment of the invention, a plurality of the inflatable cells may be provided for imparting the vibrational forces to the patient support surface. The plurality of cells may be disposed within at least two of the inflatable sacs. In a preferred embodiment, the inflatable cells are disposed within those sacs corresponding to the general area of a patient's chest or upper torso. In still another preferred embodiment, more than one inflatable cell may disposed within any given inflatable sac.

Preferably, the pneumatic vibrating system is in operative pneumatic communication with the means for pressurizing and maintaining the sacs at a predetermined pressure. In this embodiment, the pneumatic vibrating system and the pressurizing means share a common source of pressurized air. In a preferred embodiment, this source of pressurized air comprises a variable speed blower.

In another preferred embodiment of the pneumatic vibrating system according to the present invention, the inflatable cell may also comprise a diaphragm generally at the top of the cell just below the upper surface of the inflatable sac. The diaphragm acts to snap against the upper surface of the inflatable sac upon the inflatable cell being pressurized. Once the inflatable cell is vented, the diaphragm retracts from the upper surface to again snap against the surface once the cell is subsequently inflated, and so forth.

The present invention encompasses any suitable vibrating means or system which cooperates with the inflatable sacs to provide vibrational therapy in at least one section of the sacs. Although the pneumatic vibrating system is a preferred embodiment, the present invention encompasses suitable mechanical vibrating devices as well. For example, mechanical vibrating pistons or like devices may be disposed internally or externally to the inflatable sacs to cause the patient support surface to vibrate at a desired frequency and magnitude. Such embodiments are encompassed by the spirit of the present invention.

In further accordance with the purpose of the present invention, a low air loss patient support system of the type having a plurality of alternately disposed low air loss sacs supported on a bed frame is provided, the patient support system includes means for pressurizing the sacs and maintaining the sacs at a predetermined pressure which may be a height and weight specific pressure profile for a particular patient. The upper surfaces of the low air loss sacs form a patient support surface. The low air loss patient support system of this embodiment further comprises means internal to at least one of the low air loss sacs for imparting vibrational forces to at least a portion of the patient support surface while the sacs are simultaneously maintained at the predetermined pressure profile.

Preferably, the low air loss patient support system is divided into sections. Control means are provided for maintaining the sacs within each section at a particular predetermined pressure by computing and maintaining a height and weight specific pressure profile for each section. The vibrational forces imparting means is independently actuable and controllable relative to the control means for maintaining the sacs at a predetermined pressure. In this embodiment, the low air loss patient support system can function regardless of whether the vibrational system is actuated. On the other hand, actuation of the vibrational force system in no way degrades or effects the low air loss aspect of the patient support system.

In yet another preferred embodiment of the low air loss patient support system according to the invention, the patient support system can operate in any one of a plurality of operational modes including a first constant pressure mode, a second pulsating mode, and a third turning mode, with the vibrational forces imparting means being independently actuable and controllable in any one of the operational modes.

In further accordance with the purposes of the present invention, a vibratory therapy device is provided for the treatment of respiratory ailments. The vibratory therapy device comprises an inflatable patient support surface and means for maintaining the inflatable patient support surface at a predetermined pressure profile. The maintaining means controls the internal relative pressure of the inflatable patient support surface. Means are further provided independent of the maintaining means for simultaneously imparting therapeutic vibrational forces to at least a portion of the patient support surface while the support surface is separately maintained at the predetermined pressure profile.

In still further accordance with the purposes of the present invention, a vibratable inflatable sac is provided for use with an inflatable patient support system, whereby a plurality of the inflatable sacs form a patient support surface. Each inflatable sac preferably comprises at least one internal chamber. Means are provided for connecting the internal chamber to a source of pressurized air so that the inflatable sac can be pressurized and maintained at a predetermined pressure. Pneumatic vibrating means are carried internal to the inflatable sac. The vibrating means are disposed within the internal chamber generally near the top thereof just below the upper surface of the inflatable sac. Means are further provided for connecting the vibrating means to a source of pressurized air so that the vibrating means can be alternately pressurized and vented at a predetermined frequency thereby imparting a therapeutic vibrational force to the top of the inflatable sac. In a preferred embodiment, the pneumatic vibrating means are connectable to a pressurized air source common to the means for pressurizing the internal chambers of the air sac. Preferably, the inflatable air sac is a low air loss sac.

In accordance with the present invention, a plurality of elongated inflatable sacs are disposed transversely across the patient support system. Each sac may have one internal chamber but preferably has four separately defined chambers, including two opposite end chambers and two intermediate chambers. Each sac is uniquely designed so as to operate in any one of three operational modes.

A separate sac entrance opening is defined through the bottom of each end chamber. Each intermediate chamber preferably is shaped as a right angle pentahedron and has a diagonal wall that faces the center of the sac, and a base wall that preferably forms a common wall with the adjacent end chambers' vertically disposed internal side wall. Preferably, a single web forms the diagonal wall of both intermediate chambers. Because of the shape of the intermediate chambers, one is disposed predominately to the left side of the patient support, and the other is disposed predominately to the right side of the patient support. A restrictive flow passage is defined through the common wall between each end chamber and each adjacent intermediate chamber. Preferably, the restrictive flow passage includes a hole defined by a grommet having an opening therethrough and mounted in a web that forms both the base wall of an intermediate chamber and the vertically disposed internal side wall of the end chamber adjacent the intermediate chamber. The grommet is sized to ensure that the end chambers have filling priority over the intermediate chambers. Especially when the patient is being supported atop the section of the sac which includes the intermediate chambers, the end chambers fill with air before the intermediate chambers and collapse for want of air after the intermediate chambers.

In still further accordance with the present invention, means are provided for supplying air to each sac and the vibrating system. The means for supplying air to each sac preferably includes a blower electrically powered by a motor so that the blower can supply pressurized air to the sacs and inflatable cells.

The means for supplying air to each sac further preferably includes a support member carried by the frame. The support member preferably is rigid to provide a rigid carrier on which to dispose the sacs and may comprise a plurality of separate non-integral sections so that a one-to-one correspondence exists between each support member section and each articulatable section of the frame. Each section of the rigid support member preferably comprises a modular support member that defines a multi-layered plate which has an upper layer, a lower layer and a middle layer between the other two. The three-layered plate has a top to surface, a bottom surface, two opposed ends, and two opposed side edges. A plurality of inlet openings are defined through at least one of the side edges. In appropriate embodiments, a plurality of exit openings are defined in the opposite side edge. For example, the plate at each end of the patient support only has inlet openings defined through one of the side edges. A plurality of air sac supply openings are defined through the plate from the top surface and preferably extend completely through the three layers of the plate. In at least one of the plates, preferably the seat plate, a plurality of pressure control valve openings are defined through the bottom surface of the plate. A plurality of channels preferably are defined and enclosed between the top surface and the bottom surface of the plate and connect the various inlet openings, outlet openings, air sac supply openings, and pressure control valve openings to achieve the desired configuration of air supply to each of the sacs disposed atop the top surface of the plate.

In yet further accordance with the present invention, the means for supplying gas to the sacs and inflatable cells also preferably includes a hand-detachable airtight connection comprising one component secured to the air sac and a second component secured to the modular support member. The force required to connect and disconnect these components is low enough to permit these operations to be accomplished manually by hospital staff without difficulty. Both components preferably are formed of a resilient plastic material. One of the components comprises an elongated female connection fitting that has an exterior configured to airtightly engage an air sac supply opening defined through the modular support member. A locking nut screws onto one end of the fitting, which extends through the bottom plate, and secures the fitting to the air sac supply opening of the modular support member. The fitting preferably has an axially disposed cylindrical coupling opening with a fitting groove defined completely around the interior thereof and near one end of the cylindrical coupling opening. A resiliently deformable flexible O-ring is held within the fitting groove. A channel opening is defined through the coupling cylinder in a direction normal to the axis of the coupling cylinder and is disposed to be aligned with the support member channel that connects to the air sac supply opening which engages the fitting. A spring-loaded poppet is disposed in the cylindrical coupling opening and is biased to seal the coupling opening.

The other component of the connection includes an elongated coupling that is secured at one end to the air entrance opening of the sac or inflatable cell and extends outwardly therefrom. The coupling has an axially defined opening that permits air to pass through it and into the sac or cell. The exterior of the coupling is configured to be received within the interior of the connection fitting's cylindrical coupling opening. Insertion of the coupling into the interior of the fitting depresses the poppet sufficiently to connect the channel opening with the axially defined opening of the coupling. The coupling's exterior surface defines a groove that is configured to receive and seal around the deformable O-ring of the connection fitting therein when the coupling is inserted into the connection fitting. The O-ring seals and provides a mechanical locking force that holds the coupling in airtight engagement with the fitting. The coupling preferably is secured to extend from the air entrance opening of the air sac with the aid of a grommet and a retaining ring. The grommet preferably is heat sealed to the fabric of the air sac on the interior surface of the air sac around the air entrance opening. The coupling extends through the grommet and the air entrance opening. A pull tab is fitted over the coupling and rests against the exterior surface of the air sac. A retaining ring is passed over the coupling and mechanically locks against the coupling in air-tight engagement with the air sac. The pull tab can be grasped by the hand of a person who desires to disconnect the coupling from the fitting. In this way, the material of the air sac need not be pulled during disconnection of the coupling from the fitting. This prevents tearing of the air sac near the air entrance opening during the disconnection of the coupling from the fitting.

The coupling between the inflatable cells of the vibrating system and the pressurized air source also preferably includes a hand detachable airtight connection, which may be similar to the connection just described or a like connection.

In still further accordance with the present invention, the means for supplying air to each of the sacs further preferably includes a modular manifold for distributing air from the blower to the sacs and the inflatable cells. The modular manifold preferably provides means for mounting at least two pressure control valves thereon and for connecting these valves to a source of pressurized air and to an electric power source. As embodied herein, the modular manifold preferably includes a log manifold that has an elongated body defining a hollow chamber within same. A supply hose is connected to the main body and carries pressurized air from the blower to the hollow chamber of the main body. End walls are defined at the narrow ends of the main body and contain a conventional pressure check valve therein to permit technicians to measure the pressure inside the hollow chamber of the main body.

One section of the main body defines a mounting wall on which a plurality of pressure control valves and vibrational system valves can be mounted by inserting their valve stems into one of a plurality of ports defined through the mounting wall and spaced sufficiently apart from one another to permit side-by-side mounting of the valves. Each port has a bushing mounted therein to engage one or more O-rings on the valve stem of each valve. This renders each valve easily insertable and removable from the log manifold. The log manifold further preferably includes a circuit board that preferably is mounted to the exterior of the main body adjacent the mounting wall and includes electronic circuitry for transmitting electronic signals between a microprocessor and the valves mounted on the log manifold. A plurality of electrical connection fittings are disposed on the circuit board, and each fitting is positioned in convenient registry with one of the ports defined through the mounting wall. These electrical connection fittings are provided to receive an electrical connector of each pressure control valve, one or more fuses are provided on the circuit board to protect it and the components attached to it. Preferably, the fuses are mounted on the exterior of the log manifold to provide technicians with relatively unobstructed access to them to facilitate troubleshooting and fuse replacement.

In further accordance with the present invention, means are provided for maintaining a predetermined pressure in the sacs separate and independent of the vibrating means. As embodied herein, the means for maintaining a predetermined pressure in the sacs preferably includes a pressure control valve. In a preferred embodiment, a plurality of pressure control valves are provided, and each pressure control valve controls the pressure to more than one sac or more than one chamber of a sac. As embodied herein, each pressure control valve includes a housing having an inlet defined through one end and an outlet defined through an opposite end. An elongated valve passage is defined within the housing and preferably is disposed in axial alignment with the inlet. The longitudinal axis of the passage preferably is disposed perpendicularly with respect to the axis of the valve outlet which is connected to the passage. The housing further defines a chamber disposed between the inlet and a first end of the valve passage and preferably is cylindrical with the axis of the cylinder disposed perpendicularly with respect to the axis of the passage. The valve further preferably includes a piston that is disposed within the chamber and preferably rotatably displaceable therein to vary the degree of communication through the chamber that is permitted between the valve inlet and the valve passage. The valve further includes an electric motor that is mounted outside the housing and near the chamber. The motor is connected to the piston via a connecting shaft that has one end non-rotatably secured to the rotatable shaft of the motor and an opposite end non-rotatably connected to the piston, which also is cylindrical in shape. The piston has a slot extending radially into the center of the piston so that depending upon the position of this slot relative to the inlet and the passage, more or less air flow is permitted to pass through the holes between the inlet and the passage. Accordingly, the position of the piston within the chamber determines the degree of communication that is permitted through the chamber and thus the degree of communication permitted between the valve passage and the valve inlet. This degree of communication effectively regulates the pressure of the air flowing through the valve. Preferably, the piston slot is configured so as to provide a linear change in pressure as the piston is rotated.

The pressure control valve further preferably includes a pressure transducer that communicates with the valve passage to sense the pressure therein. The pressure transducer converts the pressure sensed in the valve passage into an electrical signal that is transmitted to an electronic circuit mounted on a circuit card of the valve. The circuit card receives the electrical signal transmitted from the transducer corresponding to the pressure being sensed in the valve passage. The circuit card has a comparator circuit that compares the signal from the transducer to a reference voltage signal received from a microprocessor via the circuit board of the log manifold. The valve circuit controls the valve motor according to the result of the comparison of these signals received from the microprocessor and transducer to open or close the valve to increase or decrease the pressure. The control valve has an electrical lead that is connected to the valve circuit card and terminates in a plug that can be connected to the electrical connection fitting on the log manifold.

A dump outlet hole is defined through the valve housing in the vicinity of the valve chamber. A dump passage is also defined through the valve piston and is configured to connect the dump hole to the valve passage upon displacement of the piston such that the dump hole becomes aligned with the dump passage of the piston. When the dump hole becomes aligned with the dump passage of the piston, the valve inlet becomes completely blocked off from any communication with the valve passage. Upon suitable operator control of the microprocessor, the dump hole becomes connected to the valve passage via the dump passage of the piston to permit the escape of air from the sacs to the atmosphere in a rapid deflation cycle.

A conventional pressure check valve is mounted in a manual pressure check opening defined through the housing of the pressure control valve. This permits the pressure inside the pressure control valve to be manually checked for purposes of calibrating the pressure transducer for example.

The means for maintaining a predetermined pressure preferably further includes a programmable microprocessor, which preferably is preprogrammed to operate the pressure control valves and the blower to pressurize the sacs at particular reference pressures. The microprocessor calculates each sac reference pressure according to the height and weight of the patient, and the portion of the patient being supported by the sacs connected to the respective pressure control valve. For example, the sacs supporting the head and chest of the patient may require a different pressure than the sacs supporting the feet of the patient. The pressures also differ depending upon whether the patient is lying on his/her side or back. A control panel is provided to enable the operator to provide this information to the microprocessor, which is programmed to calculate a separate reference pressure for each mode of operation of the patient support for each pressure control valve. The microprocessor uses an algorithm to perform the calculation of the sac reference pressure, and this algorithm has constants which change according to the elevation of the patient, the section of the patient being supported, and whether the patient is lying on the patient's side or the patient's back.

The output of the blower preferably is controlled by a blower control circuit which receives a control voltage signal from the microprocessor. A pressure transducer measures the pressure preferably at the outlet of the blower, and this measured pressure is supplied to the microprocessor which stores it in one of its memories. This memory is not continuously updated, but rather is updated once every predetermined interval of time in order to filter out brief transient pressure changes in the measured pressure so that such transients do not affect control over the blower. The microprocessor uses the highest pressure in the sacs to calculate a reference pressure for the blower higher than the highest sac pressure. The microprocessor is preprogrammed to compare the reference pressure with the measured pressure. If this comparison has a discrepancy greater than a predetermined discrepancy of about one inch of standard water, then the microprocessor changes the control voltage provided to the blower control circuit so as to reduce this discrepancy.

The sacs of the support system are preferably divided into separate body zones corresponding to a different portion of the patient's body requiring a different level of pressure to support same. Each body zone is controlled by two pressure control valves in one operational mode, one for the chambers on one side of the sacs and one for the chambers on the other side of the sacs. In another operational mode, the two pressure control valves are connected so that each pressure control valve controls the pressurization of the chambers in both sides of every alternate sac in the body zone. The microprocessor is preprogrammed to calculate an optimum reference pressure for supporting the patient in each body zone. This reference pressure is determined at the valve passage where the pressure transducer of each pressure control valve is sensing the pressure. This reference pressure is calculated based upon the height and weight of the patient. Once this reference pressure has been calculated for the particular patient and for the particular mode of operation of the patient support system, for example, turning mode at a particular attitude, pulsation mode at a particular level of depressurization, standard operating mode, etc., the microprocessor signals the circuit board which transmits this signal to the circuit card of the pressure control valve. The circuit card of the valve compares the pressure being measured by the transducer in each valve passage with the reference pressure which the microprocessor has calculated for the particular conditions of operation. Depending upon whether the measured pressure is greater than or lower than the calculated reference pressure, the circuit card signals the valve's motor to open or close the valve to increase or decrease the pressure to arrive at the target reference pressure. The circuit card continuously monitors this comparison and controls the valves accordingly.

The microprocessor preferably has parallel processing capability and is connected electrically to the circuit board of the log manifold via a ribbon cable electrical connector. The parallel processing capability of the microprocessor enables it to monitor and control all of the pressure control valves simultaneously, as opposed to serially. This increases the responsiveness of the pressure controls to patient movements in the support system.

In still further accordance with the present invention, there is provided means for switching between different modes of pressurizing the sacs. As embodied herein, the mode switching means preferably includes at least one flow diverter valve. The number of flow diverter valves depends upon the number of different pressure zones desired for the patent support system. Each pressure zone, also known as a body zone, includes one or more sacs or sac chambers which are to be maintained with the same pressure characteristics. In some instances for example, it is desired to have opposite sides of the sac maintained at different pressures. In other instances for example, it becomes desirable to have the pressure in every other sac alternately increasing together for a predetermined time interval and then decreasing together for a predetermined time interval.

Each flow diverter valve preferably is mounted within a modular support member and includes a first flow pathway and a second flow pathway. The ends of each flow pathway are configured to connect with the ends of two separate pairs of channels defined in the modular support member. The flow pathways are mounted on a rotating-disk that can be rotated to change the channels to which the ends of the two flow pathways are connected. This changes the flow configuration of the path leading from the blower to the individual sacs and sac chambers. At one position of the rotating disk, all of the chambers on one side of the sacs of a body zone are connected to the blower via one pressure control valve and all of the other sides of the sacs in the body zone are connected to the blower via a second pressure control valve. In a second position of the rotating disk, every alternate sac in the body zone has its chambers on both sides connected to one pressure control valve, and every other alternate sac in the body zone has both of its chambers connected to the blower via a second pressure control valve. Switching between the two positions of the rotating disk changes the flow configuration from the blower to the individual chambers of the sacs. This enables the present invention to be operated in two distinctly different modes of operation with a minimum number of valves and connecting pathways.

The phrase "pressure profile" is used herein to describe the range of pressures in the sacs of the patient support system at any given support condition. The pressure in the sacs in one body zone of the support system likely will be different from the pressure in the sacs of another body zone because the different weight of different portions of the patient's body imposes a corresponding different support requirement for each particular body zone. If the individual pressures in the sacs of all of the body zones were to be represented on a bar graph as a function of the linear position of the sacs along the length of the patient support, a line connecting the tops of the bars in the graph would depict a certain profile. Hence, the use of the term "pressure profile" to describe the pressure conditions in all of the sacs at a given moment in time, either when the pressures are changing or in a steady state condition.

In accordance with one of the methods of the present invention made possible by the support system of the present invention, the patient can be automatically tilted from side-to-side in a predetermined sequence of time intervals. The method of turning or tilting the patient includes the step of configuring the flow pathway from the blower to the sacs in each body zone such that the two chambers in one side of each of the sacs are controlled by one pressure control valve, and the two chambers in the other side of each of the sacs are controlled by another pressure control valve.

The step of separately controlling the air pressure that is supplied to each side of each of the sacs in each body zone preferably is accomplished by correctly configuring the flow diverter valve. The next step in tilting or turning the patient involves lowering the pressure in the side of the sacs to which the patient is to be tilted. The pressure must be lowered from a first pressure profile, which previously was established to support the patient in a horizontal position, to a predetermined second pressure profile which depends upon the height and weight of the patient and the angle to which the patient is to be tilted. The next step in the method of tilting or turning the patient requires raising the pressure in the side of the sacs that is opposite the side to which the patient is being tilted. This requires raising the pressure in the non-tilted side of each of the sacs to a predetermined third pressure profile. This raised pressure compensates for the lower pressure profile in the tilted side of the sacs. Thus, the overall pressure being supplied to support the patient remains sufficient to support the patient in the tilted position.

Preferably the steps of lowering the pressure in one side of the sacs occurs in conjunction with and at the same time as the step of raising the pressure in the other sides of the sacs. The changes in pressure are effected under the control of the microprocessor which calculates the desired reference pressure for the tilted condition based upon the height and weight of the patient and transmits a corresponding reference voltage signal to the circuit card of the pressure control valve which closes the valve opening until the desired pressure has been attained, as signaled by the pressure transducer monitoring each pressure control valve. The microprocessor can be programmed to maintain the patient in the tilted position for a predetermined length of time. At the end of this time, the microprocessor can be programmed to return the patient gradually to the horizontal position by reversing the procedure used to tilt the patient. In other words, the pressure is increased to the side of the sacs to which the patient has been tilted, and decreased for the other side of the sacs until both sides of the sacs attain the first predetermined pressure profile.

The method of tilting or turning the patient also includes the step of restraining the patient from slipping off of the sacs while in the tilted condition. This is accomplished by the unique construction of the multi-chambered sacs and the manner in which the sacs are depressurized and deflated. The grommet which defines the hole connecting each intermediate chamber with each end chamber plays a particularly important role in the ability of each sac to restrain the patient from slipping off of the sac during tilting. As the pressure control valve controlling the side of the sac to which the patient is to be tilted begins to close, it reduces the pressure being supplied to this side of these sacs. Thus, the pressure being supplied to the end chamber and the intermediate chamber connected thereto via the flow restriction passage defined through the grommet are both being reduced in pressure. Recall that the microprocessor presets the pressure in the sac depending upon the height and weight of the patient. Once the pressure is reduced from that preset pressure, the weight of the patient above the intermediate chamber begins to squeeze the air from the intermediate chamber through the grommet and into the end chamber. This reduction in pressure results in the deflation of the intermediate chamber while the end chamber continues to remain fully inflated, though at the same reduced pressure as the connected intermediate chamber. Since the end chamber remains inflated, it remains vertically disposed at the end of the sac, and as such the inflated end chamber acts as a constraint that prevents the patient from rolling past the end chamber and slipping off the sacs of the patient support.

In further accordance with the present invention, a method is provided for using the patient support system of the invention to provide pressure point relief between the sacs and the patient by operating the patient support in a pulsation mode of operation. As embodied herein, the method for providing pressure point relief preferably includes the step of configuring the patient support system so that in each body zone, every alternate sac is pressurized via one pressure control valve and every other alternate sac is pressurized via a second pressure control valve. This step preferably is accomplished by configuring the flow diverter valve to reconfigure the flow path to connect every other adjacent sac in each zone to a separate pressure control valve. The next step of the method includes supplying air pressure at a first pressure profile to the sacs connected to one of the pressure control valves and supplying the sacs connected to the other pressure control valve at the same first pressure profile.

The method for pulsating the pressure in the sacs further includes the step of decreasing the pressure being supplied to the sacs through one of the pressure control valves during a first interval of time. The pressure is decreased until a predetermined second pressure profile is being provided to the sacs in this first group, which includes every alternate sac.

The method of pulsating the pressure in the sacs also includes the step of increasing the pressure being supplied to the sacs through the other of the pressure control valves during the same first interval of time. The pressure is increased until a predetermined third pressure profile is being provided to the sacs in this second group, which includes the other set of alternating sacs. Preferably, the third pressure profile is determined so that the average of the second and third pressure profiles equals the first pressure profile.

The method for pulsating the pressure in the sacs next includes the step of maintaining the first group of alternating sacs at the second pressure profile while maintaining the sacs in the second group of alternating sacs at the third pressure profile. This maintenance step occurs over a second interval of time.

The method for pulsating the pressure in the sacs next includes the step of increasing the pressure in the first group of alternating sacs until the third pressure profile is attained while decreasing the pressure being supplied to the sacs in the second group of alternating sacs until the second pressure profile is attained for the second group of alternating sacs. Thus, the pressure profiles of the two groups of alternating sacs are reversed during a third interval of time.

Finally, the method of pulsating the pressure in the sacs includes the step of maintaining the sacs in the first group of alternating sacs at the third pressure profile while maintaining the sacs in the second group of alternating sacs at the second pressure profile. This maintenance step of the method occurs during a fourth interval of time. This completes one full cycle of pulsation, and this can be repeated as long as the repetition is deemed to be therapeutic. Preferably, the time intervals are equal. However, the intervals of time can be selected as desired. For example, the first and third intervals of time during which the pressure is changing in the sacs can be selected to be equal and very short. The second and fourth intervals of time during which the two groups of alternating sacs are maintained at different pressure profiles can also be selected to be equal and can be longer periods of time than the first and third intervals. It also is possible to choose long periods of time for the first and third intervals and short periods of time for the second and fourth intervals.

The foregoing discussion of the pulsation mode according to the present invention is but an example of how pulsation may be achieved and is not intended to limit the invention. For example, pulsation may be achieved so that pressure in the alternating sacs never falls below the first pressure profile of the sacs.

The foregoing discussion of the multi-modal bed employing multi-chambered inflatable sacs is of a preferred system with which the vibratory therapy system may be included. However, it should be appreciated that the vibratory patient support system of the present invention may be utilized in a far less complex supporting structure. For instance, the inflatable cells or other vibratory means may be used with a single chamber air sac on a support structure having only a static or constant pressure mode of operation. Likewise, the bed need not be articulatable. The vibrating means need not operate over the entire patient support surface but, preferably, just over the chest area of the surface.

The accompanying drawings which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the present preferred embodiments of the present invention, examples of which are illustrated in the accompanying drawings. As used herein, air tightly is a relative phrase that refers to essentially no air leakage at the operating air pressures of the present invention.

Figure 1:
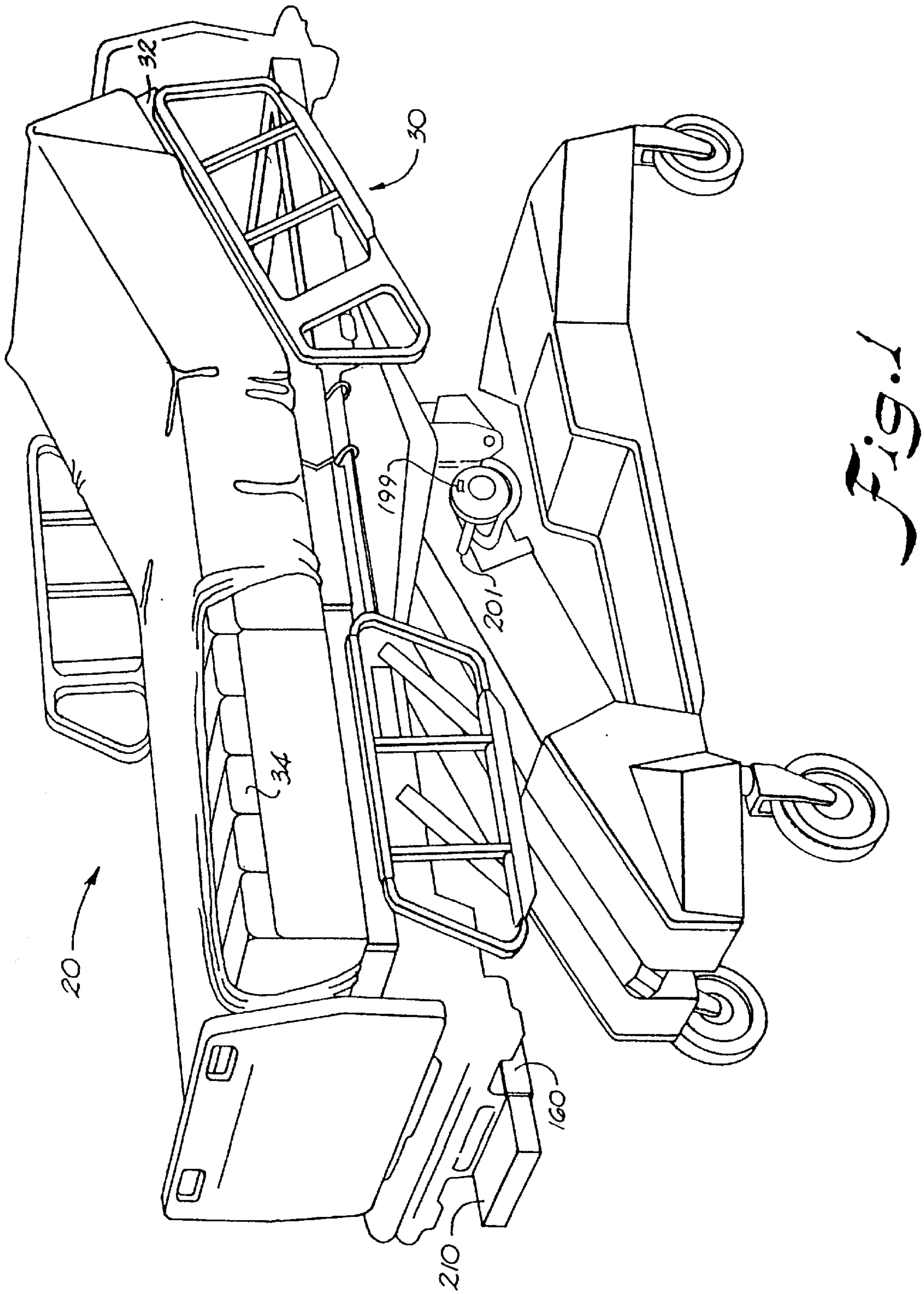
FIG. 1 is a perspective view of a preferred embodiment of the present invention.

The preferred embodiment of the modular low air loss patient support system is shown in FIG. 1 and is generally designated by the numeral 20.

The patient support system of the present invention preferably includes a frame, indicated generally in FIG. 1 by the numeral 30, having at least one articulatable section 32. The frame carries the components of the patient support system and typically has more than one articulatable section and preferably is mounted on castors for ease of movement in the hospital environment. The hydraulic lifting mechanisms for raising and lowering portions of the frame, including the articulatable sections of the frame, are conventional, and suitable ones are available from Hillenbrand Industries of Batesville, Ind., sold under the Hill-Rom brand.

Figure 2:
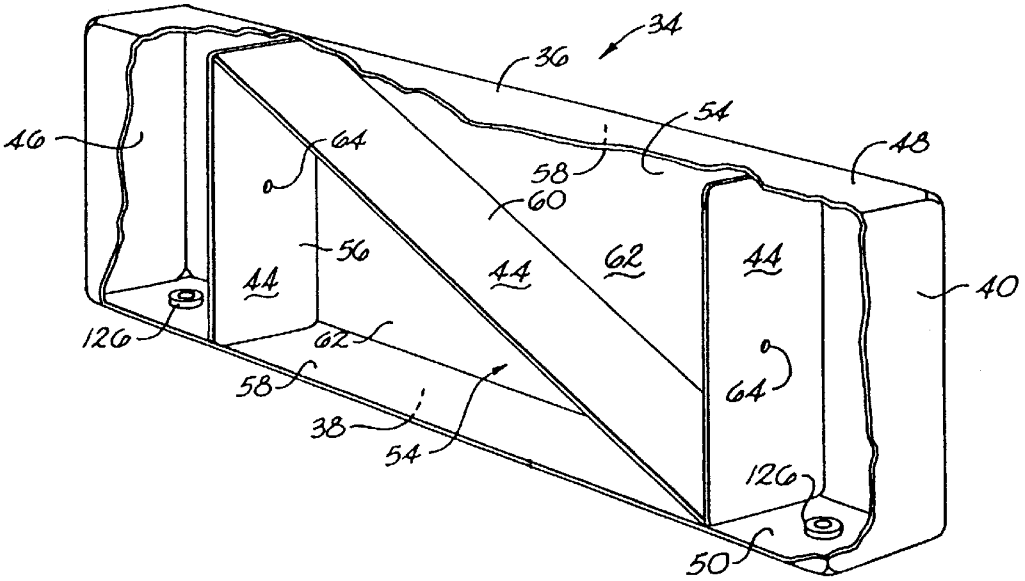
FIG. 2 shows a cut-away perspective view of a preferred embodiment of components of the present invention.
Figure 5:
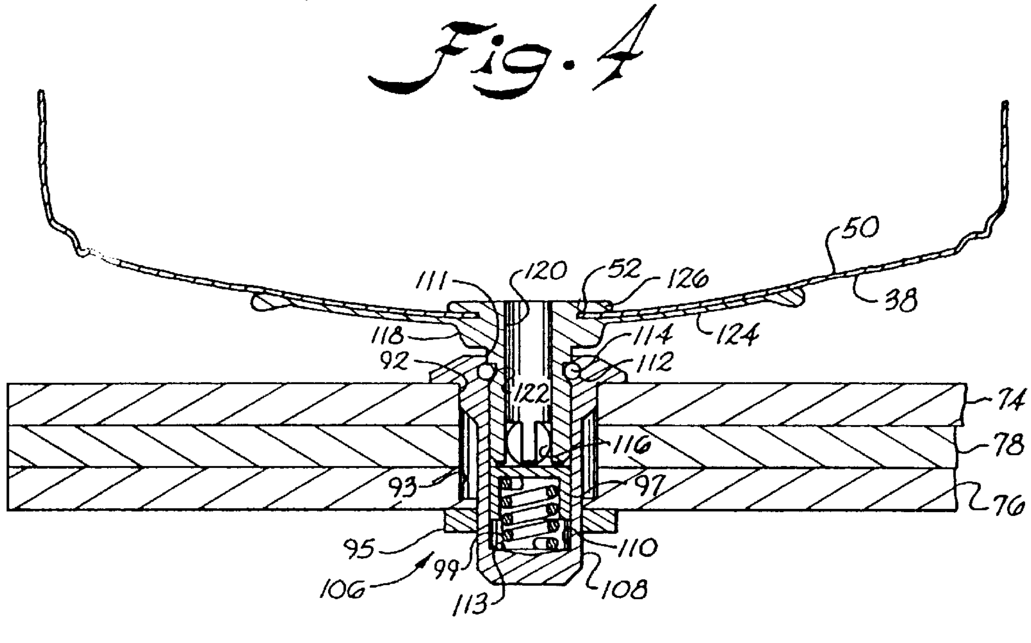
FIG. 5 illustrates a partial cross-sectional view with the viewer's line of sight taken generally along the lines 5—5 of FIG. 4.

In accordance with the present invention, a plurality, preferably seventeen in the illustrated embodiment (FIGS. 12 and 13), of elongated inflatable sacks are provided. As shown in FIG. 2 for example, each of the sacks 34 of the present invention preferably has a multi-chamber internal configuration, and preferably four chambers are provided. In one embodiment shown in the drawings, the shape of each inflated sack is generally rectangular and preferably has exterior dimensions thirty-two inches long, ten and one-half inches high, and four and one-half inches thick. The patient support surface of each sack is provided by a top 36 which measures four and one-half inches by thirty-two inches, and a bottom 38 (FIG. 3) is similarly dimensioned. Depending upon their location on the patient support, the sack may include a plurality of pin holes (not shown) to allow a small amount of air to bleed from the sack. The diameters of the holes preferably are about fifty thousandths of an inch, but can be in the range of between eighteen to ninety thousandths of an inch. Each exterior end 40 of each sack measures ten and one-half inches by four and one-half inches, and each exterior side 42 measures ten and one-half inches by thirty-two inches. Each sack is preferably integrally formed of the same material, which should be gas tight and capable of being heat sealed. The sacks preferably are formed of twill woven nylon which is coated with urethane on the surfaces forming the interior of the sack. The thickness of the urethane coating is in the range of three ten thousandths of an inch to two thousandths of an inch. Vinyl or nylon coated with vinyl also would be a suitable material for the sack. Unless the sacks are designed to be disposable, the material should be capable of being laundered. Internally, the sack preferably is configured with four separately defined chambers. As shown in FIG. 2 for example, the internal webs 44 of each sack preferably are integral with the outside walls of each sack, and are at least joined in airtight engagement therewith. An end chamber 46 is disposed at an opposite end of each sack. Each end chamber is generally rectangular in shape with one of the narrow ends 48 formed by a portion of the top of the sack, and the opposite narrow end 50 formed by a portion of the bottom of the sack. As shown in FIG. 5 for example, the narrow end of each end chamber forming a section of the sack bottom is provided with a sack air entrance opening 52 through the bottom of the sack.

As shown in FIG. 2 for example, each multi-chamber sack includes a pair of intermediate chambers 54 disposed between the end chambers. Each intermediate chamber preferably is shaped as a right-angle pentahedron. Each intermediate chamber 54 has a base wall 56, an altitude wall 58, a diagonal wall 60, and two opposite triangular-shaped side walls 62. Each base wall, altitude wall, and diagonal wall has a generally rectangular shaped perimeter. Each base wall 56 is connected at a right angle to each altitude wall 58. Each diagonal wall 60 is connected at one edge to each base wall and at an opposite edge to the altitude wall. The edges of each triangular side wall are connected to oppositely disposed edges of the base, altitude, and diagonal walls. As shown in FIG. 2 for example, each intermediate chamber is disposed within each sack so that its diagonal wall faces toward the center of the sack and toward the other intermediate chamber. One of the intermediate chambers is disposed above the other intermediate chamber so that it becomes conveniently referred to as the upper intermediate chamber, while the other intermediate chamber becomes the lower intermediate chamber. The altitude wall of the upper intermediate chamber preferably is formed by a middle section of the top 36 of the sack 34. The altitude wall of the lower intermediate chamber preferably is formed by the middle section of the bottom 38 of the sack 34. As shown in FIG. 1 for example, each sack preferably is disposed to extend transversely across the longitudinal centerline of the patient support, and the intermediate chambers are disposed in the center of each sack. Thus, the intermediate chambers also are disposed to extend transversely across the longitudinal centerline of the patient support. As shown in FIG. 2 for example, one of the intermediate chambers is disposed at least partly above the other intermediate chamber and preferably is disposed completely above the other intermediate chamber. Because of the symmetrical position of each sack relative to the longitudinal centerline of the patient support system, one of the intermediate chambers is disposed predominately to the left side of the centerline and has a minority portion disposed to the right side of the centerline. Similarly, the other of the intermediate chambers is disposed predominately to the right side of the longitudinal centerline of the patient support and has a minority portion disposed to the left of the centerline.

Each sack has a pair of restrictive flow passages, one connecting each of the end chambers to the adjacent intermediate chamber. As shown in FIG. 2 for example, preferably a single web serves as a common wall of an end chamber and the base wall of the adjacent intermediate chamber. As shown in FIG. 2 for example, each restrictive flow passage can be defined by a hole 64 through the web that is common to the intermediate chamber and the adjacent end chamber. Hole 64 preferably is defined by a grommet having an opening therethrough and mounted in a web that forms both the base wall of an intermediate chamber and the vertically disposed internal side wall of the end chamber adjacent the intermediate chamber. The grommet is sized to ensure that the end chambers have filling priority over the intermediate chambers and thus are the first to fill with air and the last to collapse for want of air. For sacks dimensioned as described above for example, a grommet having a ¼ inch diameter opening has been suitable for achieving the desired filling and emptying priority.

In further accordance with the present invention, means are provided for supplying gas, preferably air, to each sack of the patient support system of the present invention. As embodied herein and shown schematically in FIG. 12 for example, the means for supplying air to each sack preferably includes a blower 66 powered electrically by a motor which runs on a low direct current voltage such as 24 volts. The blower must be capable of supplying pressurized air to the sacks at pressures as high as 30 inches of standard water but should be capable of supplying pressures in a preferred range of 0 to 18 inches of standard water while operating in the blower's optimum performance range.

Figure 12:
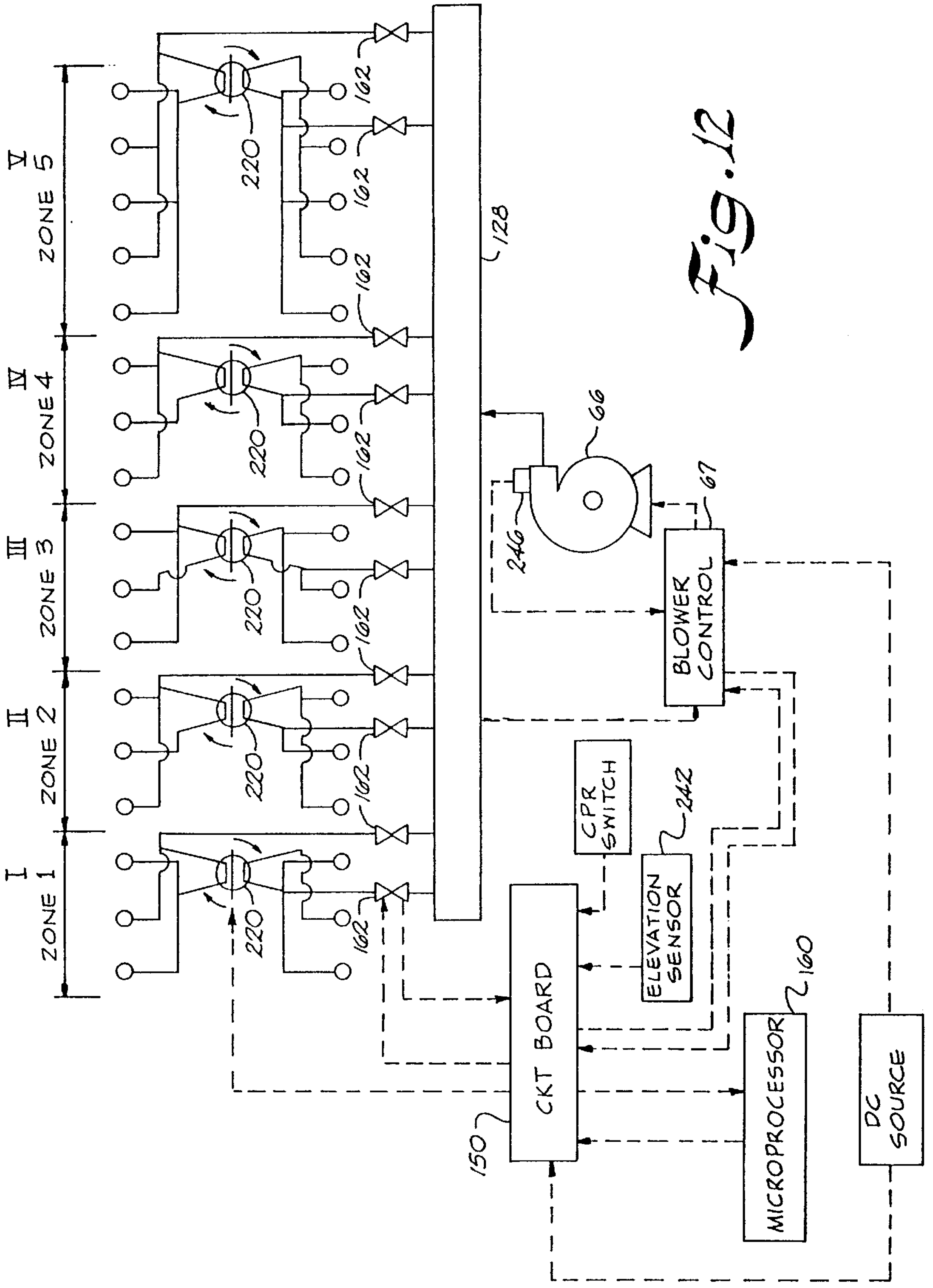
FIG. 12 shows a schematic view of components of an embodiment of the present invention.

As shown in FIG. 12 for example, a pressure transducer 246 measures the pressure at the blower outlet. The measured pressure signal is transmitted to a microprocessor (described hereafter) via a blower control circuit 67 and a circuit board 150 (described hereafter). Blower 66 preferably is controlled by voltages supplied by a blower control circuit 67 which receives a control voltage signal from the microprocessor via a circuit board 150. The microprocessor is preprogrammed to compare the pressure signal received from pressure transducer 246 to a desired pressure signal calculated by the microprocessor. Depending upon the result of the comparison, the microprocessor regulates the power supply to the blower control circuit. However, the methodology used by the microprocessor to compare the calculated pressure to the measured pressure contains a built-in delay (preferably about three seconds) so that the response to changes in the measured blower pressure is not instantaneous. The deliberate time delay in the response to the measured blower pressure assures control loop stability and prevents unwarranted pressure fluctuations in the sacks. Otherwise, instantaneous real time pressure corrections in response to the blower output pressure and control valve output pressure could cause pressure oscillations in the system.

Figure 4:
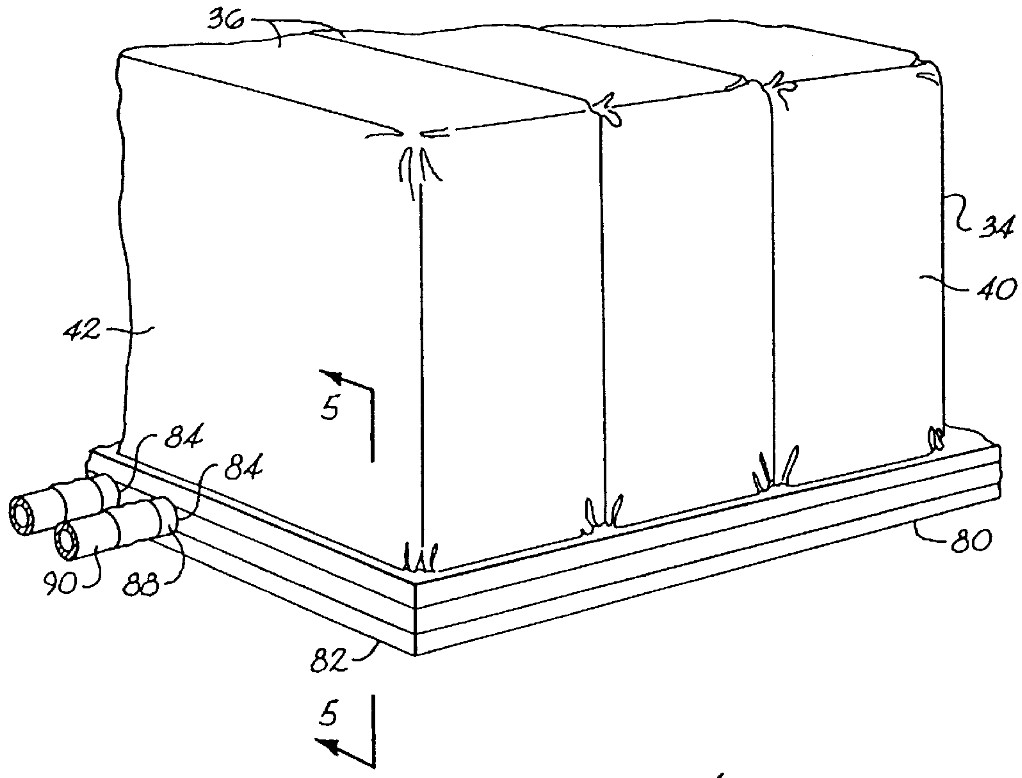
FIG. 4 illustrates a partial perspective view of components of an embodiment of the present invention.
Figure 13:
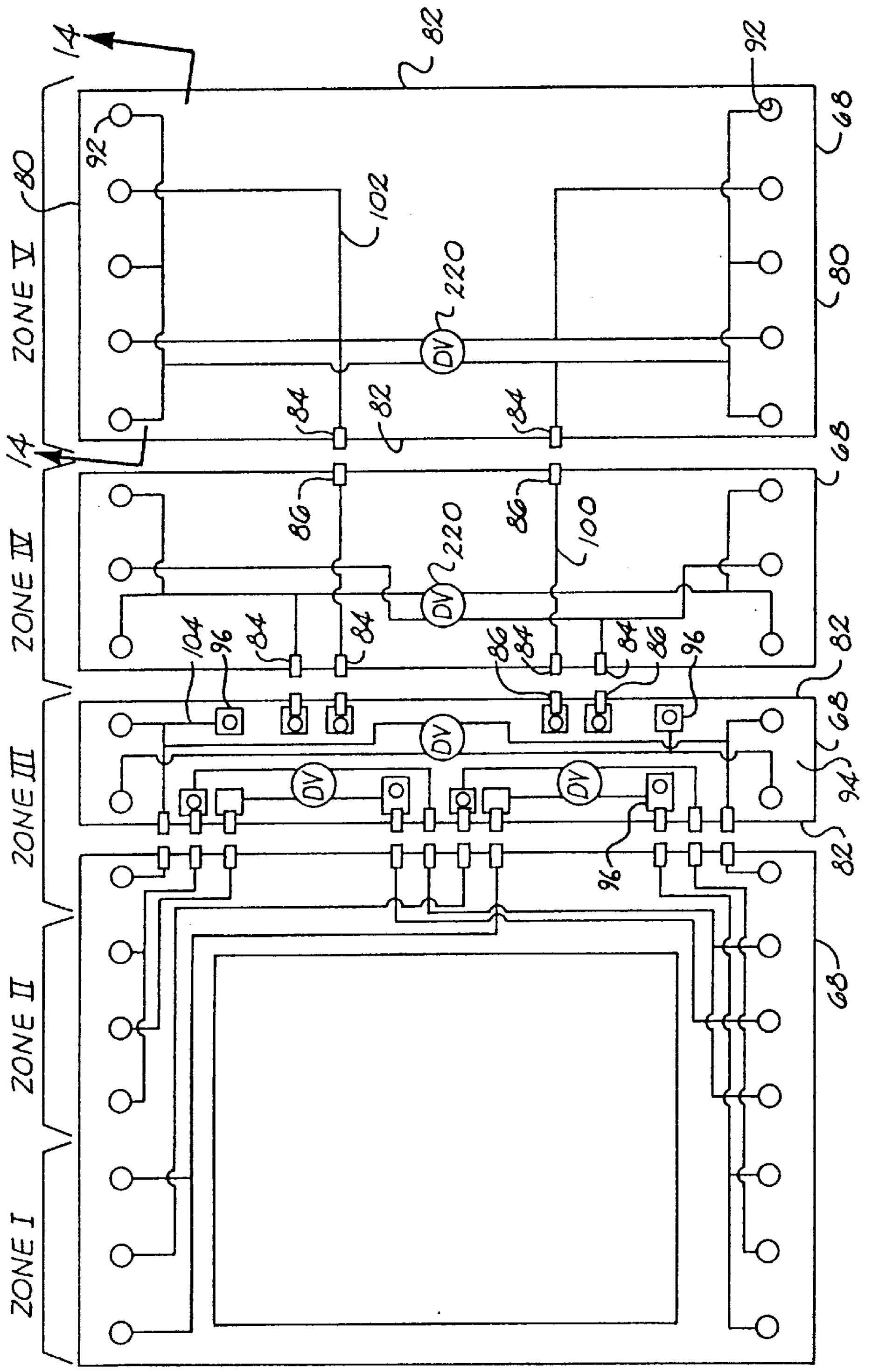
FIG. 13 illustrates a schematic view of a components of an embodiment of the present invention.
Figure 14:
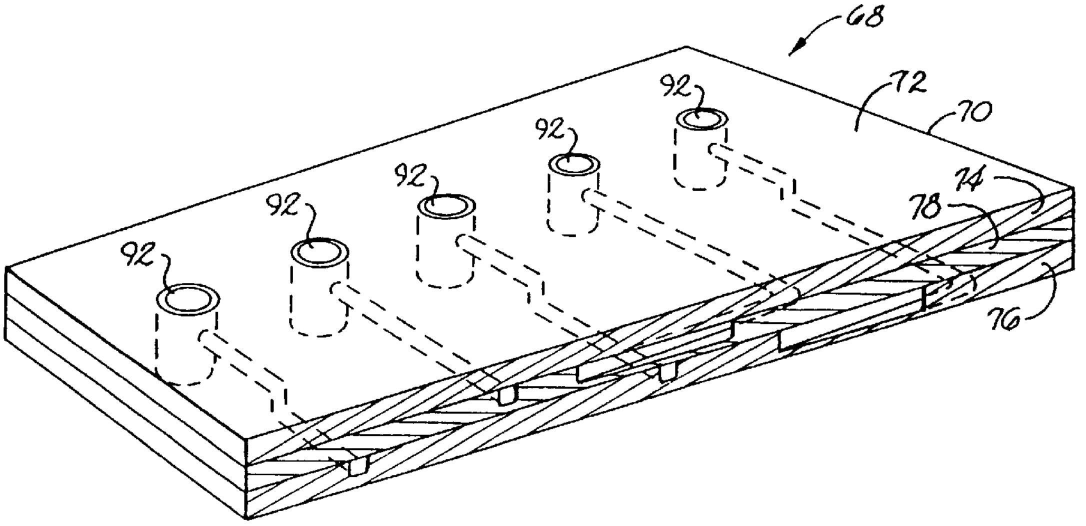
FIG. 14 illustrates a cut-away perspective view of a component of the present invention as if it were taken along the lines 14—14 in FIG. 13.

As embodied herein and shown in FIGS. 4, 5, and 14, and schematically in FIGS. 12 and 13, the means for supplying air to each sack preferably further includes a support member carried by the frame. The support member preferably is rigid to provide a rigid carrier on which to dispose sacks 34 and may comprise a plurality of separate non-integral sections so that a one-to-one correspondence exists between each support member section and each articulatable section of the frame. As shown in FIG. 14 for example, each section of the rigid support member preferably comprises a modular support member 68 and defines a multi-layered plate 70. Each plate 70 preferably is thin and has a flat top surface 72 and an opposite bottom surface, which also preferably is flat. As shown in FIG. 14 for example, each plate has an upper layer 74, a lower layer 76, and a middle layer 78 disposed between the upper and lower layers. As shown partially in FIG. 4 for example, the three layers are sealed around the edges to form two opposed ends 80 and two opposed side edges 82 joining between the ends.

As shown in FIGS. 4 and 13 for example, a plurality of inlet openings 84 are defined through at least one of the side edges 82. As shown in FIG. 13 for example, depending upon the relative position of the modular support member, some of the modular support members have a plurality of outlet openings 86 defined in an opposite side edge 82. The modular support manifold of Zone IV for example also has a plurality of outlet openings 86 defined through the other of the side edges, while the modular support manifold of Zone V only has inlet openings 84 defined through one of the side edges 82, and lacks outlet openings on the opposite side edge. As partially shown in FIG. 4 for example, the inlet openings 84 of one plate 70 are engaged by fittings 88 and flexible hoses 90 to become connected to the outlet openings 86 of an adjacent modular support member.

As shown in FIGS. 5 and 14, and schematically in FIG. 13, for example, the upper layer defines a plurality of air sack supply openings 92 which extend through the top surface of each plate 70, and preferably through all three layers of plate 70. As shown in FIG. 5 for example, these air sack supply openings 92 are used to hold a special connection fitting (described hereafter) that connects the air sacks to a supply of controlled pressurized air.

As shown schematically in FIG. 13 for example, at least one of the modular support members defines a seat sack support member 94 (Zone III) and includes a plurality of pressure control valve openings 96 defined through the lower layer 76 and extending through the bottom surface of the plate 70. Each pressure control valve opening 96 is configured to be connected to a pressure control valve (described hereinafter). Each of the ten pressure control valve openings 96 shown in FIG. 13 is schematically represented by a circle inscribed within a box. To avoid unnecessarily cluttering FIG. 13, only three of the pressure control openings are provided with designating numerals 96. Preferably, one end of a rigid elbow 98 (FIGS. 7 and 8) has a flexible bellows (not shown) which is connected to each pressure control valve opening 96, and the other end of the elbow is connected to the output end of the pressure control valve. The seat sack support member preferably includes at least one pressure control valve opening for each pressure control valve required by the particular configuration of the patient support system. Each pressure control valve opening intersects with a channel (described hereafter) for supplying air to the air sacks.

Figure 11:
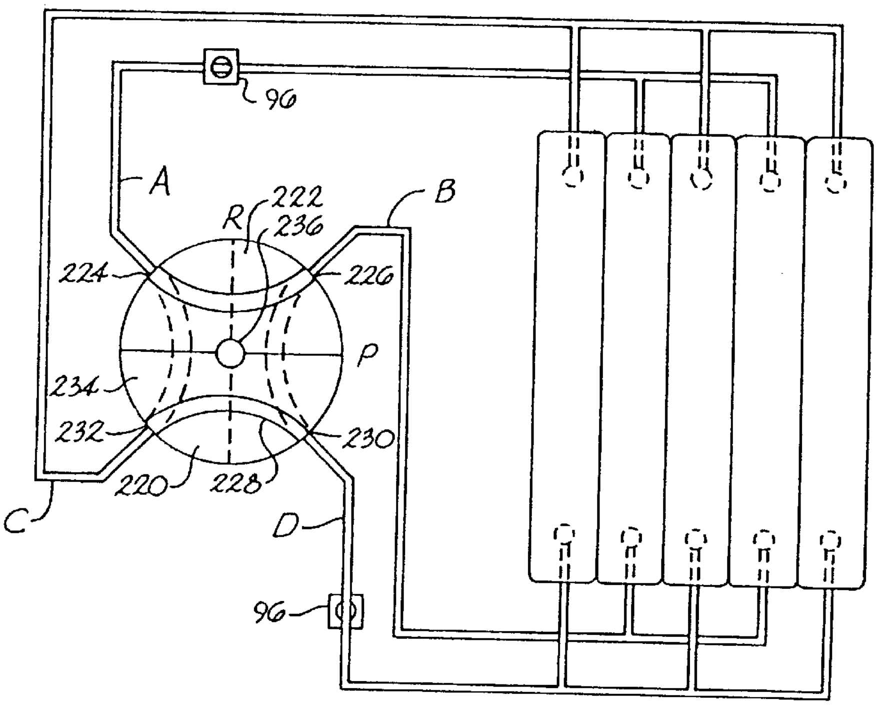
FIG. 11 illustrates a schematic view of components of an embodiment of the present invention.

As shown in FIGS. 5 and 14, and schematically in FIGS. 11–13, for example, the layers of each plate 70 preferably combine to define a plurality of separated enclosed channels therethrough. In an alternative embodiment, the channels can be formed by discrete flexible tubes. The channels are airtight and perform the function of conduits for the transport of pressurized air from the source of pressurized air to the air sacks. The multi-layer construction of plate 70 allows some channels to cross one another without intersecting, if the air flow configuration requires same. As shown schematically in FIG. 13 for example, some channels 100 connect one of the inlet openings 84 of plate 70 to one of the outlet openings 86 defined through the opposite side edge 82 of the plate 70. Some of the channels 102 connect one of the inlet openings 84 defined through one of the side edges 82 to one or more of the sack supply openings 92 defined through the top surface of the plate 70 of the modular support member. Each air sack supply opening 92 communicates with at least one of the channels. Other channels 104 include one of the pressure control valve openings 96.

Figure 3:
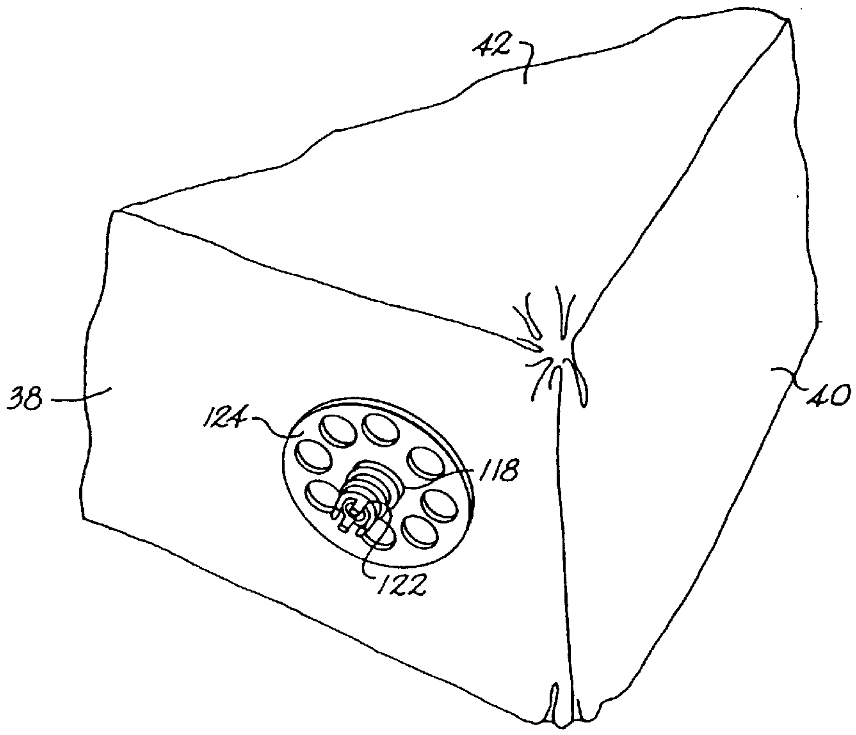
FIG. 3 illustrates a partial perspective view of a portion of a component of an embodiment of the present invention.

As embodied herein and shown in FIGS. 2, 3 and 5 for example, the means for supplying gas to the sacks preferably includes a hand-detachable airtight connection, an embodiment of same being designated generally in FIG. 5 by the numeral 106. The connection comprises two components, one secured to the air sack 34, and the other secured to the modular support member 70. The force required to insert one of the components into the other component and to disconnect the components from one another is low enough to permit these operations to be accomplished manually by hospital staff without difficulty. Accordingly, both components of the hand-detachable connection 106 preferably are formed of a semi-rigid plastic material with an elastic O-ring 114 secured within the interior of a female connection fitting 108.

As shown in FIG. 5 for example, the component secured to the modular support member comprises an elongated female connection fitting 108 having an exterior configured to engage airtightly with the air sack supply opening 92 defined through the plate 70. A plenum 93 is defined between the exterior of fitting 108 and air sack supply opening 92. A lower end of the connection fitting extends through the air sack supply opening 92, and a locking nut 95 screws onto this end of the fitting to secure same within the air sack supply opening of the modular support member.

The female connection fitting 108 has an interior configured with a hollow axially disposed coupling opening 110, preferably a cylinder, to receive a coupling in airtight engagement therewith. A cylindrical poppet 97 is disposed in the cylindrical coupling opening and is configured to slide within the cylindrical coupling opening. Poppet 97 is closed at one end, and a spring rests between the bottom 113 of the interior of fitting 108 and the interior of the closed end of poppet 97. The spring-loaded poppet is thereby biased to seal off the entrance 111 of coupling opening 110.

The connection fitting further defines a fitting groove 112 completely around the interior of the fitting and preferably near the entrance 111 of coupling opening 110. The connection fitting also includes a resiliently deformable flexible O-ring 114 held in the fitting groove 112. As shown in FIG. 5 for example, the coupling cylinder 110 defined in the interior of the connection fitting further includes a channel opening 116 defined therethrough and in a direction normal to the axis of the coupling cylinder 110. Because of plenum 93, the connection fitting is always disposed in the air sack supply opening 92 so that the channel opening 116 communicates with the channel 102 that connects to the air sack supply opening 92.

As shown in FIGS. 2, 3, 5, and 6 for example, the other component of the hand-detachable connection includes an elongated coupling 118 that the air entrance opening 52 of the sack and extends outwardly from the sack. The coupling has an axial opening 120 defined therethrough to permit air to pass through same and between the interior and exterior of the sack. The exterior of coupling 118 is configured to be received within the interior of the connection fitting. The exterior of the coupling has a groove 122 therearound that is configured to seat around and seal against the deformable O-ring 114 of the connection fitting 108 therein when the coupling is inserted into the connection fitting in airtight engagement with the fitting. Groove 122 provides a locking detent to mechanically lock and seal O-ring 114 therein.

Figure 6:
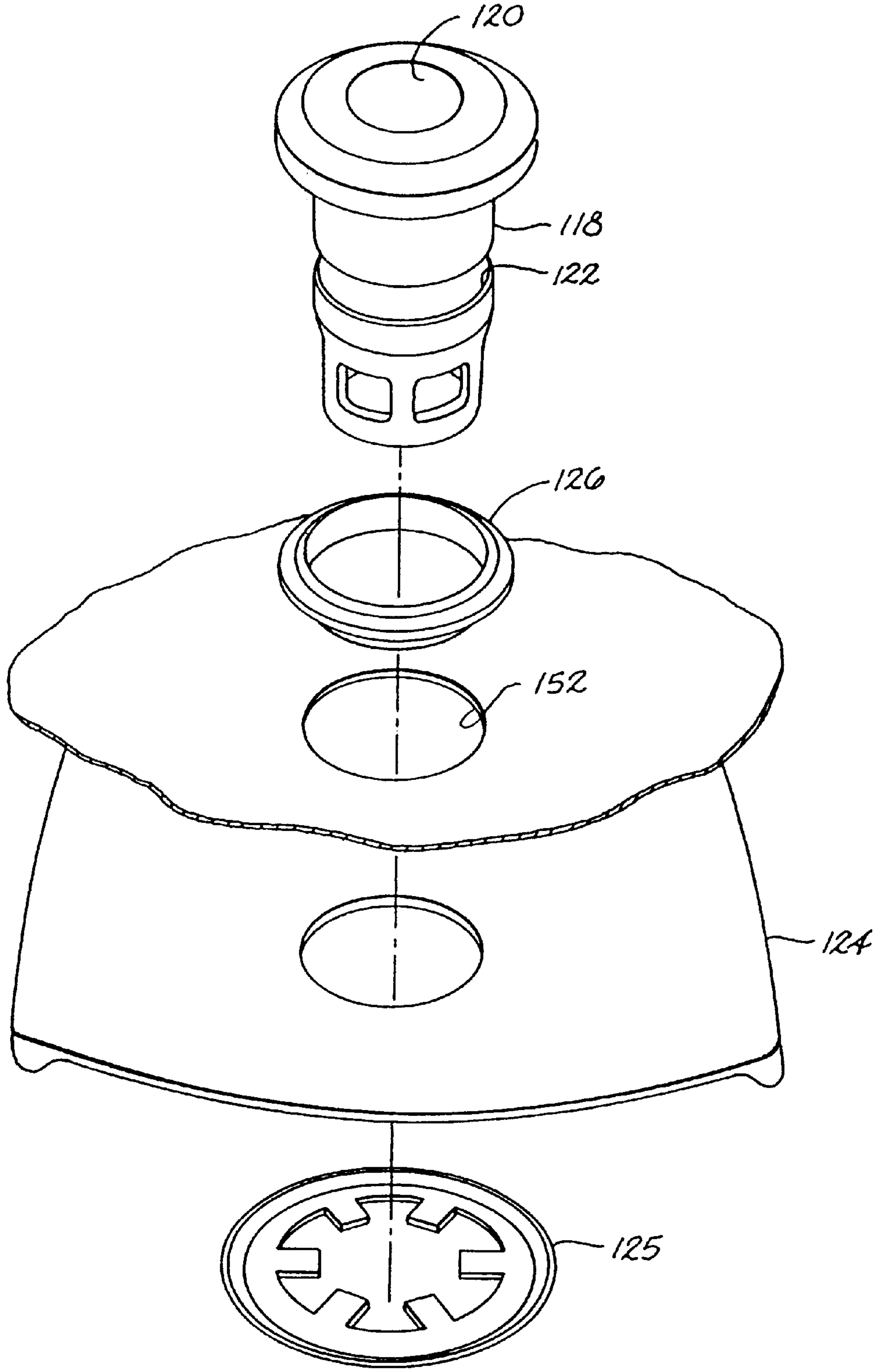
FIG. 6 illustrates perspective assembly view of embodiments of components of the present invention.

As shown in FIG. 6 for example, the coupling is secured to extend from the air entrance opening 52 of the air sack with the aid of a grommet. 126 and a retaining ring 125. The grommet 126 is heat sealed to the fabric of the air sack on the interior surface of the air sack around the air entrance opening. The coupling extends through the grommet 126 and the air entrance opening. A pull tab 124 is fitted over the coupling and rests against the exterior surface of the air sack. Alternative embodiments of pull 124 are shown in FIGS. 3 and 6 for example. A retaining ring 127 is passed over the coupling and mechanically locks against the coupling in air-tight engagement with the air sack. The pull tab 124, which is sandwiched between retaining ring 127 and the sack, can be grasped by the hand of a person who desires to disconnect the coupling from the fitting. In this way, the material of the air sack need not be pulled during disconnection of the coupling from the fitting. This prevents tearing of the air sack near the air entrance opening during the disconnection of the coupling from the fitting.

As shown in FIG. 5 for example, connection fitting 108 preferably includes a poppet 97 that is a spring loaded cylindrical member disposed concentrically within coupling cylinder 110 so that one end of the spring 99 rests against the closed end of the poppet, and the other end of the spring rests against the bottom 113 of the interior of connection fitting 108. Thus, when coupling 118 is inserted into coupling cylinder 110, coupling 118 depresses poppet 97 and connects channel opening 116 to axial opening 120 of coupling 118. When no coupling 118 is inserted into coupling cylinder 110, the spring forces the poppet to seal against O-ring 114 and thereby seal the coupling cylinder opening 110 at the entrance 111 thereof near the top layer 74 of plate 70. This permits one sack to be detached while air is being supplied to the others without leakage of air through the coupling cylinder opening 110. The sealing effect of the poppet also prevents fluids from entering the channels of plate 70, and this is advantageous during cleaning of the upper surfaces of plate 70.

Figure 10:
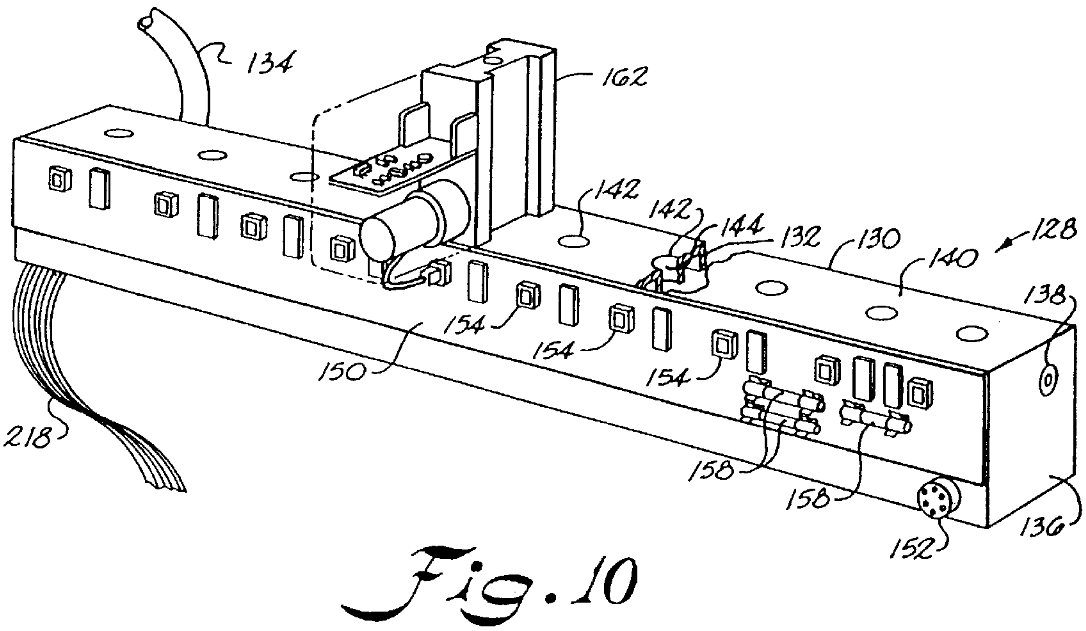
FIG. 10 illustrates a perspective view of components of an embodiment of the present invention.

In keeping with the modular configuration of the patient support system of the present invention, the means for supplying air to each sack further preferably includes a modular manifold for distributing air from the blower to the sacks plugged into the modular sack support member. The modular manifold provides means for mounting at least two pressure control valves and for connecting same to a source of pressurized air and to an electric power source. Because its elongated shape resembles a "log," such modular manifold is sometimes referred to as the log manifold, and one embodiment is designated by the numeral 128 in FIG. 10 for example. Log manifold 128 includes an elongated main body 130 that is hollow and defines a hollow chamber 132 within same. As shown in FIG. 10 for example, main body 130 is shaped as a long rectangular tube which preferably is formed of aluminum or another light weight material such as a hard plastic or resin. As shown in FIG. 10, an air supply hose 134, which suitably is one and one quarter inches in diameter, carries pressurized air from blower 66 to chamber 132 of main body 130. A first end wall 136 is defined at one narrow end of main body 130, and a second end wall (not shown) is defined at the opposite end of main body 130. A conventional pressure check valve 138 such as shown in FIG. 13 for example, is provided in each end wall to permit technicians to gauge the pressure inside chamber 132.

Figure 7:
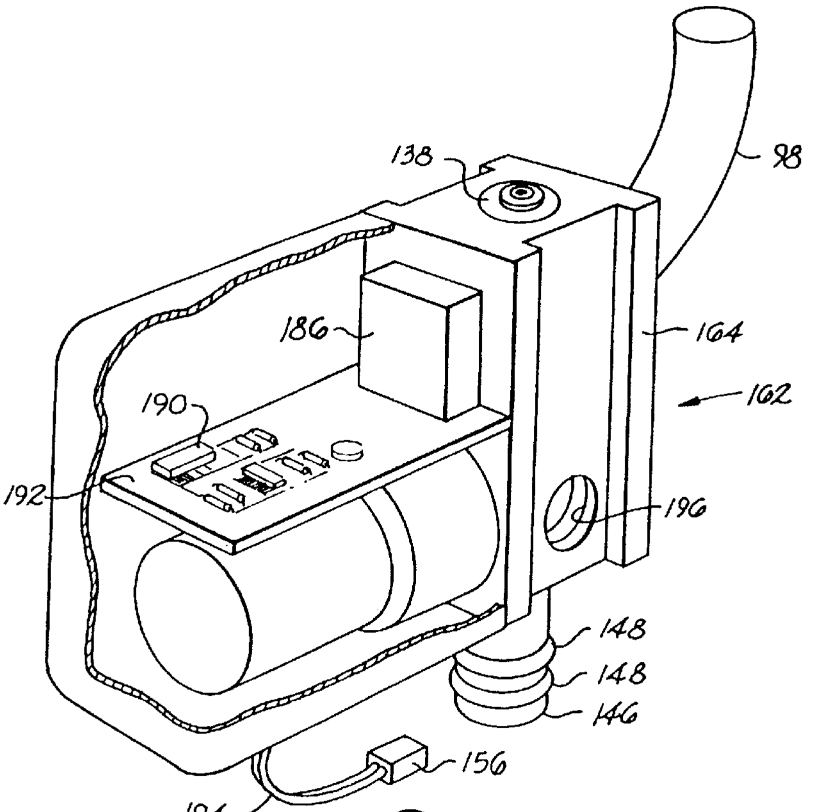
FIG. 7 illustrates a cut-away perspective view of an embodiment of a component of the present invention.
Figure 8:
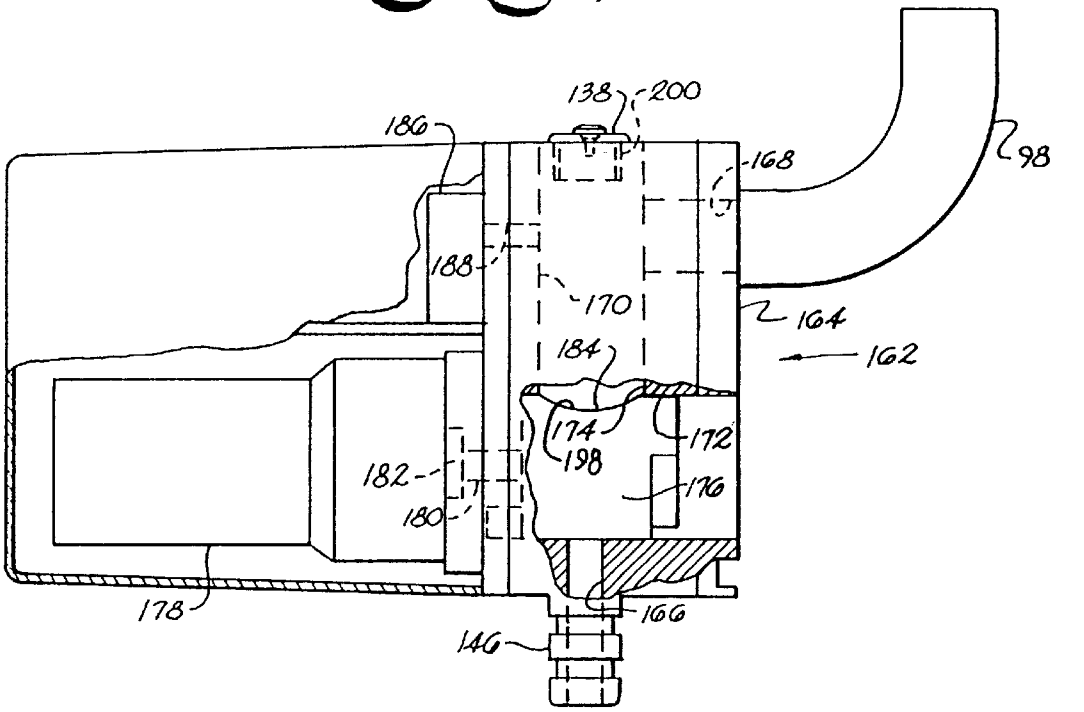
FIG. 8 illustrates a cut-away side view of the component like the one shown in FIG. 7.

One section of main body 130 defines a mounting wall 140 on which a plurality of pressure control valves 162 (such as shown in FIGS. 7 and 8 for example and described in detail hereafter) can be mounted. A plurality of ports 142 are defined through the mounting wall and spaced sufficiently apart from one another to permit side-by-side mounting of pressure control valves 162. Each port 142 has a bushing 144 mounted therein. The bushing is configured to receive and secure a valve stem 146 (FIG. 8) of a pressure control valve 162. As shown in FIG. 7 for example, valve stem 146 typically has one or more O-rings 148 engage with bushing 144 to form an airtight connection that nonetheless is easily detachable and engageable, respectively, by manual removal and insertion of the pressure control valve. This permits easy removal and replacement of the valve and reduces repair time and inoperative time for the patient support system as a whole.

The log manifold further includes a circuit board 150 preferably mounted on the exterior of the main body adjacent the mounting wall 140. As shown in FIG. 10 for example, an electrical connector 152 is provided for receiving a direct current power line to furnish electric power to operate circuit board 150. The circuit board includes a plurality of electrical connection fittings defined therein. Each electrical connection fitting 154 or plug outlet is preferably disposed in convenient registry with one of the ports 142 defined in the mounting wall. Electrical connection fittings 154 receive an electrical connector, e.g., plug 156, of a pressure control valve 162 to transmit electrical power and signals thereto to operate the various electrical components of the pressure control valve. In addition, a plurality of fuses 158 are provided on circuit board 150 to protect circuit board 150 and components connected thereto, such as a microprocessor 160 (described hereinafter), from electrical damage. As shown in FIG. 10 for example the fuse receptacles are on the exterior of the log manifold 128 to provide technicians with the unobstructed access that facilitates troubleshooting and fuse replacement.

In further accordance with the patient support system of the present invention, means are provided for maintaining a predetermined pressure in the sacks. The predetermined pressure is kept at a constant predetermined value for each of a number of groups of sacks in the standard mode of operation or may be constantly varying over time in a predetermined sequence in yet other modes of operation of the patient support system of the present invention. As embodied herein and shown schematically in FIG. 12 (in which electrical connections are shown in dashed lines and pneumatic connections are shown in solid lines, in both cases arrows indicate the direction of electrical or pneumatic flow) for example, the means for maintaining a predetermined pressure preferably includes a programmable microprocessor 160 and at least one and preferably a plurality of pressure control valves 162, each of the latter preferably monitored by a pressure sensing device (not shown in FIG. 12 separately from valves 162).

As embodied herein and shown in FIGS. 7 and 8 for example, the means for maintaining a predetermined pressure in the sacks includes a pressure control valve 162. Preferably, a plurality of pressure control valves are provided, and each valve 162 can control the pressure in a plurality of sacks 34 by means of being connected to a gas manifold (such as modular support member channels 100, 102, 104) which carries air from the pressure control valve to each of the sacks.

Each pressure control valve includes a housing 164, which preferably is formed of aluminum or another light weight material. As shown in FIG. 8 for example, an inlet 166 is defined through one end of the housing for receiving air flow from a source of pressurized air. An outlet 168 is also defined through the housing for permitting the escape of air exiting the pressure control valve. An elongated valve passage 170 is defined within the housing and is preferably disposed in axial alignment with the inlet. The passage has a longitudinal axis that preferably is disposed perpendicularly with respect to the axis of the valve outlet, which is connected to the valve passage. The valve housing further defines a chamber 172 disposed between the inlet and a first end 174 of the valve passage. The pressure control valve includes a piston 176 disposed in the chamber. The piston is displaceable in the chamber to vary the degree of communication through the chamber that is permitted between the valve inlet and the valve passage. The piston preferably is formed of a hard polymeric or resinous material such as polycarbonate for example. The pressure control valve further includes an electric motor 178 that preferably is mounted outside the housing and near the chamber.

The pressure control valve preferably includes means for connecting the motor to the piston in a manner such that the operation of the motor causes displacement of the piston within the chamber. As embodied herein and shown in FIG. 8 for example, the connecting means preferably includes a connecting shaft 180 that has one end non-rotatably secured to the rotatable shaft 182 of the motor 178. Connecting shaft 180 has its opposite end non-rotatably connected to one end of the piston. As shown in FIG. **9*b* for example, piston 176 has a groove 183 disposed diametrically through one end of the piston to non-rotatably secure the end of connecting shaft 180 therein. Chamber 172 preferably is cylindrical and has its longitudinal axis disposed perpendicularly relative to the longitudinal axis of the valve passage. The piston preferably is cylindrical and rotatably displaceable in the chamber with a close clearance between the piston and the chamber so as to minimize any passage of air thereby. One end of the piston has a cam stop 181 which engages a stop (not shown) in chamber 172 to restrict piston 176 from rotating 360 degrees within chamber 172. As the motor shaft 182 rotates, the connecting shaft 180 and piston 176 are rotatably displaced relative to the chamber. As shown in FIG. 8 for example, the piston has a flow slot 184 extending radially into the center of the piston so that depending upon the position of this slot 184 relative to the inlet and the passage, more or less flow is allowed to pass from the inlet 166, through this slot 184, and into the passage 170**. Thus, the position of the piston within the chamber determines the degree of communication that is permitted through the chamber and the degree of communication permitted between the valve passage and the valve inlet. This degree of communication effectively regulates the pressure of the air delivered by the valve.

Figure 9A:
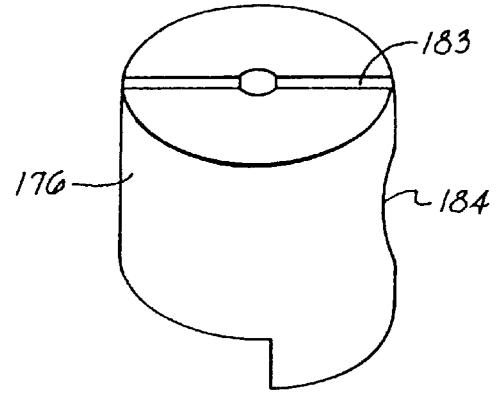
FIGS. 9*a*–9*d* illustrate different views of a preferred embodiment of a component of a device suitable for use in the present invention.
Figure 9B:
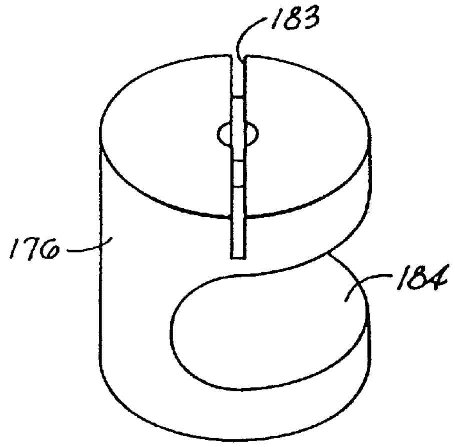
Figure 9C:
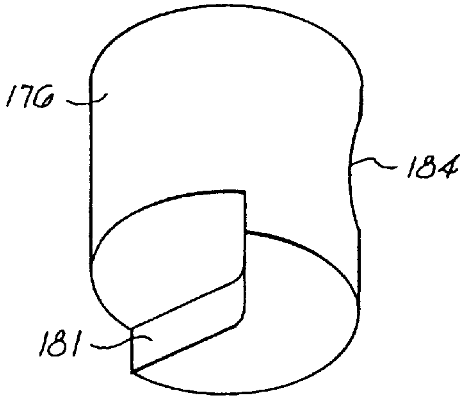
Figure 9D:
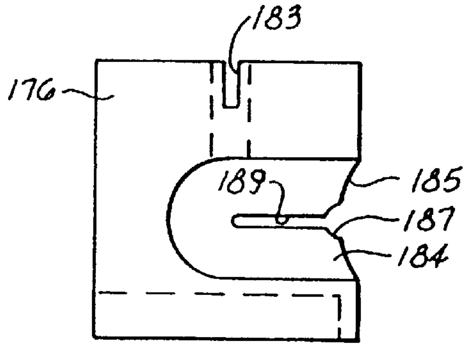

As shown in FIGS. **9*a*, 9*b*, 9*c*, and 9*d* for example, piston slot 184 preferably is configured to result in a linear relationship between the air flow permitted through the valve and the rotation of the piston. As shown in FIG. 9*d* for example, piston slot 184 preferably comprises three distinctly shaped sections. The section designated 185 is closest to the surface of the piston and is formed as a spheroidal section. The intermediate section is designated 187 and is formed as a semi-cylinder. The section extending deepest into the center of the piston is designated 189** and is formed as an elongated cylinder with a spherical end.

As shown in FIGS. 7 and 8 for example, the pressure control valve further preferably includes a pressure transducer 186 that communicates with the valve passage to sense the pressure therein. Preferably, the pressure transducer is mounted to the valve housing. An opening 188 is defined through the housing opposite where the outlet is defined. The pressure transducer has a probe (not shown) adjacent the opening to permit the transducer to sense the pressure in the valve passage. The pressure transducer converts the pressure sensed in the valve passage into an electrical signal such as an analog voltage, and this voltage is transmitted to an electronic circuit (described hereafter as a circuit card) of the valve.

As shown in FIG. 7 for example, the pressure control valve further includes an electronic circuit 190 which is mounted to the exterior of the housing on a circuit card 192. The valve circuit contains a voltage comparator network and voltage reference chips for example. The valve circuit controls the power being provided to the valve motor. The circuit card is connected to the valve pressure transducer and receives the electrical signals transmitted from the transducer corresponding to the pressure being sensed by the transducer in the valve passage. The circuit card receives a reference voltage signal from a microprocessor (described hereinafter) via circuit board 150. The microprocessor sends an analog-voltage signal to the valve circuit 190 via circuit board 150. The valve circuit compares this signal to the one from the pressure transducer and computes a difference signal. The valve circuit controls the valve motor 178 to open or close the valve according to the magnitude and sign (plus or minus) of the difference voltage signal.

As shown in FIG. 7 for example, the pressure control valve further includes an electrical lead 194 that is connected at one end (not shown) to the valve circuit card 192 and terminates at the other end in a plug 156. This plug can be connected into a plug outlet such as the electrical connection fitting 154 on the log manifold 128 and thus is consistent with the modular construction of the present invention.

As shown in FIG. 7 for example, the pressure control valve further defines a dump outlet hole 196 through the valve housing in the vicinity of the valve chamber. As shown in FIG. 8 for example, a dump passage 198 is defined through the valve piston and is configured to connect the dump hole to the valve passage upon displacement of the piston such that the dump hole becomes aligned with the dump passage of the piston.

As shown in FIG. 1 for example, a microswitch 199 is disposed near the hydraulic controls for changing the elevation of the patient support. When a control handle 201 is placed in the CPR mode of operation, microswitch 199 is activated, and the microprocessor turns off the blower and signals all of the valves to align the dump passage of the piston with the dump hole. This causes the rapid deflation of all of the air sacks and places the support into a condition suitable for performing a cardiopulmonary resuscitation (CPR) procedure on the patient.

Figure 16:
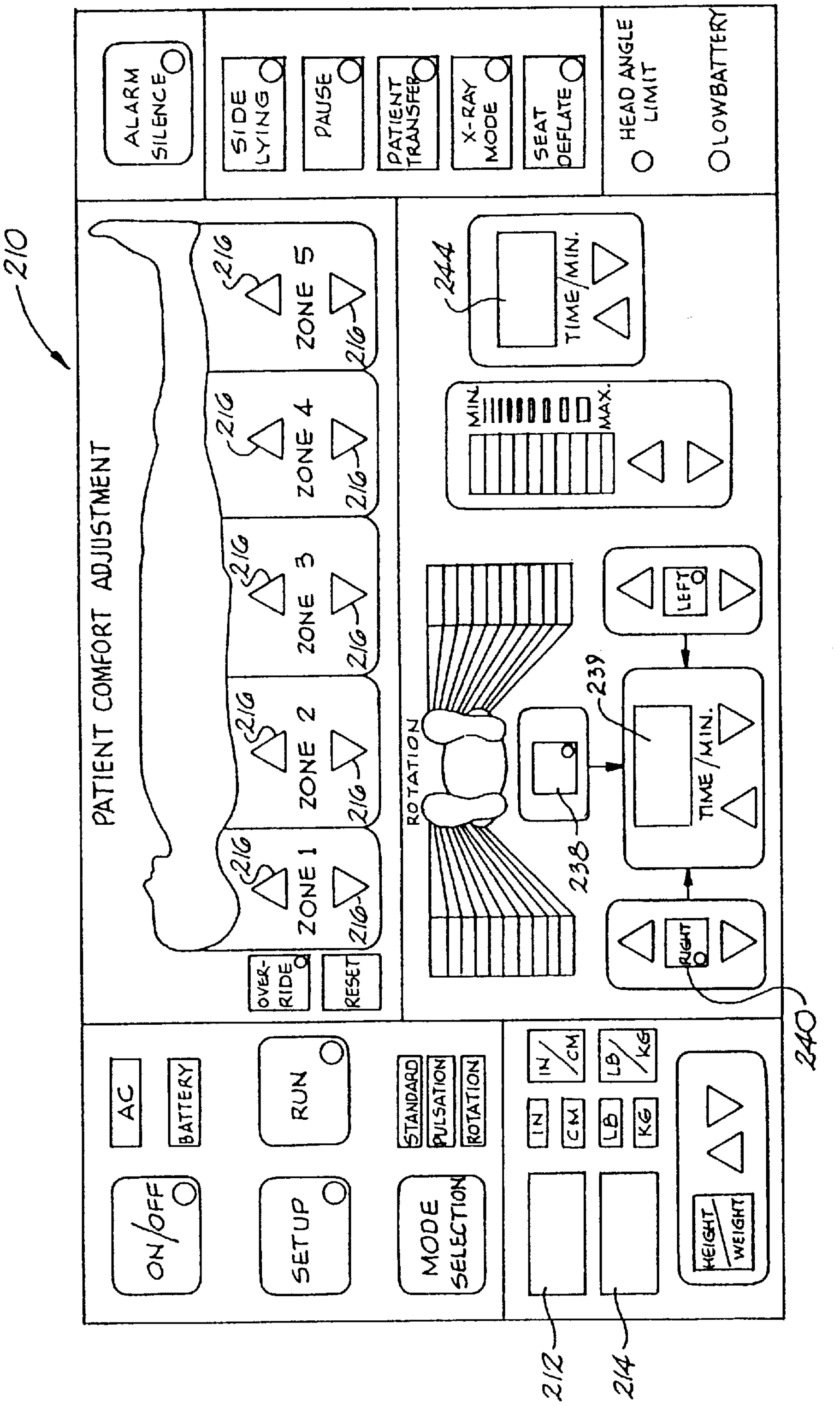
FIG. 16 illustrates an embodiment of a component of the present invention.

As shown in FIG. 16 for example, the control panel of the present invention has a button for SEAT DEFLATE. When the operator presses the SEAT DEFLATE button, the microprocessor activates the two pressure control valves which control the pressure in the sacks supporting the seat zone (Zone III shown in FIGS. 12 and 13 for example) of the support system. The microprocessor signals the pressure control valves controlling the seat zone to align their pistons' dump passages with the dump holes in the valve housings in order to permit all of the air in the sacks in the seat zone to escape to the atmosphere through the dump holes. As shown in FIG. 8 for example, when the valve pistons are aligned in this manner, the valve inlets are blocked by the pistons and thus prevented from communicating with the valve passages and valve outlets.

Figure 15:
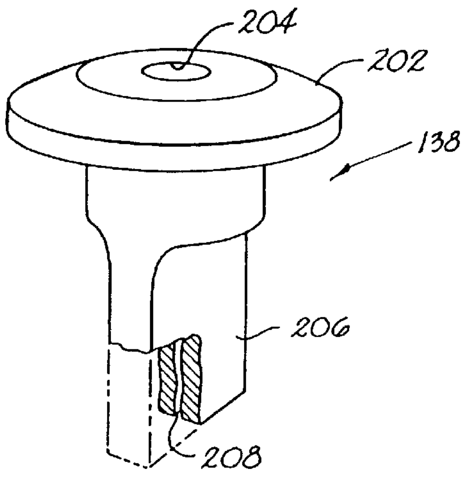
FIG. 15 illustrates a component used in an embodiment of the present invention.

As shown in FIG. 8 for example, a conventional pressure check valve 138 preferably is mounted in a manual pressure check opening 200 defined through the housing of each pressure control valve. As shown in FIG. 9, a conventional pressure check valve 138 also preferably is inserted into the end walls of log manifold 128. As shown in FIG. 15 for example, check valve 138 has a head 202 with a port 204 defined therethrough for receiving a probe of a pressure measuring instrument (not shown). A collapsible bladder flange 206 extends from head 202 to the opposite end of check valve 138. The bladder flange extends through the pressure check opening 200 in the housing of the pressure control valve. A slit 208 is formed axially through the collapsible bladder flange and connects to port 204. The bladder flange is resiliently collapsible around slit 208 to prevent passage of air therethrough. The probe of the measuring instrument is hollow and is inserted through port 204 until the probe parts the flange 206 to open the collapsible slit 208. This allows the probe to access the pressure in the control valve or chamber of the log manifold, as the case may be. Check valve 138 preferably is formed of a flexible material such as a soft plastic or neoprene rubber. One supplier of such check valves is Vernay Labs of Yellow Springs, Ohio 45387.

As embodied herein and shown schematically in FIG. 12 for example, the means for maintaining a predetermined pressure preferably includes a programmable microprocessor 160. The microprocessor preferably has parallel processing capability and is programmed to operate the pressure control valves in conjunction with the blower to pressurize the sacks according to the height and weight of the patient. The height and weight information is provided to the microprocessor by the operator. This is accomplished by providing the desired information via a control panel 210 such as shown in FIG. 16 for example. The height of the patient is displayed on a digital readout 212 in either inches or centimeters, and the weight of the patient is displayed on a separate digital readout 214 in either pounds or kilograms.

As shown in FIGS. 12 and 13 for example, five pressure zones or body zones preferably include a head zone (Zone 1 or I), a chest zone (Zone 2 or II), a seat zone (Zone 3 or III), a thigh zone (Zone 4 or IV), and a leg and foot zone (Zone 5 or V). Each body zone is supplied with pressurized air from the blower via two separate pressure control valves. In one configuration of the air flow path from the blower to the sacks, one of the pressure control valves controls air supplied to the chambers of each sack on one side of the patient support system for each body zone, and the other pressure control valve controls the air to the chambers on the side of each sack on the opposite side of the patient support system. In yet another configuration of the air flow path from the blower to the sacks, one of the pressure control valves controls the air supplied to all of the chambers of every alternate sack in a body zone, and the other pressure control valve controls the air supplied to all of the chambers in the remaining alternate sacks in the body zone.

The microprocessor is programmed to set the reference pressure of each pressure control valve of each body zone into which the patient support system has been divided for purposes of controlling the pressure supplied to air sacks 34 under particular portions of the patient. Based upon the height and weight of the patient, the microprocessor is preprogrammed to calculate an optimum reference pressure for supporting the patient in each body zone. This reference pressure is determined at the valve passage where the pressure transducer of each pressure control valve is sensing the pressure. The circuit card 192 performs a comparison function in which it compares the reference pressure signal transmitted to it from microprocessor 160 via circuit board 150 to the pressure which it has received from the pressure transducer. Depending upon the difference between this signal received from the valve's pressure transducer and the calculated desired signal corresponding to the preset reference pressure, the valve circuit 192 signals the valve motor to open or close the pressure control valve, depending upon whether the pressure is to be increased or decreased. This process continues until the desired reference pressure is sensed by the pressure transducer of the pressure control valve. The microprocessor has parallel processing capability and thus can simultaneously supply each of the pressure control valves with the reference pressure for that particular control valve. Moreover, the speed of each of the microprocessor and valve circuits greatly exceeds the time in which the motors of the pressure control valves can respond to the signals received from the valve circuits. Thus, in practical effect the motor response times limit the frequency with which the pressure control valves can be corrected.

Moreover, the reference pressure calculated by the microprocessor also can depend upon other factors such as whether one or more articulatable sections of the frame is elevated at an angle above or below the horizontal. Another factor which can affect the microprocessor's calculation of the reference pressure for the particular zone is whether the patient is being supported in a tilted attitude at an angle below the horizontal and whether this angle is tilted to the left side of the patient support system or the right side. Still another factor is whether the patient is lying on his/her side or back.

Yet another factor that can affect the reference pressure calculated by the microprocessor is whether the patient comfort adjustment buttons 216 have been manipulated via the control panel to adjust the pressure desired by the patient in a particular zone to a pressure slightly above or slightly below the reference pressure that the microprocessor is preprogrammed to set for that particular zone under the other conditions noted, including, elevation angle, side lying or back lying, and tilt attitude. As shown in FIG. 16 for example, each body support zone has a triangular button 216 pointing upward and a triangular button 216 pointing downward. Depression of the upward button 216 increases the reference pressure that the microprocessor calculates for that particular zone. Similarly, the depression of the downward pointing button 216, decreases the reference pressure that the microprocessor calculates for that particular zone. The range of increase and decrease preferably is about twenty percent of the reference pressure that is calculated for the standard mode of operation in each particular zone. This permits the patient to change the pressure noticeably, yet not so much as to endanger the patient by producing a condition that is either over-inflated or under-inflated for the sacks in a particular zone. Moreover, the 20% limitation also can be overridden by pressing the OVERRIDE button shown in FIG. 16. The override function can be cancelled by pressing the RESET button shown in FIG. 16.

One form of sack pressure algorithm which is suitable for use by the microprocessor to calculate the reference pressures for different configurations of the patient support system of the present invention is as follows:

$$\text{Pressure}=C_1\times\text{Weight}+C_2\times\text{Height}+C_3$$

Table 1 provides parameters suitable for several elevation configurations, patients lying on his/her back, side lying, and all five zones. For example, the constants C1, C2 and C3 for each zone are the same for elevation angles 0 degrees through 29 degrees with the patient lying on his/her back. The values of C1, C2 and C3 for side lying are the same for elevation angles of 0° through 29°.

TABLE 1

| Elevation Angle | Zone | C1 | C2 | C3 |
|---|---|---|---|---|
| 0°–29° | I | 0.00473 | 0.04208 | −1.27789 |
| back lying | II | 0.02088 | −0.01288 | 1.73891 |
| | III | 0.03688 | −0.10931 | 7.33525 |
| | IV | 0.00778 | −0.01828 | 2.21268 |
| | V | 0.00316 | 0.00482 | 0.61751 |
| 30°–44° | I | 0.00857 | 0.02056 | −0.22725 |
| back lying | II | 0.02230 | 0.03996 | 3.32860 |
| | III | 0.01971 | 0.08197 | −0.68941 |
| | IV | 0.00554 | 0.03495 | 0.38316 |
| | V | 0.00303 | 0.01883 | −0.12248 |
| 45°–59° | I | 0.00152 | 0.02889 | 0.11170 |
| back lying | II | 0.01349 | −0.02296 | 3.06615 |
| | III | 0.03714 | 0.01023 | 3.37064 |
| | IV | 0.01014 | 0.09399 | −3.39696 |
| | V | 0.00298 | −0.00337 | 1.40102 |
| 60° and above | I | 0.00571 | −0.00976 | 1.77230 |
| back lying | II | 0.01165 | 0.02598 | −0.20917 |
| | III | 0.01871 | 0.04853 | 4.35063 |
| | IV | 0.02273 | 0.06610 | −2.94674 |
| | V | 0.00291 | 0.00292 | 0.99296 |
| SL | I | 0.01175 | 0.00548 | 0.43111 |
| (Side Lying) | II | 0.03276 | 0.03607 | −1.78899 |
| 0°–29° | III | 0.03715 | −0.10824 | 8.22602 |
| | IV | 0.01091 | −0.00336 | 1.48258 |
| | V | 0.00146 | 0.02093 | −0.15271 |

The weight of the patient is supported by the surface tension of the air sack as well as the air pressure within the sack. Thus, values of C1, C2, and C3 can vary with air sack geometry or the properties, such as stiffness, of the materials used to form the air sacks Different air sack geometries may provide more or less stiffness in the air sack.

Typically, a ribbon cable 218 electrical connector (FIG. 10) connects circuit board 150 to microprocessor 160. Circuit board 150 receives analog signals from microprocessor 160 and distributes same to the valve circuit card 192 of each particular pressure control valve 162 for which the signal is intended. In addition, in some embodiments, circuit board 150 can return signals from the individual pressure control valve circuitry 190 to the microprocessor. The voltage signals from the microprocessor cause the valve circuit card 192 to operate the motor of the pressure control valve to expand or contract the valve opening to attain a reference pressure, which the microprocessor is preprogrammed to calculate. The valve circuit compares the reference signal received from the microprocessor to the signals received from pressure transducer 186 of the pressure control valve. In effect, this enables the support system of the present invention to monitor the air pressure in the valve passage 170 near the valve outlet 168, which is the location where the sensing probe of the pressure transducer is disposed to sense the pressure supplied to the air sack through the pressure control valve.

In further accordance with the present invention, there is provided means for switching between different modes of pressurizing the sacks. As embodied herein and shown schematically in FIGS. 11, 12 and 13 for example, the mode switching means preferably includes at least one flow diverter valve 220 and preferably includes a plurality of flow diverter valves 220. The number of flow diverter valves depends upon the number of different pressure zones desired for the patient support system embodiment contemplated. A pressure zone includes one or more sacks or sack chambers which are to be maintained with the same pressure characteristics. In some instances, it is desired to have opposite sides of the sack maintained at different pressures. This becomes desirable for example when the rotation mode of the patient support system is operated. In other instances it becomes desirable to have the pressure in every other sack alternately increasing together for a predetermined time interval and decreasing together for a predetermined time interval. This becomes desirable for example when the patient support system is operated in the pulsation mode of operation.

As shown in FIG. 13 for example, each flow diverter valve preferably is mounted within a modular support member 68, and more than one diverter valve 220 can be mounted in a modular support member such as the seat sack support member 94. However, other sack support members 68, such as the head sack support member shown in FIG. 13 for example, may lack a diverter valve. Each diverter valve preferably is mounted between the top and bottom surfaces of each plate 70. As shown schematically in FIG. 11 for example, each diverter valve has a first flow pathway 222 with a first inlet 224 at one end and a first outlet 226 at the opposite end. Each diverter valve further includes a second flow pathway 228 with a second inlet 230 at one end and a second outlet 232 at the opposite end. The flow pathways are mounted and fixed on a rotating disk 234, also referred to as a switching disk 234, that rotates about a central pivot 236.

The so-called switching disk is rotatable for the purpose of changing the path defined by the inlets and outlets. As shown in solid lines in FIG. 11 for example, first flow pathway 222 connects channel A with channel B, and second flow pathway connects channel C with channel D. Thus, a first inlet 224 of first pathway 222 is connected to channel A and a first outlet 226 of first pathway 222 is connected to channel B. Similarly, a first inlet 230 of second pathway 228 is connected to channel D and a first outlet 232 of second pathway 228 is connected to channel C. In the solid line configuration shown schematically in FIG. 11, both sides of every alternate sack are connected together and thus maintained at the same pressure by a pressure control valve connected to the sacks via pressure control valve openings 96. This is the configuration for the so-called pulsation (P) mode of operation.

As shown by the dotted line configuration of the flow pathways, when the switching disk is rotated 90 degrees counterclockwise to the dotted line position (R), the first flow pathway connects channel A to channel C, and the second flow pathway connects channel B to channel D. Thus, first inlet 224 of first pathway 222 is connected to channel C, and second inlet 230 of second pathway 228 is connected to channel B. First outlet 226 of first pathway 222 becomes connected to channel A, and second outlet 232 of second pathway 228 becomes connected to channel D. In the dotted line configuration shown in FIG. 11, one side of all of the sacks are connected together and thus can be maintained at a common pressure, and the other side of all of the sacks are connected together and also can be maintained at a common pressure. This is the configuration for the so-called rotation (R) mode of operation.

The use of the diverter valves by the present invention enables the support system to be operated in either a pulsation mode of operation or a rotation mode of operation with a minimum number of valves and air flow conduits. The diverter valve allows the air flow paths of the support system to be reconfigured between two distinctly different ways of connecting the pressurized air source through the pressure control valves to individual air sacks of the patient support system.

The patient support system of the present invention can be operated to automatically rotate the patient, i.e., turn the patient to one side or the other, at preset intervals of time. Referring to the control panel shown in FIG. 16, the patient support system of the present invention can be set to operate in a rotational mode by pressing the SET UP button followed by pressing the MODE SELECTION button until the ROTATION indicator is lit. Then the rotation section of the control panel becomes illuminated and can be operated. The operator selects the amount of time that the patient is to be maintained in a right-tilted position, or a horizontal position, or a left-tilted position. To accomplish this for the horizontal position for example, the operator activates the horizontal button 238 followed by activating the TIME button. This manipulation enters the time interval during which the patient support is to maintain the patient supported in the horizontal position. This interval of time is displayed on a digital readout 239. To set the time that the patient is to spend in the right-tilted position, the operator presses the right button 240 followed by the TIME button. Again, the time interval which the patient is to be maintained tilted to the right is displayed digitally on readout 239. A similar procedure is followed to set the time spent in the left-tilted position.

In addition, right button 240 allows the operator to select the attitude of the patient in the right-tilted s position. There are a number of illumination bars disposed above the right button. Each illumination bar corresponds to a different attitude to which the patient can be tilted to the right. The operator selects the desired attitude by continuously pressing the triangular buttons above and below id right button 240 until the bar adjacent the desired attitude is illuminated. For example, the maximum attitude of tilt requires the operator to continue pressing the downward pointing triangular button beneath right button 240 until the lowermost bar above the right button is lit. The same procedure is followed to set the attitude for the left-tilted position.

Moreover, as shown schematically in FIG. 12 for example, the angle of elevation of the head and chest section of the patient support is monitored by an elevation sensing device 242, which sends signals to the circuit board 150 of the modular valve mounting manifold 128. FIG. 12 illustrates electrical signaling pathways by dashed lines and pneumatic pathways by solid lines. The arrows at the ends of the dotted lines indicate the direction of the electrical signals along the electrical pathways. The elevation sensing device detects the angle at which the head and chest section has been positioned, and supplies a corresponding signal to the microprocessor via circuit board 150. Examples of suitable elevation sensing devices are disclosed in U.S. Pat. Nos. 4,745,647 and 4,768,249, which patents are hereby incorporated in their entireties herein by reference. If this elevation information from the sensing device 242 indicates that the angle of articulation exceeds 30 degrees, the microprocessor configures the pressure profile to a standard mode of operation and thus cancels any rotation or pulsation that may have been selected by the operator. The rotation mode is cancelled to avoid torquing the patient's body. The pulsation mode is cancelled because the elevation of the patient above 30 degrees reduces the ability to float the patient in the sacks in the seat zone during pulsation of the three sacks therein. Thus, the "bottoming" of the patient during pulsation at elevation angles above 30 degrees is avoided. Upon reduction of the articulated angle below 30 degrees, the microprocessor does not automatically resume either pulsation or rotation but requires any mode other than the standard mode to be reset.

In accordance with the present invention, the control over blower 66 preferably includes a blower control circuit which controls the power supplied to blower 66. Microprocessor 160 provides a blower control voltage to blower control circuit 67 which controls the power supply to blower 66 according to this blower control voltage signal received from microprocessor 160. A pressure transducer 246 measures the pressure preferably at the blower and communicates a signal corresponding to the measured blower pressure to the microprocessor 160 via blower control circuit 67 and circuit board 150.

Microprocessor 160 has a blower control algorithm which enables microprocessor 160 to calculate a desired reference pressure for the blower. The blower control algorithm preferably calculates this blower reference pressure to be 3 to 4 inches of standard water higher than the highest pressure in the air sacks. Typically, the seat zone (Zone III) has this highest pressure for a given height and weight setting (provided by the operator to the microprocessor) regardless of the elevation of the head and chest sections and whether the patient is lying on his/her side or back. However, a patient with abnormal body mass distribution (which could be caused by a cast for example) may require the highest sack pressure in one of the other zones. If Zone III has the highest sack pressure, as the elevation angle increases, the sack pressure in Zone III increases, and the reference pressure for the blower also increases to equal 3 to 4 inches of standard water above the pressure of the sacks in Zone III.

Microprocessor 160 stores the signal from transducer 246 corresponding to the measured blower pressure in the microprocessor memory, which is updated preferably only once every three seconds. Microprocessor 160 calculates the reference blower pressure about four times each second and compares it to the stored measured pressure about once each second. If the measured pressure is more than about one inch of standard water higher than the reference pressure calculated by microprocessor 160, microprocessor 160 decreases the control voltage by an increment of $1/256$ of the maximum control voltage signal that microprocessor 160 is programmed to provide to blower control circuit 67. This maximum voltage corresponds to the maximum output of blower 66. If the measured blower pressure is more than about one inch of standard water lower than the reference pressure, then microprocessor 160 increases the control voltage signal by an increment of $4/256$ times the maximum control voltage. The increase or decrease, if any, occurs about once each second. Pressure deficits are of a greater concern, and thus correction of such deficits occurs four times faster than correction of excess pressures. The pressure changes resulting from the blower control sequence occur no more frequently than once each second and are no greater than $1/256$ of the maximum pressure for decreases and $4/256$ times the maximum pressure for increases. Moreover, the microprocessor's three second delay in updating the measured pressure used in the calculations assures that changes in the measured pressure that have very short durations will not lead to pressure instability because of control loop exacerbation of short-lived pressure fluctuations. This three second time interval can change depending upon the pressure dynamics and control dynamics of the system.

The selection of the rotation mode of operation on control panel 210 causes the microprocessor to signal the diverter valves to align their pathways for rotational operation of the support system. Once the parameters of operation in the rotation mode have been inputted, the microprocessor recalculates an optimum reference pressure for each pressure control valve. The microprocessor determines the appropriate tilt reference pressure based upon the height and weight of the patient and the angle of tilt selected by the operator. This is accomplished such that the pressure in the low pressure side of the sack and the pressure in the high pressure side of the sack average out to the pressure that would be set for the same sacks in the normal mode of operation, i.e., without any rotation. Thus, the average pressure over the entire sack during the rotational mode of operation is the same as it would be in the non-rotational modes of operation.

The operator initiates the rotation by pressing the RUN button on panel 210 in FIG. 16 for example. When the operator presses the RUN button, the microprocessor adjusts the pressure control valves 162 to set the new tilt reference pressure in the end and intermediate chambers on the side of the support system to be tilted. This results in a reduction in the pressure in the end and intermediate chambers of the tilted sides of the sacks in each body zone. The microprocessor operates the control valve to prevent this low sack pressure from falling below 1 to 2 inches of standard water, because this is the minimum pressure needed to keep the end chamber inflated while the weight of the patient is squeezing out air from the intermediate chamber. The microprocessor also raises the pressure in the end and intermediate chambers on the opposite side, i.e., non-tilted side of the sacks of the support system. The increase in pressure in the chambers of the untilted side of the support system is needed to compensate for the loss in pressure in the chambers on the tilted side of the support system. The additional pressure allows the patient to be supported in the tilted position as comfortably as in the non-tilted position. The pressure increase in the chambers of the non-tilted side of the sacks is preferably sufficient so that the average pressure between the two sides of each sack equals the pressure in this sack when the patient is supported thereon in a non-tilted position. In other words, one-half of the sum of the pressure in the high side of the sack and the low side of the sack is equal to the normal base line pressure of this particular sack in a non-tilted mode of operation, i.e., when both sides of the sack are at this same base line pressure.

In accordance with the present invention, a method is provided for turning the patient on a low air loss patient support system as in the present invention. As embodied herein, the turning method includes the step of grouping all of the sacks 34 into at least two body zones that correspond to at least two different zones of the patient's body. Each zone of the patient's body is preferably supported by one or more sacks in one of the two body zones. Preferably five body zones are involved.

The next step in the method for turning a patient is to pressurize all of the sacks according to a first pressure profile that provides each sack in each body zone with a respective first air pressure. This first air pressure has been chosen so as to provide a first respective level of support to that portion of the patient's body supported by the sacks in that body zone. The level of support is predetermined depending upon the height and weight of the patient and calculated accordingly by the microprocessor. The height and weight data also affect the respective first air pressure that is chosen for the sacks in that particular body zone.

The terms "pressure profile" are used to refer to the fact that the pressure in each body zone may be different because of the different support requirement of that particular body zone. If the individual pressures in the sacks of all the body zones were to be represented on a bar graph as a function of the linear position of the sacks along the length of the patient support, a line connecting the tops of the bars in the graph would depict a certain profile. Hence the use of the term "pressure profile" to describe the pressure conditions in all of the sacks at a given moment in time, either when the pressures are changing or in a steady state condition.

The next step in turning the patient involves separately controlling the air pressure that is supplied to each side of each of the sacks. This preferably is accomplished by supplying the chambers on one side of the sacks in each body zone via a first pressure control valve and supplying the chambers on the other side of the sacks via a separate pressure control valve, and connecting each pressure control valve to a four-way diverter valve. The diverter valve can then be configured to ensure that the air pressure being supplied to the chambers on one side of each sack is being controlled by one of the pressure control valves, and the pressure being supplied to the chambers on the other side of the sack of a particular zone is being supplied through a separate pressure control valve.

The next step in turning the patient involves lowering the pressure in the chambers on the side of the sacks to which the patient is to be tilted. Specifically, the pressure must be lowered in the chambers of one side of the sacks from a first pressure profile, previously established, to a predetermined second pressure profile. The second pressure profile is predetermined according to the height and weight of the patient and also according to the attitude to which the patient is to be tilted. The greater the angle below the horizontal to which the patient is to be tilted, the lower the predetermined second pressure profile.

Another step in the method of turning the patient requires raising the pressure in the chamber on the side of the sacks that is opposite the side to which the patient is being tilted. This involves raising the pressure in the chamber of the non-tilted side of each of the sacks to a predetermined third pressure profile. The raised pressure profile in the non-tilted sacks compensates for the lower pressure profile in the side of the sacks to which the patient has been tilted. When the overall pressure being supplied to support the patient has been reduced in half of the sack, as occurs during tilting, that portion of the patient's body in that particular body zone would not be maintained at the desired level of support without increasing the pressure in the non-tilted side of the sack.

The operator begins by lowering the pressure in one side of the all of the sacks until the patient has been tilted to the desired attitude of tilt beneath the horizontal. As this is occurring, the microprocessor is increasing the pressure in the non-tilted sacks such that one-half of the sum of the pressure in the tilted sacks plus the pressure in the untilted sacks equals the base line pressure of the sacks before the tilting procedure began. In the case just described, the base line pressure corresponds to the pressure in the sack at the first pressure profile. Preferably, the raising and lowering of the pressures in the chambers of opposite sides of the sacks occurs practically simultaneously. Since preferably the microprocessor has parallel processing capability and thus can control each of the pressure control valves simultaneously, the speed with which the tilting is effected (or any other pressure changes in the sacks) is primarily limited by the flow restrictions in the pneumatic circuit, which is primarily a function of the air sack volume and the pressure level in the sacks.

In further accordance with the present invention, the patient is maintained in the selected tilted position for a predetermined length of time. At the end of this predetermined length of time, which is clocked by the microprocessor, the patient is returned to the horizontal position by simultaneously increasing the pressure in the side of the sacks to which the patient previously had been tilted while decreasing the pressure in the non-tilted side of the sacks until the pressure in both sides of the sacks returns to the first predetermined pressure profile. The changes in pressure from low to high or from high to low preferably occurs over a time interval of about three minutes. This is done to reduce the likelihood that the patient will experience any uncomfortable sensation during these pressure changes.

In still further accordance with the present invention, the method of turning a patient can maintain the patient in the horizontal position for a predetermined interval of time. At the end of this predetermined interval of time, the patient then can be tilted to the side of the patient support system that is opposite the side to which the patient had been tilted prior to being maintained in the horizontal position. Moreover, the amount of time which the patient spends in a particular position, namely, left-tilted, horizontal, and right-tilted, can be preselected so that the patient can be maintained in one of the three positions for however long is deemed therapeutic.

It is during the turning, i.e., rotation or tilting, mode of operation that the grommet which defines the hole 64 connecting each intermediate chamber 54 with each end chamber 46 of each sack 34 plays a particularly important role. As the pressure control valve controlling the side of the sack to which the patient is to be tilted begins to close and reduce the pressure being supplied to this side of these sacks, the weight of the patient above the depressurizing intermediate chamber 54 squeezes the air from the intermediate chamber through the grommet and into the end chamber 46 to compensate for the reduced pressure being supplied to the end chamber via the pressure control valve. Thus, the reduction in pressure initially serves to deflate the intermediate chamber while maintaining the end chamber as fully inflated as before the pressure control valve began to reduce the pressure supplied thereto. The pressure in the end chamber of course is being reduced. However, the end chamber remains completely inflated, unlike the connecting intermediate chamber which is being squeezed by the weight of the patient that no longer is being supported by the same level of air pressure as was present when the sacks were being maintained according to the first pressure profile that was first set to maintain the patient in the horizontal position atop the sacks. Moreover, since the end chamber remains inflated, it acts as a passive constraint to prevent the patient from rolling past the end chamber and off of the patient support.

To operate the support system of the present invention in the pulsation mode, the operator pushes the SET UP button on the control panel illustrated in FIG. 16 for example. Then the operator presses the MODE SELECTION button until the PULSATION indicator illuminates. When the PULSATION indicator is illuminated, the pulsation section of the control panel also becomes illuminated. The microprocessor immediately signals the diverter valves to align their pathways for the pulsation mode of operation. In the pulsation alignment of the diverter valves, the channels of the modular support members connect alternately adjacent air sacks. This results in two sets of sacks which can be operated at two separate and opposite patterns of pressurization. As shown in FIG. 16 for example, the operator selects the time interval for a complete pulsation cycle by pressing the TIME button. The time interval for each pulsation cycle is displayed in a digital readout 244 above the TIME button. The operator selects the degree of depressurization in the phase of the pulsation cycle in which the pressures in alternating sacks are lowered while the pressures in the other sacks are increased according to the amount that the pressures in the first group of alternating sacks have been lowered. The operator accomplishes this selection by pressing one of the two triangular shaped buttons beneath the light bars next to the MAX-MIN scale to illuminate the light bar adjacent the desired level of depressurization. Once the parameters of operation in the pulsation mode have been inputted, the microprocessor begins calculating a pulsation reference pressure for each pressure control valve. This pulsation reference pressure depends upon the degree of depressurization selected by the operator and the height and weight of the patient. Preferably, the microprocessor maintains the pressures in adjacent sacks such that one-half of the sum of the pressures in the adjacent sacks equals the base line pressure for a sack in that zone at the elevation angle, if any, and taking into account whether the patient is side lying or back lying. The operator initiates the pulsation of the sacks by pressing the RUN button on panel 210 in FIG. 16 for example.

In further accordance with the present invention, a method is provided for periodically relieving the pressure of the patient support system against the patient's body. This method preferably is accomplished by pulsating the pressure in the sacks of the low air loss patient support system having a plurality of sacks disposed transversely across the length of the support system. The pressure in a first group of sacks comprising every alternating sack is depressurized relative to the remaining sacks, which are provided with an increase in pressure. The pressure differential between the two separate sacks is maintained for a predetermined interval of time. At the end of this time interval, the pressure profiles switch so that the other set of alternating sacks becomes depressurized while the first set of alternating sacks receives a slight increase in pressure. This opposite pressurization condition is also maintained for a predetermined interval of time, whereupon the cycle repeats itself until the pulsation mode of operation is discontinued.

Prior to the initiation of the pulsation mode of operation, all of the sacks in the patient support will be maintained at a first pressure profile according to the height and weight of the patient, the various angles of inclination of any of the articulating sections of the frame, and any tilt angle imposed upon the sacks. However, preferably, the pulsation method will not be operated in conjunction with any tilting of the patient, and thus activation of the pulsation method automatically discontinues operation in the tilting mode.

The steps of the method for pulsating the pressure in the sacks of the low air loss patient support system include configuring the air supply means of the patient support to define two separate groups of alternating sacks. A first group of sacks includes either every odd number sequenced sack in order from one end of the patient support to the opposite end of the patient support or every even number sequenced sack. For purposes of this description, the first of the two groups of sacks will be chosen to be the odd number sequenced sacks. In a preferred embodiment, the sacks are further grouped into body zones to support the patient's body at a predetermined pressure for all of the sacks in the body zone. Thus, all of the sacks in a particular body zone will be pressurized at the same first pressure, and accordingly the individual first pressure will be applied to all of the sacks in each body zone. This step of configuring the sacks is preferably accomplished by configuring a plurality of diverter valves to connect every alternating sack in a body zone.

The next step includes reducing the air pressure being supplied to the sacks in the first group. This is accomplished as the microprocessor controls the pressure control valve of this first group to attain a second pressure profile. The second pressure profile corresponds to a decreased pulsation reference pressure calculated by the microprocessor when the degree of depressurization was selected by the operator. The microprocessor controls the pressure control valves supplying air to the sacks in the first group until the decreased pulsation reference pressure has been attained by the sacks in this first group.

The next step occurs simultaneously with the first step and includes supplying air pressure to the sacks in the second of the two groups, namely, the group including every even number sequenced sack in order from one end of the patient support to the opposite end of the patient support, at a third pressure profile. This third pressure profile corresponds to an increased pulsation reference pressure which the microprocessor calculated for each pressure control valve controlling the sacks in the second group for each individual body zone. This increased pulsation reference pressure also has been calculated by the microprocessor depending upon the degree of depressurization selected by the operator.

This third pressure profile is designed to compensate for the loss of pressurization by the first group of sacks so that the patient support can continue to maintain the patient at the same level of horizontal support during the depressurization of the first group of sacks. In other words, while the pressures in the alternate groups of sacks are changing, the vertical height of the patient above the floor is not changing significantly from what it was prior to the onset of the pulsation mode of operation. Thus, the microprocessor maintains the pressures in the two groups of sacks such that one-half the sum of the second and third pressure profiles equals the first pressure profile.

The two steps involving the changes in pressurization of the two groups of sacks, occur simultaneously over a first time interval.

The method for pulsating the pressure in the sacks further includes the step of maintaining the second and third pressure profiles being supplied to the two groups of sacks during a second interval of time. This is accomplished by the microprocessor controlling the pressure control valves to maintain the increased or decreased pulsation reference pressures calculated by the microprocessor for the respective group of sacks over the time interval selected by the operator.

After the predetermined lower pressure has been maintained for the sacks in the one group for the second interval of time, the next step is to increase the pressure being supplied to this one group during a third interval of time until each sack in this one group attains a higher individual pressure corresponding to the third pressure profile. At the same time that the sacks in the first group of sacks are attaining the higher individual pressure, the pressure being supplied to the sacks in the other of the two groups is being decreased to the lower pressure corresponding to the second pressure profile. The pressure in the other of the two groups is decreased until the predetermined lower pressure is being provided to each individual sack in this other group. The pressure decreases over this third interval of time.

Finally, the third pressure profile in the one group and the second pressure profile in the other group are maintained during a fourth interval of time.

Preferably, all of the first, second, third, and fourth intervals of time are of equal duration. However, in some embodiments of the method of pulsating the sacks of the present invention, the first interval of time preferably equals the third interval of time, and the second interval of time preferably equals the fourth interval of time.

In yet another embodiment of the method of pulsating the sacks of the present invention, not only are the first and third time intervals equal to each other as well as the second and fourth time intervals being equal to each other, but the first and third time intervals are shorter than the second and fourth time intervals. In other words, the time which the sacks spend alternately changing pressures is less than the time during which the sacks remain at the steady state higher or lower pressures. Similarly, in yet another embodiment of the method of pulsating the sacks of the present invention, the second and fourth time intervals can be equal to each other and shorter than the first and third time intervals, which also are equal to each other.

In accordance with the present invention and as illustrated in the figures in general, particularly FIGS. 17 through 23, a vibratory patient support system 300 is provided. Vibratory patient support system 300 includes rigid support frame 30, as described, and a plurality of inflatable sacs 34 supported upon support frame 30. Each sac 34 has an upper support surface 36 whereby a plurality of sacs 34 forms a patient support surface. Vibratory patient support system 300 further includes means for pressurizing and maintaining sacs 34 at a predetermined pressure. These means have already been described in detail. Vibrating means A separate from the pressurizing and maintaining means are provided for vibrating at least a portion of the patient support surface at a predetermined therapeutic frequency. In a preferred embodiment, zone 2 (FIG. 13), contains vibrating means A. The plurality of sacs 34 are maintained at their predetermined pressure while the portion of the patient support surface is simultaneously vibrated at a predetermined frequency within the specified frequency range. Means are further provided for variably controlling vibrating means A.

The vibratory patient support system 300 may be similar to the low air loss patient support system previously described with the addition of vibrating means A for vibrating at least a portion of the low air loss patient support system. In a preferred embodiment of system 300, inflatable sacs 34 are disposed transversely across support frame 30, as depicted generally in FIG. 1. As also previously described in detail, support frame 30 is preferably articulable in sections with at least one section corresponding to the general area of a patient's chest. In a preferred embodiment, vibrating means A are disposed within at least one inflatable sac 34 which is located in the section corresponding to the general area of the patient's chest.

Vibrating means A may be external to inflatable sacs 34 or disposed internal to at least one sac 34 as depicted generally in FIGS. 17 through 22. However, it is within the scope of the present invention to include external vibrating means, such as a mechanical vibrator for vibrating a portion of the patient support surface at a predetermined therapeutic frequency. Vibrating means A may include, for example, an internal fluid or air system, a pulsating air or fluid system, or any suitable motive means for vibrating the patient support system.

Additionally, the vibratory patient support system of the present invention is not limited to a low air loss configuration. Inflatable sacs 34 may comprise low air loss sacs but, this is not a requirement of the invention.

A multi-modal low air loss patient support system has already been described. The multi-modal system includes means for pressurizing inflatable sacs 34 in a first constant pressure mode, means for pressurizing inflatable sacs 34 in a second pulsation mode, and means for pressurizing inflatable sacs 34 in a third turning mode. In a preferred embodiment of vibratory patient support system 300 according to the invention, vibrating means A are included with the multi-mode low air loss patient support system as described. In this embodiment, vibratory patient support system 300 is switchable from any one of the modes of operation of the low air loss configuration described to any other mode of operation with vibrating means A being independently actuable and controllable from any one of the modes of operation. The modes of operation of the low air loss configuration system have already been discussed in detail in the specification and need not be repeated.

Figure 23:
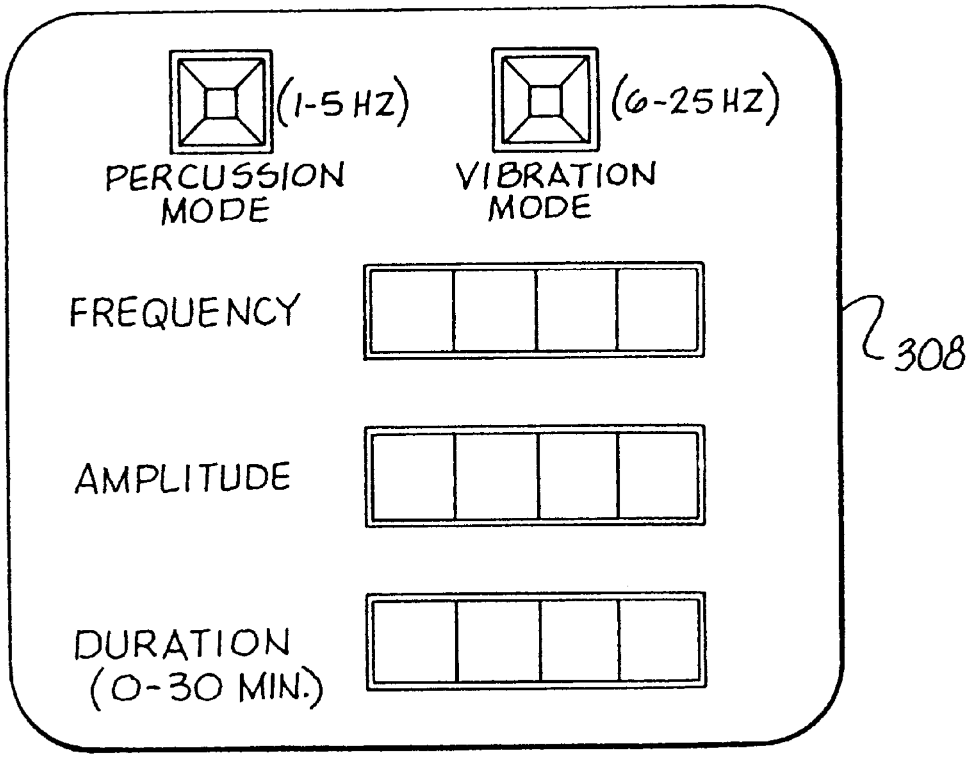
FIG. 23 illustrates a perspective view-of a control panel for the vibration patient support system.

Vibrating means A and the means for variably controlling vibrating means A according to the invention preferably includes an operator interface means, such as control panel 308 as shown in FIG. 23 or other suitable operator interface component. Control panel 308, or like interface component, may be included as part of the control panel depicted in FIG. 16, or comprise a singular component. The means for variably controlling vibrating means A may include means for selecting from a first percussion mode and a second vibration mode. In the percussion mode, vibrating means A vibrates the patient support surface at a predetermined frequency in a range of, for example, 1 to 5 hz. In the vibration mode, vibrating means A vibrates the patient support surface at a predetermined frequency within a range of 6 to 25 hz, for example. The frequency ranges of the modes can obviously be tailored to desired frequency ranges. Means are further provided to allow the operator to select any combination of frequency, amplitude, and duration of the vibrating therapy.

Control panel 308 depicted in FIG. 23 is merely a representation of what a suitable user-friendly control panel for use with the present invention may resemble. Control panel 308 or operator interface can comprise any suitable means or interface component. For example, a LED display may be used providing the operator with a menu for selecting the vibrational mode, frequency, amplitude, and duration of vibrating therapy.

The relationship of circuit board 150, microprocessor 160, and blower control 67 has already been described in detail. The means for variably controlling vibrating means A preferably comprises an interface with microprocessor 160 and circuit board 150. Microprocessor 160 includes software means for controlling the frequency of vibrating means A through power distribution board 150. This relationship is depicted generally in FIGS. 20 through 22. The means for varying the amplitude or magnitude of frequency of vibrating means A includes an interface with blower control unit 67. This relationship will be described in more detail below.

Figure 20:
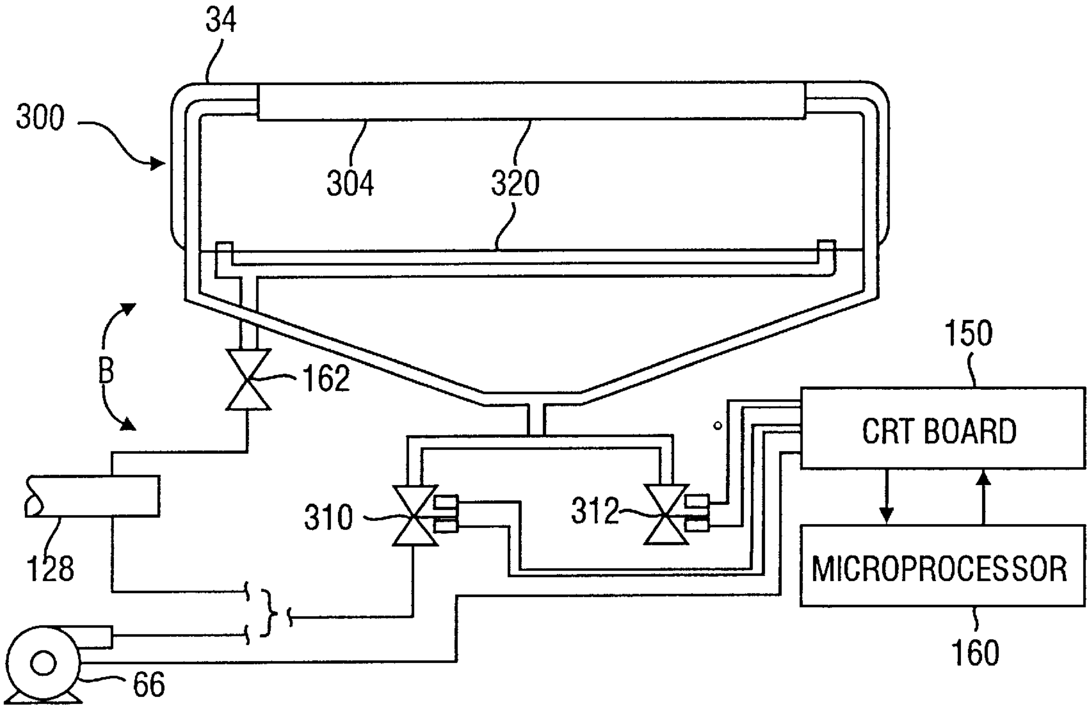
FIG. 20 is a schematic view of the components of the vibratory patient support system according to the present invention.
Figure 21:
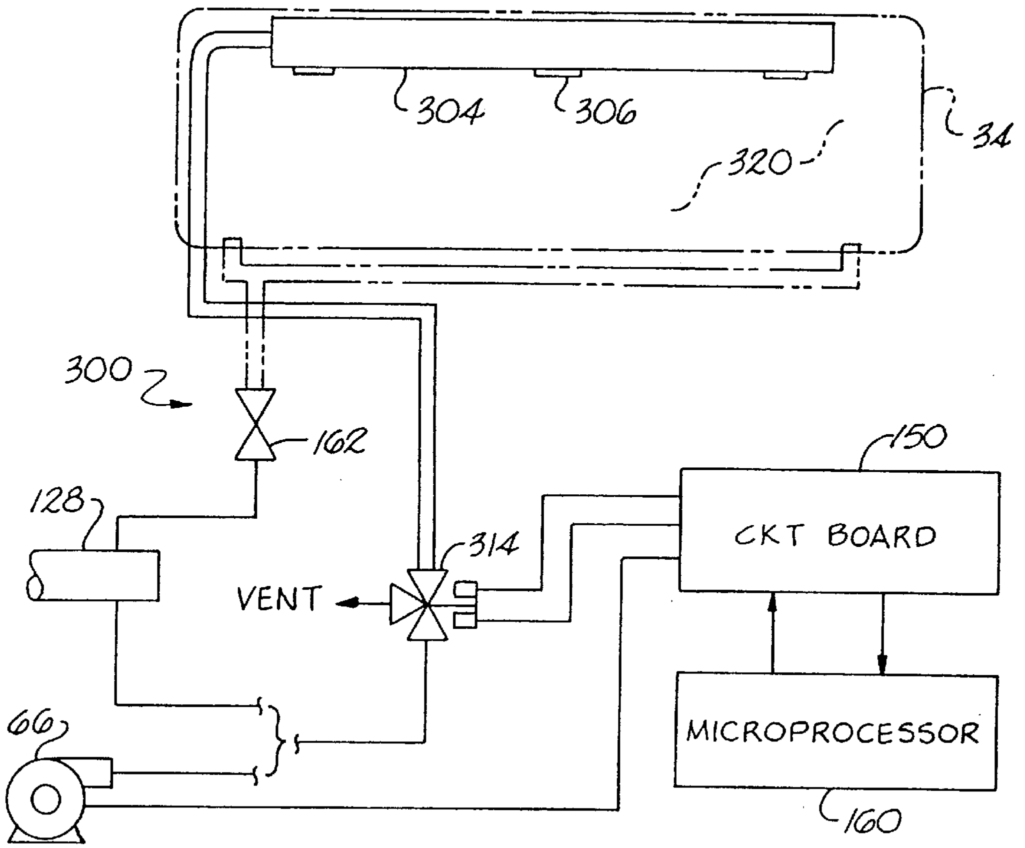
FIG. 21 is yet another schematic view of the components of an embodiment of the present invention.
Figure 22:
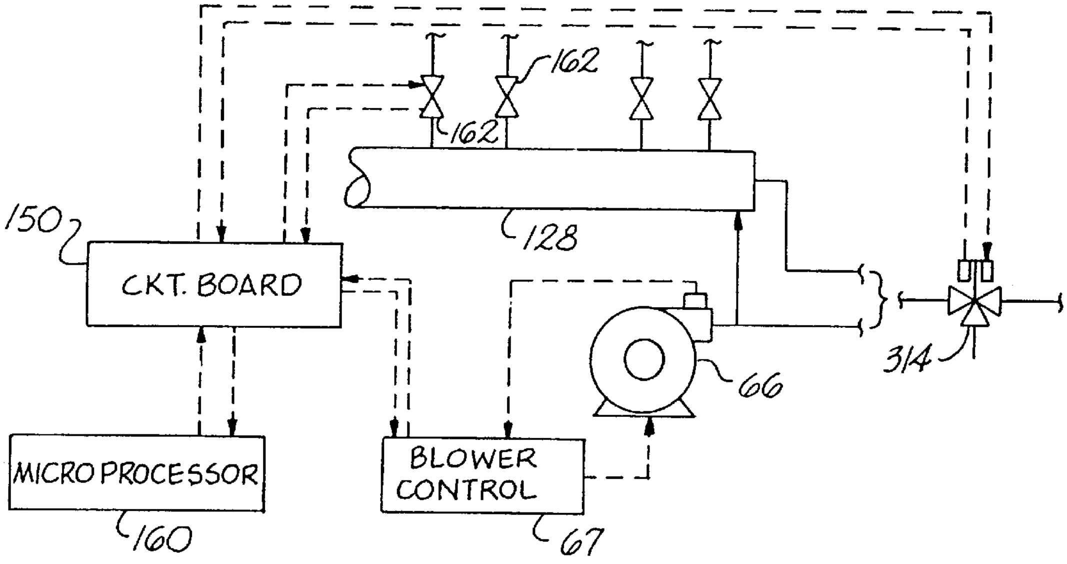
FIG. 22 is a partial diagrammatic view of the components of an embodiment of the present invention.

Vibrating means A according to the invention may comprise a pneumatic vibrating system or means B, as in FIGS. 20 and 21 generally. The motive force for pneumatic vibrating system B is a pressurized air source, preferably the same pressurized air source used with the means for pressurizing and maintaining sacs 34 at a predetermined pressure. For example, the source of pressurized air could be blower 66. As shown in FIGS. 20 and 21 in particular, blower 66 supplies air to valves 162 through manifold 128 for pressurizing and maintaining sacs 34 at their predetermined pressure. As indicated by the broken lines in the figures, the pressurized air source for pneumatic vibrating system B may be via manifold 128 or directly from blower 66. In an alternative embodiment, pneumatic vibrating system B may employ its own separate source of pressurized air, for instance a separate blower 66 or other suitable source of pressurized air. This separate source of air may include, for example, a connection to the hospital service air system, an external pressurized air control, or other external source.

Pneumatic vibrating system B may further comprise at least one inflatable cell 304. Cell 304 may be disposed within at least one inflatable sac 34, as shown particularly in FIGS. 17 through 19*b*, or disposed external to sac 34 generally adjacent the upper surface thereof. Inflatable cell 304 is disposed within sac 34 generally at the top thereof to lie just beneath upper surface 36 of sac 34. In the embodiments depicted in FIGS. 17*a*, 17*b*, and 18, inflatable cell 304 is completely separate from sac 34 and supported within sac 34 by, for instance, internal slings 306 upon which inflatable cell 304 rests. Slings 306 are heat sealed or otherwise adhered to the sides 42 of sac 34. Any appropriate retaining means for maintaining cell 304 in position within sac 34 may be used but, flexible slings 306, or like devices, are preferred in that they will give with the changing shape and volume of sac 34.

Figure 17A:
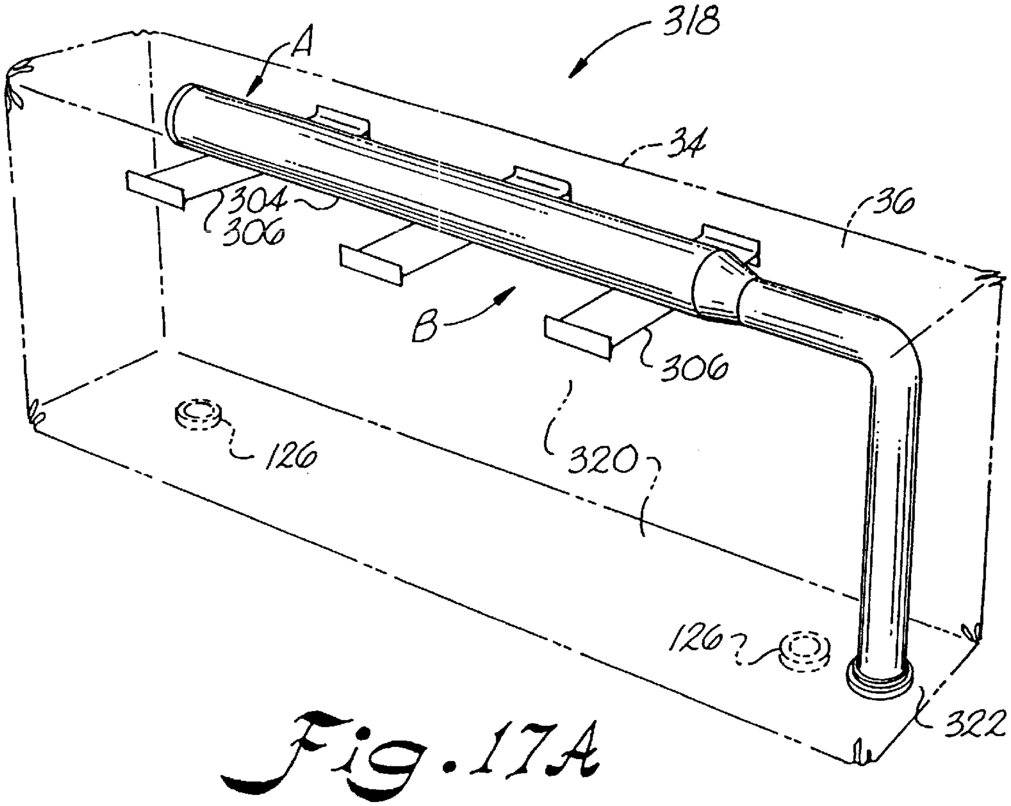
FIG. 17*a* illustrates a cut-away perspective view of a vibratable inflatable sac according to the present invention.
Figure 17B:
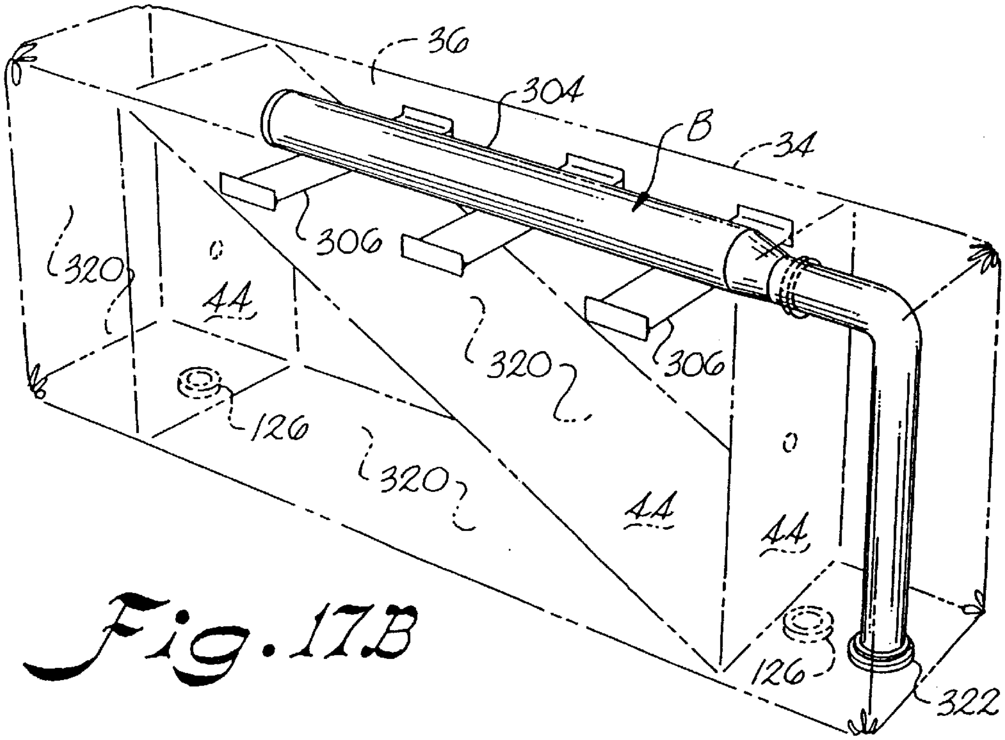
FIG. 17*b* illustrates another cut-away perspective view of a vibratable inflatable sac according to the present invention.
Figure 18:
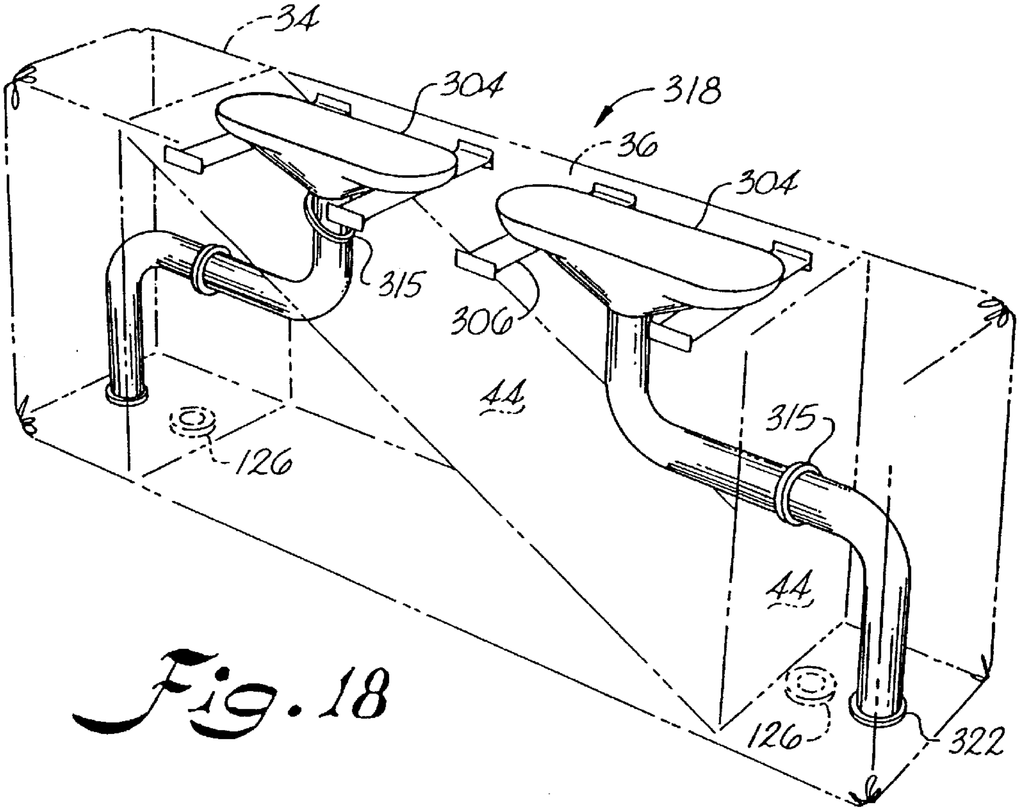
FIG. 18 illustrates a cut-away perspective view of an embodiment of a vibrating inflatable sac according to the present invention.

In one preferred arrangement, cell 304 comprises a tubular pod which extends generally lengthwise within sac 34, as shown in FIGS. 17*a* and 17*b*. Alternatively, a plurality of individual inflatable cells or pods 304 may be disposed within sac 34 as depicted in FIG. 18. It should be understood that any arrangement of inflatable cells 304 within sac 34 is within the scope of the invention.

As described, each inflatable sac 34 has an upper surface 36. Preferably, inflatable cells 304 are disposed within sac 34 just below surface 36 so that when inflatable cells 304 are rapidly inflated and vented, they impart a vibrational force to upper surface 36. Thus, the frequency of the vibrational forces imparted to the patient support surface depends upon the frequency inflatable cells 304 are alternately inflated and vented. Alternatively, cells 304 may be external to sac 34 and still impart vibrational forces to the patient support surface.

Figure 19A:
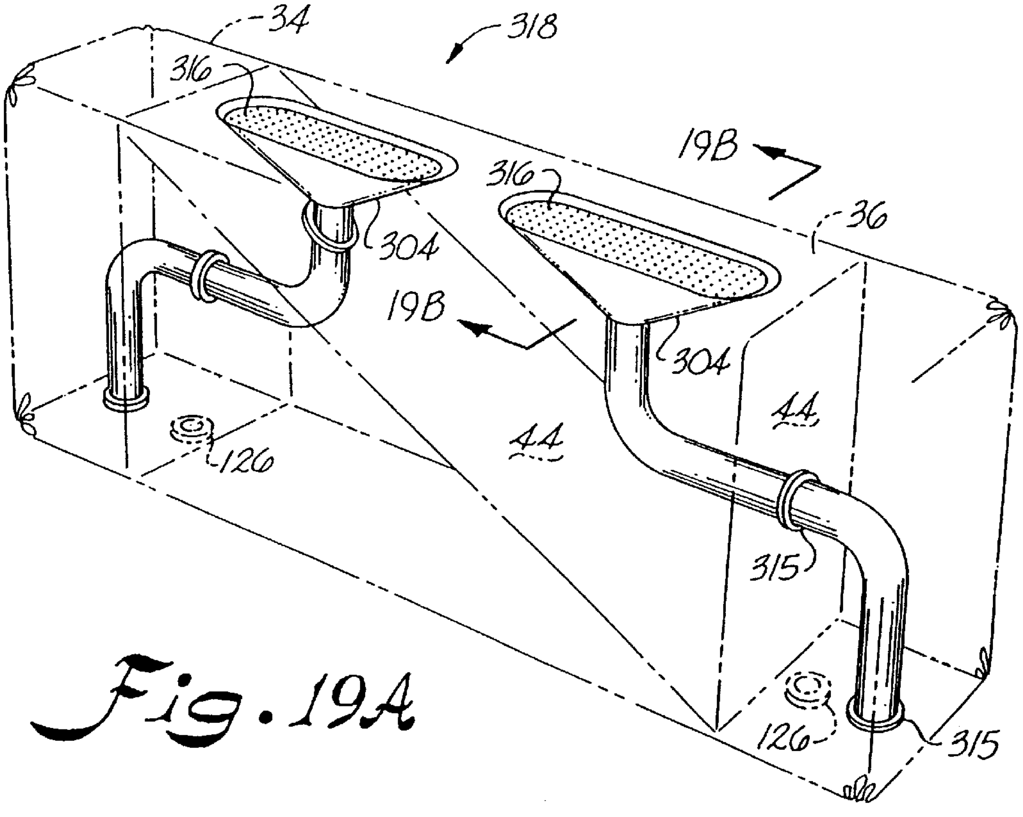
FIG. 19*a* illustrates yet another embodiment of a vibratable inflatable sac according to the invention.
Figure 19B:
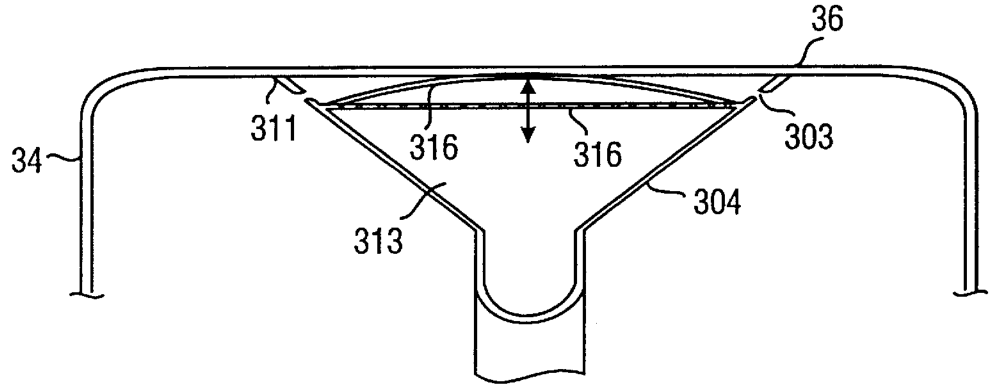
FIG. 19*b* is a cut-away side perspective view taken along the lines b—b of FIG. 19*a* and illustrates an embodiment of an inflatable cell according to the invention.

FIG. 19*a* depicts another preferred embodiment of inflatable cells 304. In this embodiment, inflatable cell 304 is not completely separate from sac 34 but, the top of cell 304 is also upper surface 36 of sac 34. In other words, inflatable cell 304 and sac 34 share the same upper surface. In this embodiment, internal slings 306 are not required. In this embodiment, a diaphragm 316 may also be provided within each inflatable cell 304, as shown particularly in FIGS. 19*a* and 19*b*. Diaphragm 316 rest just below upper surface 36 and forms the top of pressurizable portion 313 of inflatable cell 304. Above pressurizable portion 313, there is a space 311 within which diaphragm 316 expands and contracts. Ports 303 are provided into space 311 so that the relative pressure within space 311 equalizes with the pressure of internal chamber 320. Diaphragm 316 is precisely arranged within cell 304 beneath upper surface 36 so that when cell 304 is pressurized, diaphragm 316 expands and "snaps" against upper surface 36. Upon venting cell 304, diaphragm 316 contracts or returns to its original position. Due to ports 303, the pressure in space 311 equalizes with that in internal chamber 320, thereby aiding diaphragm 316 in returning to its original position. With this embodiment, the vibrational forces imparted to upper surface 36 are enhanced by the action of the diaphragm 316 within inflatable cell 304.

Means are further provided for connecting inflatable cells 304 to the source of pressurized air. Preferably, device 322 is provided similar to the hand detachable air-tight connection 126 for supplying pressurized air to sacs 34, as previously described. However, any suitable air-tight connection can employed as device 322. Flexible tubing or other like material may be used to convey the pressurized air internally through sac 34 to inflatable cell 304. When inflatable cells 304 are disposed within a multi-chambered sac 34, as illustrated in FIGS. 18 and 19*a*, the flexible tubing, if disposed internal to sac 304, may pass through internal walls 44. In this case, air-tight seals or grommets 315 are provided to ensure the air-tight integrity of the internal chambers of sac 34.

Pneumatic vibrating system B according to the present invention may also include controllable valve means C disposed between the source of pressurized air or blower 66 and inflatable cell 304. Valve means C operate to alternately supply pressurized air from the pressurized air source to inflatable cell 304 and to vent pressurized air from inflatable 304 at a predetermined frequency. In this manner, inflatable cell 304 expands and contracts thereby pneumatically vibrating just below upper surface 36 of sac 34, thereby imparting vibrational forces to the patient support surface.

Controllable valve means C may comprise solenoid valves 314, 310, and 312 as shown in FIGS. 20 and 21. In the embodiment of FIG. 21, three-way solenoid valve 314 is utilized. Three-way solenoid valve 314 operates to alternately pressurize inflatable cell 304 and vent cell 304 to atmosphere. Solenoid valve 314 is powered through circuit board 150 with the frequency of operation of valve 314 being controlled through appropriate software in microprocessor 160. The frequency of operation of valve 314, or the rate valve 314 pressurizes and vents cell 304 is controlled and may be varied through interfacing with microprocessor 160.

Controllable valve means C may comprise conventional timer control circuits with relay outputs for controlling the frequency of operation of the solenoid valves. In this embodiment, the timer control circuit need not be interfaced with microprocessor 160. Preferably though, appropriate software is embodied in microprocessor 160 for controlling the valves.

The software for control of controllable valve means C may be embodied in an appropriate chip carried within microprocessor 160. The control of solenoid valves through appropriate software and power distribution boards is well-known to those skilled in solid state electronic control systems and need not be described in detail here. In summary though, an operator may interface with microprocessor 160 through, for instance, control panel 308 of FIG. 23, to establish the vibrational mode and frequency of valve 314. Depending on the operator's commands, microprocessor 160 generates a control signal for valve 314 through power distribution board 150. The control signal and power to operate valve 314 is routed through circuit board 150 to solenoid valve 314. In an alternative embodiment not depicted in the figures, other routing and power distribution systems may be employed for controlling controllable valve means B. For instance, a separate microprocessor and power distribution board may be utilized for independently controlling solenoid valve 314. The frequency, sequencing, and amplitude of the vibrational forces may be controlled with the software and microprocessor 160 by, for example, varying the frequency and timing of the valve operations.

As embodied in FIG. 20, controllable valve means C according to the invention may comprise two-way solenoid valves 310, 312. Valves 310 and 312 may operate in opposite phase to alternately pressurize and vent inflatable cells 304. First solenoid valve 310 is signaled to open thereby allowing pressurized air into inflatable cells 304 while second solenoid valve 312 is simultaneously signaled to close. Valve 310 then shuts stopping the flow of pressurized air to cell 304 while second solenoid valve 312 simultaneously opens venting cell 304. In an alternative embodiment, valves 310 and 312 may open and close with a predetermined time delay there between so that a time lag exists between pressuring and venting of cells 304. As described above, control of solenoid valves 310 and 312 is through microprocessor 160 and circuit board 150.

It should be understood that the solenoid valves 310, 312, and 314 are only examples of suitable controllable valves for use with the vibrating therapy system of this invention. Other values or valve configurations are suitable and within the scope of this invention. For instance, a spool valve or solenoid diaphragm type valve may also be utilized.

Means are also preferably provided for controlling the amplitude or magnitude and sequence of vibrational forces imparted to upper surface 36. This may be accomplished by, for instance, varying the source of pressurized air to cells 304 or the timing of the pressurization of the cells. In the embodiment of the invention depicted in the figures, blower 66 supplies air to inflatable cell 304. The magnitude or amplitude of vibrational forces of cell 304 can be varied by controlling the speed of blower 66 through blower control circuit 67. Preferably, an operator interface is provided by, for example, control panel 308, for varying the output of blower 66.

It is a desirable feature of the vibrational therapy device according to the present invention that vibrating means A, for example, pneumatic vibrating system B, be separately actuable and controllable in any of the modes of operation of the patient support system. If vibratory patient support system 300 of the present invention includes the low air loss patient support system described earlier, it is desired to be able to actuate and control vibrating means A so as not to interfere with or affect the operational mode of the low air loss system. For example, it may desired to actuate vibrating means A while the low air loss patient support system is simultaneously rotating the patient from side to side. Additionally, it may only be necessary to actuate vibrating means A for only brief periods of time at preselected intervals. In this manner, it is desired to have a timing control circuit, within microprocessor 160 for example, for establishing and controlling the period of operation of vibrating means A regardless of the mode of operation of the low air loss patient support configuration.

In further accordance with the present invention, a vibratable inflatable sac 318 is provided. Vibratable sac 318 may be utilized, for example, with other sacs in a inflatable patient support system, such as a low air loss patient support bed. As illustrated in FIGS. 17*a* and 17*b*, vibratable sac 318 comprises at least one internal chamber 320 and preferably, a plurality of internal chambers as illustrated in FIG. 17*b*. Means 126 are provided for connecting internal chamber 320 to a source of pressurized air so that vibratable sac 318 can be pressurized and maintained at a predetermined pressure. Pneumatic vibrating means B are carried internal to sac 318 and disposed within internal chamber 320 generally near the top thereof just below upper surface 36 of sac 318. Means 322 are provided for connecting vibrating means B to a source of pressurized air so that vibrating means B can be alternately pressurized and vented at a predetermined frequency thereby imparting a therapeutic vibrational force to the upper surface 36 of sac 318. In one preferred embodiment of vibratable inflatable sac 318 according to the present invention, pneumatic vibrating means includes an inflatable cell or pod 304 disposed within internal chamber 320 just below upper surface 36, as already described.

It will be apparent to those skilled in the art that various modifications and variations can be made in the present invention without departing from the scope or spirit of the invention. Thus, it is intended that the present invention cover the modifications and variations of this invention provided they come within the scope of the appended claims and their equivalents.

What is claimed is:

1. A pressure control apparatus for use in a bed that includes a pressurized air source and at least one air sack, the apparatus comprising:

a valve inlet configured to receive pressurized air from a pressurized air source;

a valve outlet configured to permit exit of the pressurized air to the at least one air sack;

a first valve in fluid communication between the valve inlet and the valve outlet and configured to regulate flow of the pressurized air between the valve inlet and the valve outlet;

a second valve disposed between the pressurized air source and an independently inflatable cell adjacent an air sack, the second valve when in a first state couples the pressurized air source to the inflatable cell in order to pressurize the inflatable cell and when in a second state couples the inflatable cell to atmosphere in order to vent the inflatable cell; and a controller operably coupled to the first valve and configured to control the first valve to generally maintain the pressure of the air sack and operably coupled to the second valve to alternately actuate the second valve between the first state and the second state at a frequency in order to alternately pressurize and vent the inflatable cell at the frequency.

2. The apparatus of claim 1, wherein the inflatable cell is at least partially disposed within one of the air sacks.

3. The apparatus of claim 1, further comprising an operator interface coupled to the controller to facilitate selection of the frequency of pressurization and venting of the inflatable cell.

4. The pressure control apparatus of claim 1, wherein the frequency is a programmable frequency.

5. A pressure control apparatus for use in a bed that includes a pressurized air source and at least one air sack, the apparatus comprising:

a valve inlet configured to receive pressurized air from a pressurized air source;

a valve outlet configured to permit exit of the pressurized air to the at least one air sack;

a first valve in fluid communication between the valve inlet and the valve outlet and configured to regulate flow of the pressurized air between the valve inlet and the valve outlet;

a second valve disposed between the pressurized air source and an independently inflatable cell adjacent an air sack, the second valve when in a first state couples the pressurized air source to the inflatable cell in order to pressurize the inflatable cell and when in a second state couples the inflatable cell to atmosphere in order to vent the inflatable cell; and a controller operably coupled to the first valve and configured to control the first valve to regulate flow of the pressurized air through the first valve and operably coupled to the second valve to alternately actuate the second valve between the first state and the second state at a frequency in order to alternately pressurize and vent the inflatable cell at the frequency, the controller including a processor and the frequency being controlled by software associated with the processor.

6. The apparatus of claim 5, wherein the inflatable cell is at least partially disposed within one of the air sacks.

7. The apparatus of claim 5, further comprising an operator interface coupled to the controller to facilitate selection of the frequency of pressurization and venting of the inflatable cell.

8. The pressure control apparatus of claim 5, wherein the frequency is a programmable frequency.

9. A pressure control apparatus for use in a bed that includes a pressurized air source and at least one air sack, the apparatus comprising:

a valve inlet configured to receive pressurized air from a pressurized air source;

a valve outlet configured to permit exit of the pressurized air to the at least one air sack;

a first valve in fluid communication between the valve inlet and the valve outlet and configured to regulate flow of the pressurized air between the valve inlet and the valve outlet;

a controller coupled to the first valve and configured to control the first valve to regulate flow of the pressurized air through the first valve;

a second valve disposed between the pressurized air source and an independently inflatable cell adjacent an air sack, the second valve when in a first state couples the pressurized air source to the inflatable cell in order to pressurize the inflatable cell and when in a second state couples the inflatable cell to atmosphere in order to vent the inflatable cell, wherein the second valve comprises a first two-way solenoid valve coupled between the inflatable cell and the pressurized air source, and a second two-way solenoid valve coupled between the inflatable cell and atmosphere; and a vibration and percussion controller coupled to the second valve and operable to alternately actuate the second valve between the first state and the second state at a programmable frequency in order to alternately pressurize and vent the inflatable cell at the programmable frequency, the vibration and percussion controller being operable to generate first control signals that cause the first two-way solenoid valve to open and cause the second two-way solenoid valve to close, thereby pressurizing the inflatable cell; and the vibration and percussion controller being operable to generate second control signals that cause the first two-way solenoid valve to close and cause the second two-way solenoid valve to open, thereby venting the inflatable cell.

10. The apparatus of claim 9, wherein the inflatable cell is at least partially disposed within one of the air sacks.

11. The apparatus of claim 9, further comprising an operator interface coupled to the vibration and percussion controller to facilitate selection of the frequency of pressurization and venting of the inflatable cell.

12. A pressure control apparatus for use in a bed that includes a pressurized air source, at least one inflatable air sack, and an independently inflatable cell located adjacent the at least one inflatable air sack, the apparatus comprising:

a controllable valve disposed between the pressurized air source and an inflatable cell of an air sack, the controllable valve being actuated to selectively couple the pressurized air source to the inflatable cell in order to pressurize the inflatable cell and to vent the inflatable cell to atmosphere; and a controller operable to couple the at least one inflatable air sack to the pressurized air source to regulate pressure within the at least one air sack and operably coupled to the controllable valve to actuate the controllable valve to alternately pressurize and vent the inflatable cell at a frequency, the pressure of the at least one air sack being generally maintained simultaneous with the inflatable cell being pressurized and vented at the frequency.

13. The apparatus of claim 12, wherein the inflatable cell includes a diaphragm.

14. The apparatus of claim 13, wherein a top surface of the inflatable cell is also an upper surface of the air sack.

15. The apparatus of claim 12, wherein the controllable valve comprises a two-way valve.

16. The apparatus of claim 12, wherein the at least one inflatable air sack is a low air loss bladder.

17. The apparatus of claim 12, wherein the inflatable cell is at least partially disposed within one of the air sacks.

18. The apparatus of claim 12, further comprising an operator interface coupled to the controller to facilitate selection of the frequency of pressurization and venting of the inflatable cell.

19. The pressure control apparatus of claim 9, wherein the frequency is a programmable frequency.

20. A pressure control apparatus for use in a bed that includes a pressurized air source, at least one inflatable air sack, and an independently inflatable cell located adjacent the at least one inflatable air sack, the apparatus comprising:

a controllable valve disposed between the pressurized air source and an inflatable cell of an air sack, the controllable valve being actuated to selectively couple the pressurized air source to the inflatable cell in order to pressurize the inflatable cell and to vent the inflatable cell to atmosphere, wherein the controllable valve couples the inflatable cell to the pressurized air source when in the first state and couples the inflatable cell to atmosphere when in the second state; and a controller operable to couple the at least one inflatable air sack to the pressurized air source to regulate pressure within the at least one air sack and operably coupled to the controllable valve to actuate the controllable valve to alternately pressurize and vent the inflatable cell at a frequency, the controller including a processor and the frequency being controlled by software associated with the processor.

21. The apparatus of claim 20, wherein the inflatable cell includes a diaphragm.

22. The apparatus of claim 21, wherein a top surface of the inflatable cell is also an upper surface of the air sack.

23. The apparatus of claim 20, wherein the at least one inflatable air sack is a low air loss bladder.

24. The apparatus of claim 20, wherein the inflatable cell is at least partially disposed within one of the air sacks.

25. The apparatus of claim 20, further comprising an operator interface coupled to the controller to facilitate selection of the frequency of pressurization and venting of the inflatable cell.

26. The pressure control apparatus of claim 20, wherein the frequency is a programmable frequency.

27. A pressure control apparatus for use in a bed that includes a pressurized air source, at least one inflatable air sack, an independently inflatable cell located adjacent the at least one inflatable air sack, wherein the inflatable cell includes a diaphragm configured to expand and contract such that when expanded, the diaphragm contacts an upper surface of the air sack, the apparatus comprising:

a controller operable to couple the at least one inflatable air sack to the pressurized air source to regulate pressure within the at least one air sack;

a controllable valve powered through a circuit board and disposed between the pressurized air source and an inflatable cell of an air sack, the controllable valve being actuated to selectively couple the pressurized air source to the inflatable cell in order to pressurize the inflatable cell and to vent the inflatable cell to atmosphere, wherein the controllable valve comprises a three-way solenoid valve that couples the inflatable cell to the pressurized air source when in the first state and couples the inflatable cell to atmosphere when in the second state; and a vibration and percussion controller coupled to the controllable valve and operable to actuate the controllable valve to alternately pressurize and vent the inflatable cell at a programmable frequency.

28. A pressure control apparatus for use in a bed that includes a pressurized air source, an inflatable air sack including an upper support surface, and an independently inflatable cell located adjacent the inflatable air sack, the apparatus comprising:

a first controllable valve disposed between the pressurized air source and the inflatable air sack;

a second controllable valve disposed between the pressurized air source and the inflatable cell, the second controllable valve being operable to couple the inflatable cell to the pressurized air source to pressurize the inflatable cell and to vent the inflatable cell to atmosphere; and a controller operably coupled to each of the first and second controllable valves and operable to regulate the pressure in the air sack and to independently alternately pressurize and vent the inflatable cell at a frequency, such that the inflatable cell imparts therapeutic vibrational forces to the upper surface of the air sack.

29. The apparatus of claim 28, wherein the first and second controllable valves are two-way solenoid valves.

30. The apparatus of claim 28, wherein at least a portion of the upper support surface of the inflatable air sack is a top surface of the inflatable cell and means are provided for controlling the amplitude and sequence of the vibrational forces imparted to the upper support surface of the inflatable air sack.

31. The apparatus of claim 30, wherein the amplitude of vibrational forces is varied by controlling the pressurized air source.

32. The apparatus of claim 28, wherein the inflatable cell is at least partially disposed within one of the air sacks.

33. The apparatus of claim 28, further comprising an operator interface coupled to the controller to facilitate selection of the frequency of pressurization and venting of the inflatable cell.

34. The pressure control apparatus of claim 28, wherein the frequency is a programmable frequency.

35. A pressure control apparatus for use in a bed that includes a pressurized air source, at least one inflatable air sack, an independently inflatable cell located adjacent the at least one inflatable air sack, and a diaphragm located in the inflatable cell and configured to expand and contract such that when expanded, the diaphragm contacts an upper surface of the air sack, the apparatus comprising:

a first controllable valve disposed between the pressurized air source and an inflatable air sack;

a second controllable valve disposed between the pressurized air source and an inflatable cell, the second controllable valve being operable to couple the inflatable cell to the pressurized air source to pressurize the inflatable cell and to vent the inflatable cell to atmosphere; and a controller coupled to each of the first and second controllable valves and operable to regulate the pressure in the air sack and to independently alternately pressurize and vent the inflatable cell at a selected frequency.

36. A pressure control apparatus for use in a bed that includes a pressurized air source and at least one air sack, the apparatus comprising:

a valve inlet configured to receive pressurized air from a pressurized air source;

a valve outlet configured to permit exit of the pressurized air to the at least one air sack;

a first valve in fluid communication between the valve inlet and the valve outlet and configured to regulate flow of the pressurized air between the valve inlet and the valve outlet;

a second valve disposed between the pressurized air source and an independently inflatable cell adjacent an air sack; and a controller operably coupled to the first valve and configured to control the first valve to regulate flow of the pressurized air through the first valve and operably coupled to the second valve to actuate the second valve at a frequency in order to alternately pressurize and vent the inflatable cell at the frequency, the first valve being configured to maintain the pressure in the air sack simultaneous with the second valve being alternately actuated at the frequency.

37. The pressure control apparatus of claim 36, wherein the second valve comprises a first two-way solenoid valve coupled between the inflatable cell and the pressurized air source, and a second two-way solenoid valve coupled between the inflatable cell and atmosphere and the controller being operable to generate first control signals that cause the first two-way solenoid valve to open and cause the second two-way solenoid valve to close, thereby pressurizing the inflatable cell; and being operable to generate second control signals that cause the first two-way solenoid valve to close and cause the second two-way solenoid valve to open, thereby venting the inflatable cell.

38. The pressure control apparatus of claim 37, wherein the controller simultaneously causes the first two-way solenoid valve to open and the second two-way solenoid value to close to pressurize the inflatable cell and simultaneously causes the first two-way solenoid valve to close and the second two-way solenoid value to open to vent the inflatable cell.

39. The pressure control apparatus of claim 37, wherein the controller is configured to separate the generation of the first control signals and the generation of the second control signals with a predetermined time delay.

40. The pressure control apparatus of claim 36, further comprising an operator interface coupled to the controller.

41. The pressure control apparatus of claim 40, wherein the operator interface includes a first selection corresponding to a percussion mode of operation indicating to the controller to actuate the second valve at a first frequency corresponding to a percussion mode of operation and a second selection corresponding to a vibration mode of operation indicating to the controller to actuate the second valve at a second frequency corresponding to a vibration mode of operation.

42. The pressure control apparatus of claim 41, wherein the first frequency corresponding to the percussion mode of operation is in the range of 1 to 5 Hertz and the second frequency corresponding to the vibration mode of operation is in the range of 6 to 25 Hertz.

43. The pressure control apparatus of claim 36, wherein the frequency is a programmable frequency.

* * * * *